(12) United States Patent
Hattori et al.

(10) Patent No.: US 8,741,397 B2
(45) Date of Patent: Jun. 3, 2014

(54) LIQUID CRYSTAL DISPLAY ELEMENT, LIQUID CRYSTAL COMPOSITION, ALIGNING AGENT, METHOD FOR PRODUCING LIQUID CRYSTAL DISPLAY ELEMENT, AND USE OF LIQUID CRYSTAL COMPOSITION

(75) Inventors: Norikatsu Hattori, Chiba (JP); Atsuko Fujita, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/502,141

(22) PCT Filed: Oct. 18, 2010

(86) PCT No.: PCT/JP2010/068775
§ 371 (c)(1),
(2), (4) Date: Apr. 16, 2012

(87) PCT Pub. No.: WO2011/055643
PCT Pub. Date: May 12, 2011

(65) Prior Publication Data
US 2012/0229744 A1  Sep. 13, 2012

(30) Foreign Application Priority Data
Nov. 9, 2009  (JP) .................. 2009-255891

(51) Int. Cl.
G02F 1/1333 (2006.01)
G02F 1/1337 (2006.01)
C09K 19/12 (2006.01)
C09K 19/30 (2006.01)
C09K 19/34 (2006.01)
C09K 19/20 (2006.01)
C09K 19/38 (2006.01)

(52) U.S. Cl.
USPC .................. 428/1.1; 428/1.2; 428/1.23; 428/1.25; 428/1.26; 349/124; 349/130; 252/299.4; 252/299.61; 252/299.63; 252/299.66; 252/299.67

(58) Field of Classification Search
USPC ............... 349/124; 252/299.4, 299.01, 299.5, 252/299.61, 299.63, 299.66, 299.67; 428/1.1, 1.2, 1.23, 1.25, 1.26
See application file for complete search history.

(56) References Cited

U.S. PATENT DOCUMENTS

2003/0232930 A1* 12/2003 Gibbons et al. ............... 525/418
2008/0090026 A1*  4/2008 Bernatz et al. ................ 428/1.2

FOREIGN PATENT DOCUMENTS

EP  1889894  2/2008
JP  H10-186330  7/1998
(Continued)

OTHER PUBLICATIONS

Lee et al., "Surface-controlled patterned vertical alignment mode with reactive mesogen", Optics Express, Jun. 8, 2009, pp. 10298~10303, vol. 17, No. 12.

*Primary Examiner* — Shean C Wu
(74) *Attorney, Agent, or Firm* — Jianq Chyun IP Office

(57) ABSTRACT

Disclosed is a liquid crystal display element which is composed of a pair of substrates (1) at least one of which is transparent. The liquid crystal display element comprises, between the pair of substrates, a transparent electrode (2), an aligning agent (3) that contains at least reactive monomers and/or oligomers (5), and a liquid crystal layer. The liquid crystal display element is characterized in that an alignment layer is obtained by polymerizing the reactive monomers or oligomers contained in the aligning agent, and the liquid crystal layer is composed of a liquid crystal composition that contains a compound (4) having at least one benzene ring in each molecule, said benzene ring containing at least one fluorine atom and being disubstituted by halogen atoms.

18 Claims, 1 Drawing Sheet

(56) References Cited

FOREIGN PATENT DOCUMENTS

| | | |
|---|---|---|
| JP | 2003-307720 | 10/2003 |
| JP | 2004-131704 | 4/2004 |
| JP | 2006-133619 | 5/2006 |
| JP | 2010-230759 | 10/2010 |
| WO | 2008114821 | 9/2008 |

* cited by examiner

LIQUID CRYSTAL DISPLAY ELEMENT, LIQUID CRYSTAL COMPOSITION, ALIGNING AGENT, METHOD FOR PRODUCING LIQUID CRYSTAL DISPLAY ELEMENT, AND USE OF LIQUID CRYSTAL COMPOSITION

CROSS-REFERENCE TO RELATED APPLICATION

This application is a 371 of international application of PCT application Ser. No. PCT/JP2010/068775, filed on Oct. 18, 2010, which claims the priority benefit of Japan application no. 2009-255891, filed on Nov. 9, 2009. The entirety of each of the above-mentioned patent applications is hereby incorporated by reference herein and made a part of this specification.

TECHNICAL FIELD

The invention relates to a liquid crystal display element and a liquid crystal composition and an aligning agent used for the liquid crystal display element. More specifically, the invention relates to a liquid crystal display element prepared by polymerizing a reactive monomer or oligomer contained in an aligning agent to form an alignment layer and mainly used for an active matrix (AM) liquid crystal display suitable for a liquid crystal projector, a liquid crystal television element and so forth, a liquid crystal composition and the aligning agent, and a method for producing the liquid crystal display element and use of liquid crystal composition.

BACKGROUND ART

In a liquid crystal display element, a classification based on an operating mode for liquid crystals includes phase change (PC), twisted nematic (TN), electrically controlled birefringence (ECB), in-plane switching (IPS), vertical alignment (VA) and so forth. A classification based on a driving mode in the device includes a passive matrix (PM) and an active matrix (AM). The PM is further classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transreflective type utilizing both the natural light and the backlight.

A liquid crystal composition having a nematic phase and having suitable characteristics is used for the devices. General characteristics of the liquid crystal composition should be improved to obtain an AM device having good characteristics. A relationship in the general characteristics of the AM device and the liquid crystal composition is shown in Table 1 below.

The general characteristics of the liquid crystal composition will be explained further based on a commercially available AM device. A temperature range of the nematic phase relates to a temperature range in which the device can be used. A preferred maximum temperature of the nematic phase is 70° C. or higher and a preferred minimum temperature of the nematic phase is −10° C. or lower. Viscosity and a rotational viscosity of the liquid crystal composition relate to a response time in the device. Therefore, a short response time is preferred for displaying moving images on the device. Accordingly, the viscosity of the liquid crystal composition is preferably as small as possible. Furthermore, the viscosity is further preferably as small as possible also at a low temperature.

TABLE 1

General Characteristics of Liquid Crystal Composition and AM Device

| No. | General Characteristics of Liquid Crystal Composition | General Characteristics of AM Device |
|---|---|---|
| 1 | wide temperature range of a nematic phase | wide usable temperature range |
| 2 | small viscosity[1] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |
| 7 | small content of impurity | unlikely poor display |

[1] A liquid crystal composition can be injected into a liquid crystal cell in a shorter period of time.

An optical anisotropy of the liquid crystal composition relates to a contrast ratio in the device. Therefore, a product (Δn×d) of the optical anisotropy (Δn) of the composition and a cell gap (d) in the device is designed so as to maximize the contrast ratio. A suitable value of the product depends on a type of the operating mode. The suitable value is in the range of 0.30 micrometer to 0.40 micrometer in a device having a VA mode, and in the range of 0.20 micrometer to 0.30 micrometer in a device having an IPS mode. In the above case, a composition having a large optical anisotropy is preferred for a device having a small cell gap. A large absolute value of a dielectric anisotropy of the liquid crystal composition contributes to a low threshold voltage, a small electric power consumption and a large contrast ratio in the device. Accordingly, the large absolute value of the dielectric anisotropy is preferred.

A large specific resistance in the composition contributes to a large voltage holding ratio and a large contrast ratio in the device. Accordingly, a composition having a large specific resistance, at room temperature and also at a high temperature in an initial stage, is preferred. A composition having a large specific resistance, at room temperature and also at a high temperature even after the device has been used for a long period of time, is preferred.

Stability of the composition to ultraviolet light and heat relates to a service life of the liquid crystal display element. In the case where the stability is high, the device has a long service life. Such characteristics are preferred for an AM device used for a liquid crystal projector, a liquid crystal television and so forth.

A composition having a positive dielectric anisotropy is used for an AM device having a TN mode. On the other hand, a composition having a negative dielectric anisotropy is used for an AM device having the VA mode. A composition having a positive or negative dielectric anisotropy is used for an AM device having the IPS mode. A composition having a positive or negative dielectric anisotropy is used for an AM device to which a polymer sustained alignment (PSA) technology is applied.

For the reason stated above, an AM device desirably has characteristics such as a wide temperature range in which the device can be used, a short response time, a large contrast ratio, a low threshold voltage, a large voltage holding ratio and a long service life. In particular, an AM device desirably has a shorter response time even by one millisecond and an unlikely poor display regarding unevenness, image sticking and so forth.

On the other hand, a technical development of the liquid crystal display element has been achieved not only by improvement of the driving mode or structure of the liquid crystal display element but also by improvement of component parts used for the liquid crystal display element.

The liquid crystal display element ordinarily has an alignment layer for aligning the liquid crystal composition in a liquid crystal layer in a specific direction. The alignment layer is one of important elements involved in a display quality level of the liquid crystal display element, and a role of the alignment layer has become increasingly important every year along with a development of a high quality liquid crystal display element.

The alignment layer is prepared from an aligning agent. The aligning agent mainly used currently includes a solution prepared by dissolving a polyamic acid or soluble polyimide in an organic solvent. The alignment layer is formed by applying such a solution to a substrate and then performing film formation by a means such as heating.

For the alignment layer subjected to film formation, anisotropy is exhibited by applying a rubbing method for rubbing the layer in a specific direction with a fabric of rayon, cotton and so forth, and thus liquid crystals are aligned in a predetermined direction.

However, the method for controlling alignment by rubbing includes the problematic points as described below.

1) Because a rubbing method includes a mechanical technique, a precise adjustment of an initial alignment state of the liquid crystals is difficult, and exhibition of mutually different alignment directions is difficult in a fine region.

2) A scratch and a flaw generated during rubbing cause a decrease in yield.

3) When a drive voltage is applied to a liquid crystal display apparatus and then the drive voltage is turned off after alignment of liquid crystal molecules has been completed, and then a drive voltage is applied again, a final alignment state of the liquid crystal molecules is different from a state during the last drive voltage application. Therefore, the final alignment state of the liquid crystal molecules irregularly changes every time a drive voltage is applied, and thus a long time is required until the liquid crystal molecules reach the final alignment state. Accordingly, a response time of the liquid crystals becomes long.

4) In the case of the VA mode, a viewing angle worsens by using alignment in a single direction.

In order to solve a problem of the rubbing method, a method for improving a response speed and a contrast has been proposed particularly by using a polymer sustained alignment (PSA) technology for a VA display device.

According to the PSA mode, addition of a monomer having a high reactivity is needed to a liquid crystal material in which a high holding ratio is required (FIG. 2 and Patent literatures No. 1 to No. 5). However, addition of a reactive compound to the liquid crystal material may cause an unreacted monomer to remain in the liquid crystal material, and may result in a poor liquid crystal display.

On the other hand, a method for allowing a reactive monomer to be contained in an aligning agent and polymerizing the monomer by applying voltage has been proposed as a method for improving the disadvantage (Non-patent literature No. 1).

CITATION LIST

Patent Literature

Patent literature No. 1: JP H10-186330 A.
Patent literature No. 2: JP 2003-307720 A.
Patent literature No. 3: JP 2004-131704 A.
Patent literature No. 4: JP 2006-133619 A.
Patent literature No. 5: EP 1889894 A.

Non-Patent Literature

Non-patent literature No. 1: OPTICS EXPRESS, Vol. 17, No. 12, pages 10298 to 10303 (issued on Jun. 8, 2009).

SUMMARY OF INVENTION

Technical Problem

A method for producing a liquid crystal display apparatus disclosed in the Non-patent literature No. 1 is considered to intend to improve the disadvantage by a PSA technology. However, the method focuses attention mainly on shortening of a response time but makes no consideration to other required characteristics as a liquid crystal display element, such as image sticking and leaching of an unreacted monomer in an aligning agent into a liquid crystal layer.

As described above, the liquid crystal display element requires not only shortening of the response time but also an improvement of other characteristics. The invention has been made in order to solve the problems described above. An aim of the invention is to provide a liquid crystal display element having excellent characteristics, particularly, a small image sticking and a small leaching of the unreacted monomer in the aligning agent into the liquid crystal layer by applying a specific aligning agent and a specific liquid crystal composition or combining the aligning agent and the liquid crystal composition in a liquid crystal display element formed by allowing a reactive monomer to be contained in the aligning agent and polymerizing the monomer by applying voltage, and to provide a liquid crystal composition and the aligning agent, and a method for producing the liquid crystal device and use of liquid crystal composition.

Solution to Problem

In order to solve the problems, the invention concerns a liquid crystal display element comprising a pair of substrates including at least one transparent substrate, wherein the liquid crystal display element includes a transparent electrode interposed between the pair of substrates, an aligning agent containing at least a reactive monomer or oligomer, and a liquid crystal layer, the reactive monomer or oligomer contained in the aligning agent is polymerized to form an alignment layer, and the liquid crystal layer comprises a liquid crystal composition containing a compound having at least one benzene ring disubstituted by halogen atoms including at least one fluorine atom in one molecule.

Advantageous Effects Of Invention

A liquid crystal display element concerning the invention exhibits excellent advantageous effects including a small image sticking and a small leaching of an unreacted monomer in an aligning agent into a liquid crystal layer.

DESCRIPTION OF EMBODIMENTS

Figure 1:
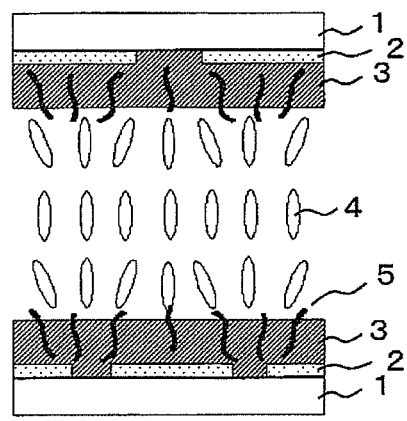
FIG. 1 is a drawing explaining a principle in which the invention is applied to a VA device.
Figure 2:
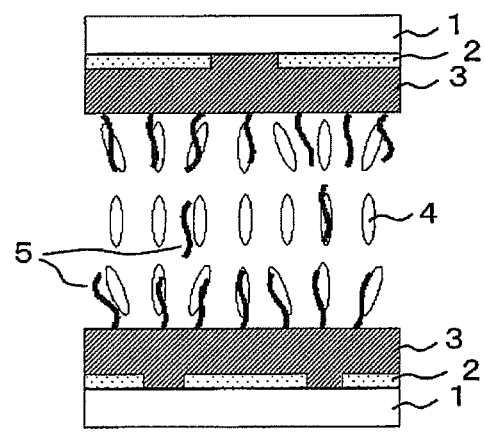
FIG. 2 is a drawing showing a conventional VA device in which a reactive monomer is contained in a liquid crystal layer.

Usage of terms in the specification and claims is as described below. An aligning agent of the invention contains a reactive monomer or oligomer before polymerization initiation, and is a mixture including a polyimide obtained by allowing a tetracarboxylic dianhydride to react with a diamine, a polyamic acid and a polyamic acid derivative being a precursor thereof, and an alignment layer is formed by polymerizing the reactive monomer or oligomer, and has a molecular alignment capability within the liquid crystal display element. A liquid crystal composition or a liquid crystal display element of the invention may be abbreviated as "composition" or "device," respectively. A liquid crystal layer of the invention comprises the liquid crystal composition within the liquid crystal display element. The liquid crystal display element is a generic term for a liquid crystal display panel, a liquid crystal display module and a liquid crystal display apparatus. "Liquid crystal compound" means a compound having a liquid crystal phase such as a nematic phase or a smectic phase, or a compound having no liquid crystal phase but being useful as a component of the composition. Such a useful compound contains a six-membered ring such as 1,4-cyclohexylene and 1,4-phenylene, and has a rod-like molecular structure.

An optically active compound and a polymerizable compound other than a compound represented by formula (1) may occasionally be added to the composition. Even in the case where the compounds are liquid crystalline, the compounds are classified as an additive herein. At least one compound selected from the group of compounds represented by formula (1) may be abbreviated as "compound (1)." "Compound (1)" means one compound or two or more compounds represented by formula (1). A same rule applies to any other compound represented by any other formula. "Arbitrary" means any of not only positions but also numbers without including the case where the number is 0 (zero).

A higher limit of a temperature range of the nematic phase may be abbreviated as "maximum temperature." A lower limit of the temperature range of the nematic phase may be abbreviated as "minimum temperature." An expression "a specific resistance is large" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "a voltage holding ratio is large" means that the device has a large voltage holding ratio at room temperature and also at a high temperature in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. Each component such as a first component provided for the composition includes one compound or two or more compounds.

A symbol $R^1$ is used for a plurality of compounds in chemical formulas of component compounds. Meanings of $R^1$ may be identical or different in two of arbitrary compounds among the plurality of compounds. In one case, for example, $R^1$ of compound (1) is ethyl and $R^1$ of compound (1-1) is ethyl. In another case, $R^1$ of compound (1) is ethyl and $R^1$ of compound (1-1) is propyl. A same rule applies to a symbol $R^2$, $Z^1$ or the like.

In the chemical formulas of the component compounds, $Z^1$, $Z^2$, $Z^{11}$ and $Z^{12}$ being a divalent group are not limited to a direction of a definition described. For example, in the case of —$CH_2O$—, —$CH_2O$— may be —$OCH_2$—, —$COO$— may be —$OCO$—, and —$CF_2O$— may be —$OCF_2$—.

In the chemical formulas of the component compounds, ring A to ring D, and ring $A^{11}$ to ring $A^{15}$ being a disubstituted ring are not limited to a direction of a definition described. For example, in the case of 2-fluoro-1,4-phenylene, 2-fluoro-1,4-phenylene may be 3-fluoro-1,4-phenyleneoxymethylene.

Moreover, when j, k, $j^1$, $k^1$, n, m, v and m1 meaning repetition of structure have two or more values in the chemical formulas of the component compounds, a plurality of divalent groups or disubstituted rings can be selected, but the groups or rings may be identical or different.

For example, when j is 2 in compound (1), ring A may be two of 2,3-difluoro-1,4-phenylene, or a combination of 1,4-cyclohexylene and 2,3-difluoro-1,4-phenylene. In a similar manner, as for $Z^1$, a single bond and a single bond may be selected, or a single bond and —COO— may be selected, for example.

The invention includes the items described below.

Item 1. A liquid crystal display element, comprising a pair of substrates including at least one transparent substrate, wherein the liquid crystal display element includes a transparent electrode interposed between the pair of substrates, an aligning agent containing at least a reactive monomer or oligomer, and a liquid crystal layer, the reactive monomer or oligomer contained in the aligning agent is polymerized to form an alignment layer, and the liquid crystal layer comprises a liquid crystal composition containing a compound having at least one benzene ring disubstituted by halogen atoms including at least one fluorine atom in one molecule.

Item 2. The liquid crystal display element according to item 1, wherein both of the pair of substrates are transparent.

Item 3. The liquid crystal display element according to item 1 or 2, wherein alignment of liquid crystal molecules of the liquid crystal composition constituting the liquid crystal layer is perpendicular to a substrate surface.

Item 4. The liquid crystal display element according to any one of items 1 to 3, wherein the alignment of liquid crystal molecules of the liquid crystal composition constituting the liquid crystal layer is perpendicular to the substrate surface, and the liquid crystal display element has a plurality of pixels subjected to alignment division by the alignment layer.

Item 5. The liquid crystal display element according to any one of items 1 to 4, wherein the alignment layer is formed by the liquid crystal molecules being aligned with the reactive monomer or oligomer by a predetermined voltage and then the reactive monomer or oligomer being polymerized by ultraviolet light irradiation.

Item 6. The liquid crystal display element according to any one of items 1 to 5, wherein the liquid crystal layer contains the liquid crystal composition including at least one compound selected from the group of compounds represented by a liquid crystal compound having a negative dielectric anisotropy.

Item 7. The liquid crystal display element according to item 6, wherein the liquid crystal composition contains at least one liquid crystal compound selected from the group of liquid crystal compounds represented by formula (1) as a first component;

Chemical formula 1:

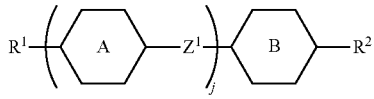
(1)

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring A and ring B are independently 1,4-cyclohexylene, tetrahydropyran-2,5-diyl, 1,3-dioxane-2,5-diyl, 1,4-phenylene, 2-fluoro-1,4-phenylene, 2,5-difluoro-1,4-phenylene, 2,3-difluoro-1,4-phenylene, 2-fluoro-3-chloro-1,4-phenylene, 2,3-difluoro-6-methyl-1,4-phenylene, 2,6-naphthalenediyl or 7,8-difluorochroman-2,6-diyl, and at least one of ring A and ring B is 2,3-difluoro-1,4-phenylene, 2-fluoro-3-chloro-1,4-phenylene, 2,3-difluoro-6-methyl-1,4-phenylene, or 7,8-difluorochroman-2,6-diyl; $Z^1$ is independently a single bond, $-(CH_2)_2-$, $-CH_2O-$, $-COO-$ or $-CF_2O-$; and j is 1, 2 or 3.

Item 8. The liquid crystal display element according to item 7, wherein the first component is at least one liquid crystal compound selected from the group of liquid crystal compounds represented by formula (1-1) to formula (1-31) in the liquid crystal composition;

Chemical formula 2:

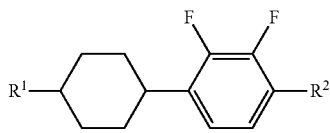
(1-1)

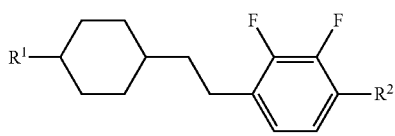
(1-2)

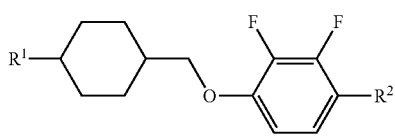
(1-3)

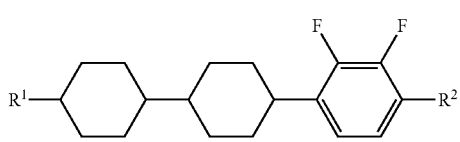
(1-4)

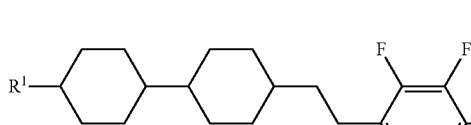
(1-5)

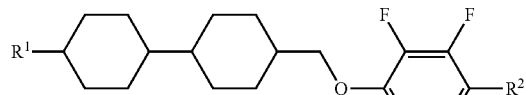
(1-6)

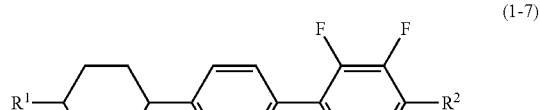
(1-7)

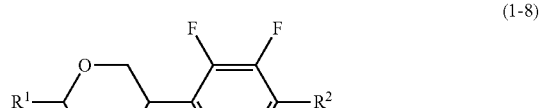
(1-8)

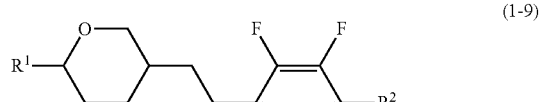
(1-9)

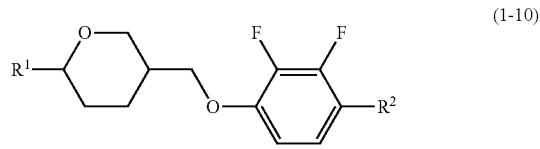
(1-10)

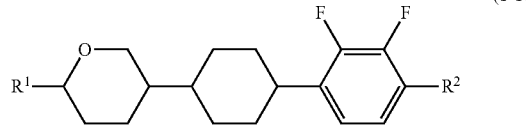
(1-11)

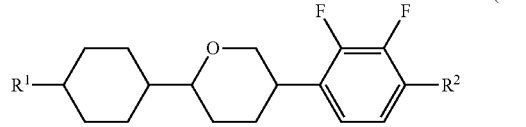
(1-12)

Chemical formula 3:

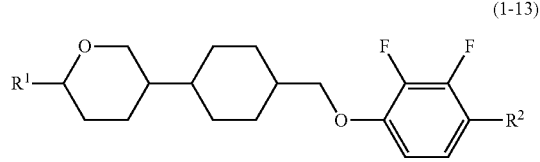
(1-13)

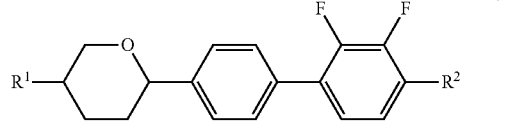
(1-14)

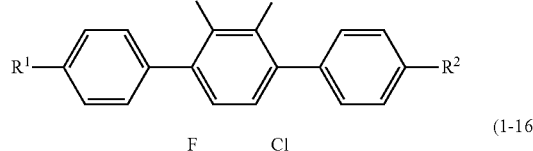
(1-15)

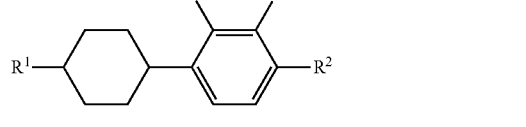
(1-16)

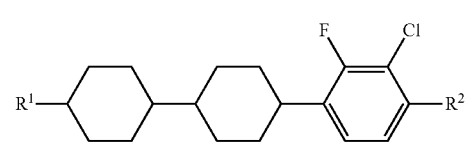 (1-17)

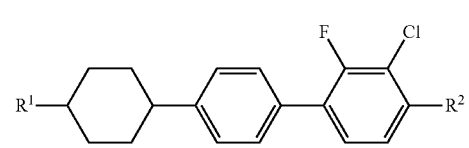 (1-18)

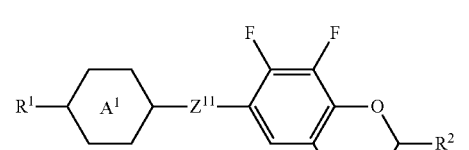 (1-19)

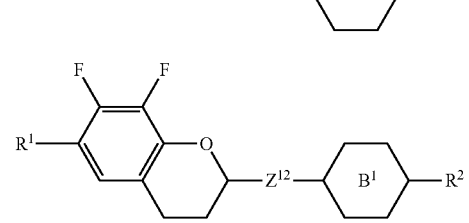 (1-20)

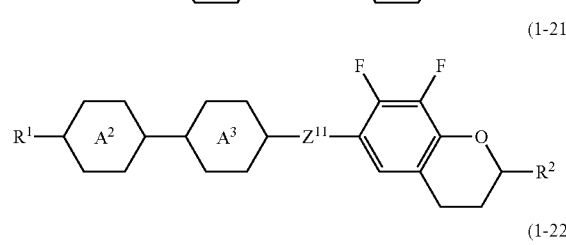 (1-21)

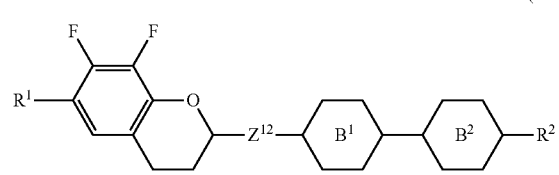 (1-22)

Chemical formula 4:

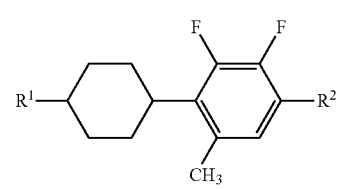 (1-23)

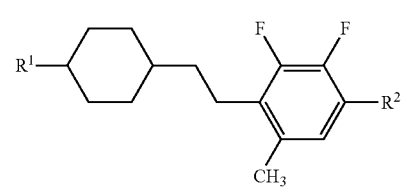 (1-24)

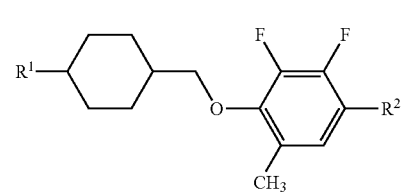 (1-25)

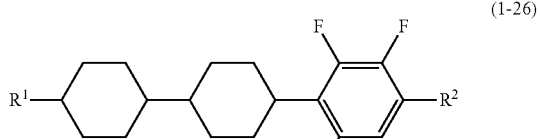 (1-26)

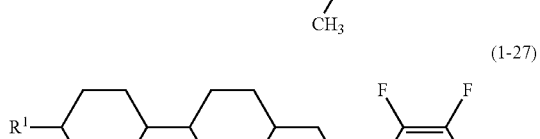 (1-27)

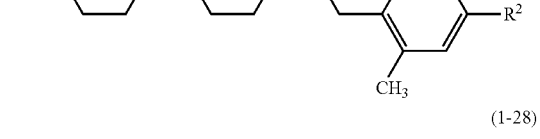 (1-28)

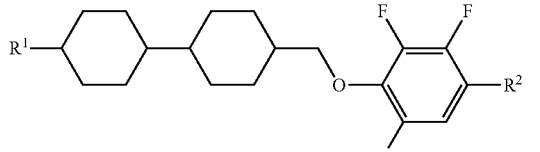 (1-29)

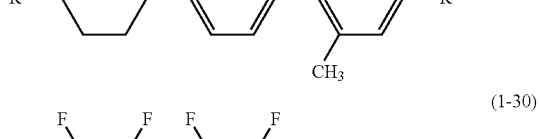 (1-30)

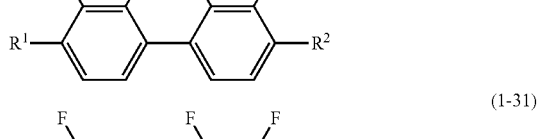 (1-31)

wherein $R^I$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring $A^1$, ring $A^2$, ring $A^3$, ring $B^1$ and ring $B^2$ are independently 1,4-cyclohexylene or 1,4-phenylene; and $Z^{12}$ are independently a single bond, —(CH$_2$)$_2$—, —CH$_2$O— or —COO—.

Item 9. The liquid crystal display element according to item 8, wherein the first component is at least one compound selected from the group of compounds represented by formula (1-1) in the liquid crystal composition.

Item 10. The liquid crystal display element according to item 8, wherein the first component is at least one compound selected from the group of compounds represented by formula (1-2) in the liquid crystal composition.

Item 11. The liquid crystal display element according to item 8, wherein the first component is at least one compound selected from the group of compounds represented by formula (1-4) in the liquid crystal composition.

Item 12. The liquid crystal display element according to item 8, wherein the first component is at least one compound selected from the group of compounds represented by formula (1-6) in the liquid crystal composition.

Item 13. The liquid crystal display element according to item 8, wherein the first component is at least one compound selected from the group of compounds represented by formula (1-7) in the liquid crystal composition.

Item 14. The liquid crystal display element according to item 8, wherein the first component is a mixture of at least one compound selected from the group of compounds represented by formula (1-1) and at least one compound selected from the group of compounds represented by formula (1-4) in the liquid crystal composition.

Item 15. The liquid crystal display element according to item 8, wherein the first component is a mixture of at least one compound selected from the group of compounds represented by formula (1-1) and at least one compound selected from the group of compounds represented by formula (1-7) in the liquid crystal composition.

Item 16. The liquid crystal display element according to item 8, wherein the first component is a mixture of at least one compound selected from the group of compounds represented by formula (1-2) and at least one compound selected from the group of compounds represented by formula (1-4) in the liquid crystal composition.

Item 17. The liquid crystal display element according to item 8, wherein the first component is a mixture of at least one compound selected from the group of compounds represented by formula (1-2) and at least one compound selected from the group of compounds represented by formula (1-7) in the liquid crystal composition.

Item 18. The liquid crystal display element according to item 8, wherein the first component is a mixture of at least one compound selected from the group of compounds represented by formula (1-1) and at least one compound selected from the group of compounds represented by formula (1-12) in the liquid crystal composition.

Item 19. The liquid crystal display element according to any one of items 7 to 18, wherein the liquid crystal composition further contains a liquid crystal compound represented by formula (2) as a second component;

Chemical formula 5:

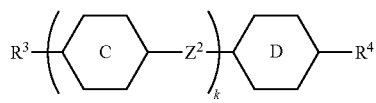

(2)

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring C and ring D are independently 1,4-cyclohexylene, tetrahydropyran-2,5-diyl, 1,3-dioxanediyl, 1,4-phenylene, 2-fluoro-1,4-phenylene, 2,5-difluoro-1,4-phenylene or 2,6-naphthalenediyl; $Z^2$ is independently a single bond, —(CH$_2$)$_2$—, —CH$_2$O—, —COO— or —CF$_2$O—; and k is 1, 2, or 3.

Item 20. The liquid crystal display element according to item 19, wherein the second component is at least one liquid crystal compound selected from the group of liquid crystal compounds represented by formula (2-1) to formula (2-13) in the liquid crystal composition;

Chemical formula 6:

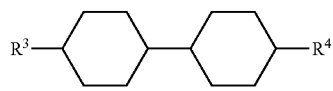

(2-1)

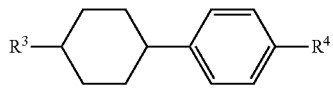

(2-2)

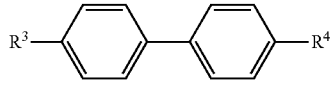

(2-3)

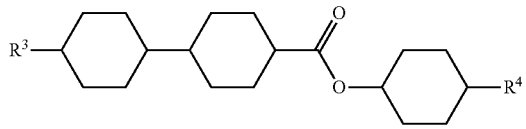

(2-4)

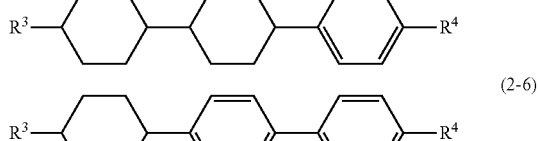

(2-5)

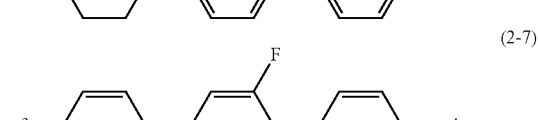

(2-6)

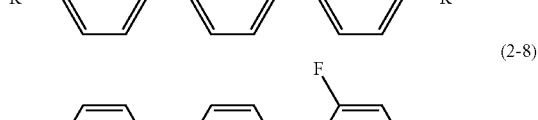

(2-7)

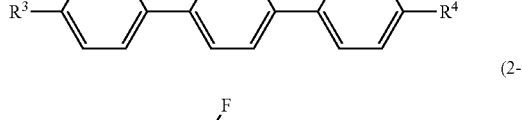

(2-8)

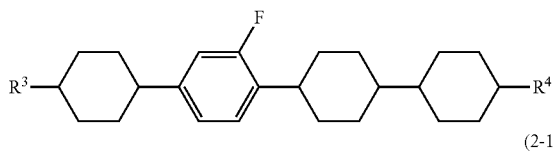

(2-9)

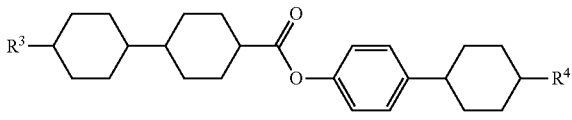

(2-10)

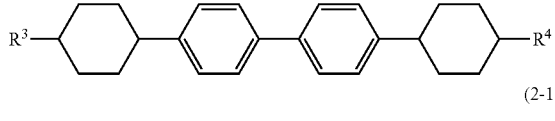

(2-11)

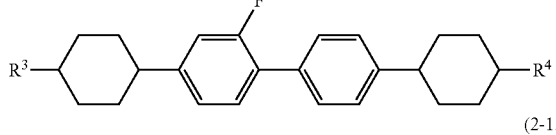

(2-12)

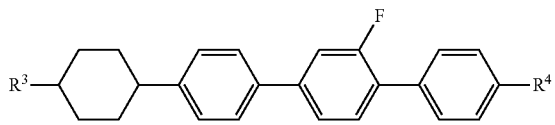

(2-13)

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 21. The liquid crystal display element according to item 20, wherein the second component is at least one compound selected from the group of compounds represented by formula (2-1) in the liquid crystal composition.

Item 22. The liquid crystal display element according to item 20, wherein the second component is at least one compound selected from the group of compounds represented by formula (2-7) in the liquid crystal composition.

Item 23. The liquid crystal display element according to item 20, wherein the second component is at least one compound selected from the group of compounds represented by formula (2-8) in the liquid crystal composition.

Item 24. The liquid crystal display element according to item 20, wherein the second component is at least one compound selected from the group of compounds represented by formula (2-13) in the liquid crystal composition.

Item 25. The liquid crystal display element according to item 20, wherein the second component is a mixture of at least one compound selected from the group of compounds represented by formula (2-1) and at least one compound selected from the group of compounds represented by formula (2-5) in the liquid crystal composition.

Item 26. The liquid crystal display element according to item 20, wherein the second component is a mixture of at least one compound selected from the group of compounds represented by formula (2-1) and at least one compound selected from the group of compounds represented by formula (2-7) in the liquid crystal composition.

Item 27. The liquid crystal display element according to any one of items 19 to 26, wherein a ratio of the first component is in the range of 20% by weight to 80% by weight, and a ratio of the second component is in the range of 20% by weight to 80% by weight in the liquid crystal composition.

Item 28. The liquid crystal display element according to any one of items 1 to 27, wherein the aligning agent is used for display device for exhibiting anisotropy on a surface and immobilizing the anisotropy by light irradiation, and contains at least one (solid content A) selected from a polyimide obtained by allowing a tetracarboxylic dianhydride to react with a diamine, a polyamic acid and a polyamic acid derivative being a precursor thereof, and a photopolymerizable monomer and/or oligomer (solid content B), and a content ratio of the photopolymerizable monomer and/or oligomer (solid content B) is 10% by weight or more based on 100% by weight of an aligning agent solid content (solid content A plus solid content B).

Item 29. The liquid crystal display element according to item 28, wherein content of the photopolymerizable monomer and/or oligomer is 20% by weight or more.

Item 30. An aligning agent used for the liquid crystal display element according to item 28, wherein the polyimide comprising a combination of the diamine and the tetracarboxylic dianhydride or the polyamic acid being the precursor thereof is represented by the following structure (I) or structure (II) in the aligning agent;

Chemical formula 7:

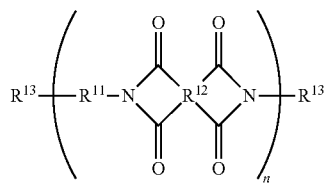

(I)

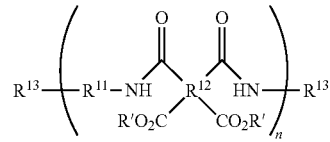

(II)

wherein n is an integer of 10 or more; $R^{11}$ is a divalent organic group; $R^{12}$ is a tetravalent organic group, and the groups may be different for each constitutional unit; $R^{13}$ is a monovalent organic group; and R' is independently hydrogen or alkyl having 1 to 4 carbons.

Item 31. The aligning agent according to item 30, wherein the diamine is at least one diamine selected from the group of compounds represented by formula (III-1) to formula (III-14), or a mixture of the diamine and any other diamine in the aligning agent;

Chemical formula 8:

 (III-1)

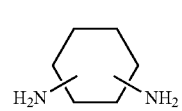 (III-2)

 (III-3)

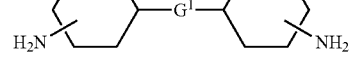 (III-4)

 (III-5)

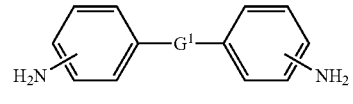 (III-6)

 (III-7)

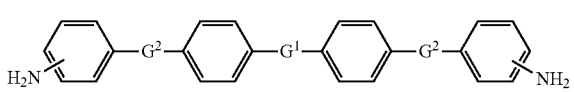

wherein m is independently an integer from 1 to 12; $G^1$ is independently a single bond, —O—, —S—, —S—S—, —SO$_2$—, —CO$_2$—, —CONH—, —NHCO—, —C(CH$_3$)$_2$—, —C(CF$_3$)$_2$—, —(CH$_2$)$_m$—, —O—(CH$_2$)$_m$—O— or —S—(CH$_2$)$_m$—S—; $G^2$ is independently a single bond, —O—, —S—, —CO—, —C(CH$_3$)$_2$—, —C(CF$_3$)$_2$— or alkylene having 1 to 3 carbons; arbitrary hydrogen of a cyclohexane ring and a benzene ring may be replaced by fluorine or —CH$_3$, and a position of bonding an NH$_2$ group to the cyclohexane ring or the benzene ring is arbitrary except a position of bonding with $G^1$ or $G^2$;

Chemical formula 9:

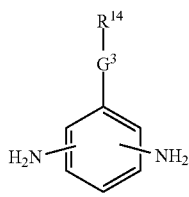
(III-8)

wherein, in formula (III-8), $G^3$ is a single bond, —O—, —COO—, —OCO—, —CO—, —CONH— or —(CH$_2$)$_m$—, m is an integer from 1 to 12; $R^{14}$ is alkyl having 3 to 20 carbons, a phenyl group or a group represented by formula (III-8-a), and in the alkyl, arbitrary hydrogen may be replaced by fluorine, and arbitrary —CH$_2$— may be replaced by —O—, —CH=CH— or —C≡C—, and hydrogen of the phenyl may replaced by —F, —CH$_3$, —OCH$_3$, —OCH$_2$F, —OCHF$_2$ or —OCF$_3$; and a position of bonding an NH$_2$ group to a benzene ring is arbitrary;

Chemical formula 10:

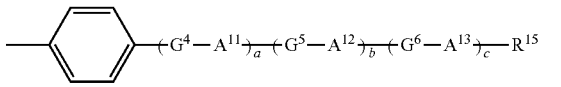
(III-8-a)

wherein $R^{15}$ is hydrogen, fluorine, alkyl having 1 to 20 carbons, fluorine-substituted alkyl having 1 to 20 carbons, alkoxy having 1 to 20 carbons, —CN, —OCH$_2$F, —OCHF$_2$ or —OCF$_3$; $G^4$, $G^5$ and $G^6$ are a bonding group, and independently a single bond, —O—, —COO—, —OCO—, —CONH—, —CH=CH— or alkylene having 1 to 12 carbons; $A^{11}$, $A^{12}$ and $A^{13}$ are a ring, and independently 1,4-phenylene, 1,4-cyclohexylene, 1,3-dioxane-2,5-diyl, pyrimidine-2,5-diyl, pyridine-2,5-diyl, naphthalene-1,5-diyl, naphthalene-2,6-diyl or anthracene-9,10-diyl, and in all the rings, arbitrary hydrogen may be replaced by fluorine or —CH$_3$; a, b and c are independently an integer from 0 to 2, and a sum thereof is 1 to 5, and when a, b or c is 2, two of bonding groups may be identical or different, and two of rings may be identical or different;

Chemical formula 11:

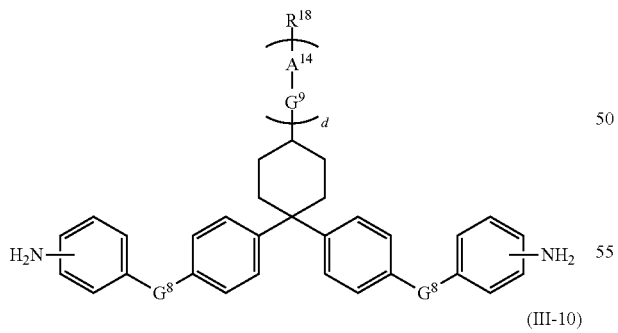
(III-9)

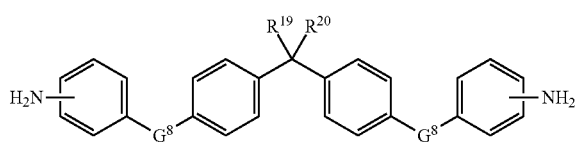
(III-10)

wherein, in formula (III-9) and formula (III-10), $R^{18}$ is hydrogen or alkyl having 1 to 20 carbons, and arbitrary —CH$_2$— in the alkyl may be replaced by —O—, —CH=CH— or —C≡C—; $R^{19}$ is alkyl having 6 to 22 carbons; $R^{20}$ is hydrogen or alkyl having 1 to 22 carbons; $G^8$ is —O— or alkylene having 1 to 6 carbons; $A^{14}$ is 1,4-phenylene or 1,4-cyclohexylene; $G^9$ is a single bond or alkylene having 1 to 3 carbons; d is 0 or 1; and a position of bonding an amino group to a benzene ring is arbitrary;

Chemical formula 12:

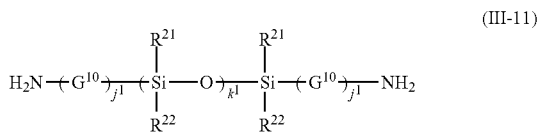
(III-11)

wherein, in formula (III-11), $R^{21}$ and $R^{22}$ are independently alkyl having 1 to 3 carbons or phenyl; $G^{10}$ is methylene, phenylene or alkyl-substituted phenylene; $j^1$ is an integer from 1 to 6; and $k^1$ is an integer from 1 to 10;

Chemical formula 13:

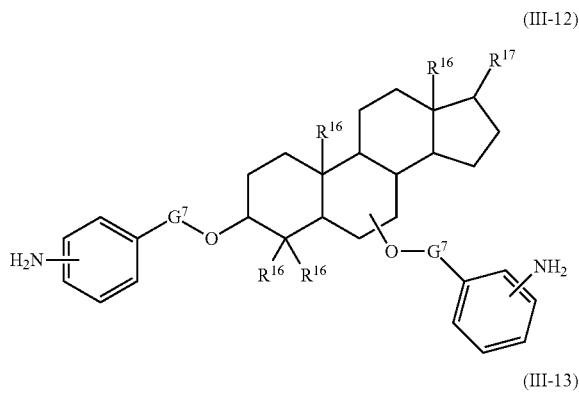
(III-12)

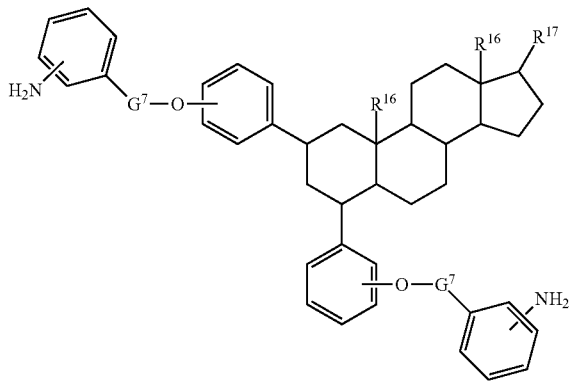
(III-13)

wherein, in formula (III-12) and formula (III-13), $R^{16}$ is independently hydrogen or —CH$_3$; $R^{17}$ is independently hydrogen, alkyl having 1 to 20 carbons or alkenyl having 2 to 20 carbons; $G^7$ is independently a single bond, —CO— or —CH$_2$—; one of hydrogen of a benzene ring in formula (III-13) may be replaced by alkyl having 1 to 20 carbons or phenyl; and as for a group of which bonding position is not fixed to any one of carbon atoms constituting a ring, the bonding position is arbitrary;

Chemical formula 14:

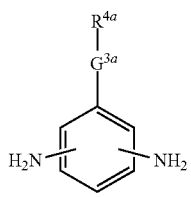

(III-14)

wherein, in formula (III-14), $G^{3a}$ is a single bond, —O—, —COO—, —OCO—, —CO—, —CONH— or —$(CH_2)_m$—, m is an integer from 1 to 12; $R^{4a}$ is a group represented by any one of formula (III-14-a) to formula (III-14-d);

Chemical formula 15:

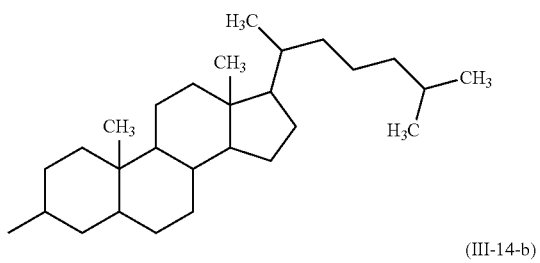

(III-14-a)

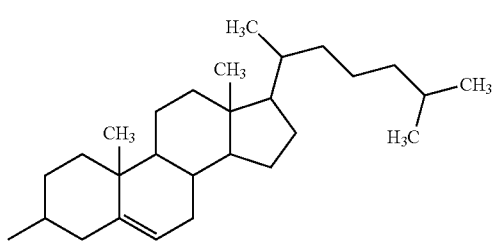

(III-14-b)

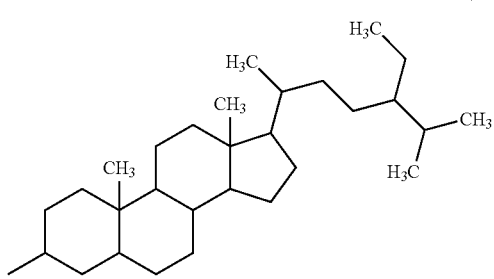

(III-14-c)

(III-14-d)

Item 32. The aligning agent according to item 31, wherein the diamine is at least one compound selected from the group of compounds represented by formula (III-1) to formula (III-11) in the aligning agent.

Item 33. The aligning agent according to item 31, wherein the diamine is at least one compound selected from the group of compounds represented by formula (III-12) to formula (III-14) in the aligning agent.

Item 34. The aligning agent according to item 30, wherein, in formula (I) or formula (II), a residue of tetracarboxylic dianhydride is at least one tetracarboxylic dianhydride selected from the group of compounds represented by each of the following formula (IV-1) to formula (IV-12), or a mixture of the tetracarboxylic dianhydride with any other tetracarboxylic dianhydride in the aligning agent;

Chemical formula 16:

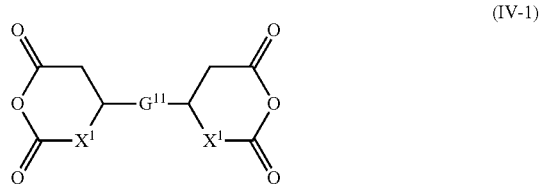

(IV-1)

wherein, in formula (IV-1), $G^{11}$ is a single bond, alkylene having 1 to 12 carbons, 1,4-phenylene or 1,4-cyclohexylene; and $X^1$ is each independently a single bond or —$CH_2$—;

Chemical formula 17:

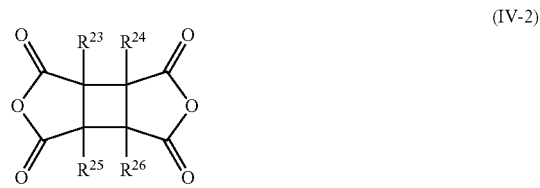

(IV-2)

wherein, in formula (IV-2), $R^{23}$, $R^{24}$, $R^{25}$ and $R^{26}$ are independently hydrogen, methyl, ethyl or phenyl;

Chemical formula 18:

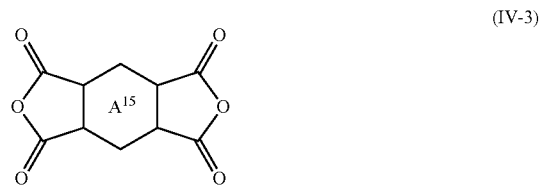

(IV-3)

wherein, in formula (IV-3), ring $A^{15}$ is a cyclohexane ring or a benzene ring;

Chemical formula 19:

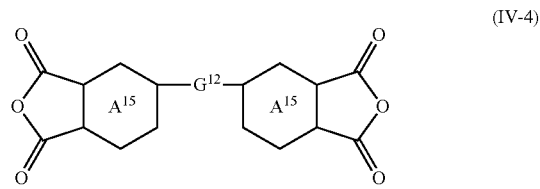

(IV-4)

wherein, in formula (IV-4), $G^{12}$ is a single bond, —$CH_2$—, —$CH_2CH_2$—, —O—, —CO—, —S—, —$C(CH_3)_2$—, —SO— or —C(CF$_3$)$_2$—; and ring A$^{15}$ is each independently a cyclohexane ring or a benzene ring;

Chemical formula 20:

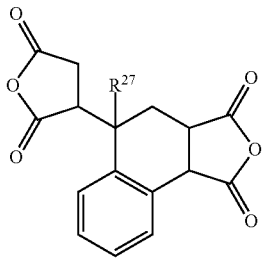

(IV-5)

wherein, in formula (IV-5), R$^{27}$ is hydrogen or methyl;

Chemical formula 21:

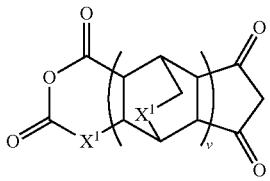

(IV-6)

wherein, in formula (IV-6), X$^1$ is each independently a single bond or —CH$_2$—; and v is 1 or 2;

Chemical formula 22:

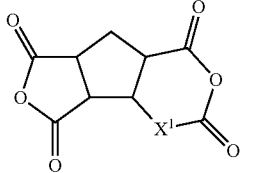

(IV-7)

wherein, in formula (IV-7), X$^1$ is a single bond or —CH$_2$—;

Chemical formula 23:

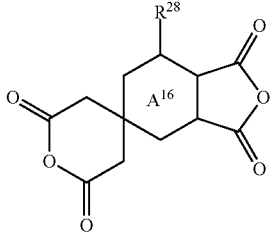

(IV-8)

wherein, in formula (IV-8), R$^{28}$ is hydrogen, methyl, ethyl or phenyl; and ring A$^{16}$ is a cyclohexane ring or a cyclohexene ring;

Chemical formula 24:

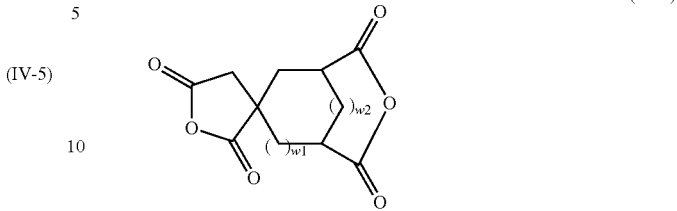

(IV-9)

wherein, in formula (IV-9), w1 and w2 are 0 or 1;

Chemical formula 25:

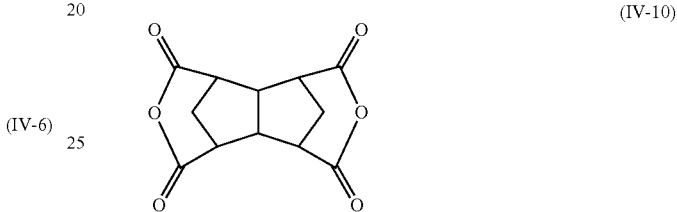

(IV-10)

Chemical formula 26:

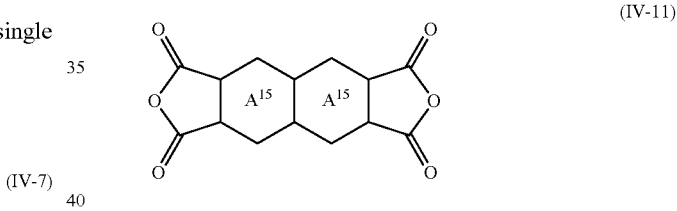

(IV-11)

wherein, in formula (IV-11), ring A$^{15}$ is each independently a cyclohexane ring or a benzene ring;

Chemical formula 27:

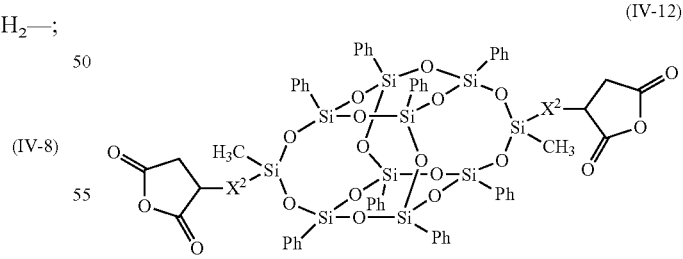

(IV-12)

wherein, in formula (IV-12), X$^2$ is independently alkyl having 2 to 6 carbons.

Item 35. The aligning agent according to item 30, wherein, in formula (I) or formula (II), a residue of tetracarboxylic dianhydride is at least one compound selected from the group of compounds represented by the following formula (IV-1-1) to formula (IV-12-1) in the aligning agent;

Chemical formula 28:

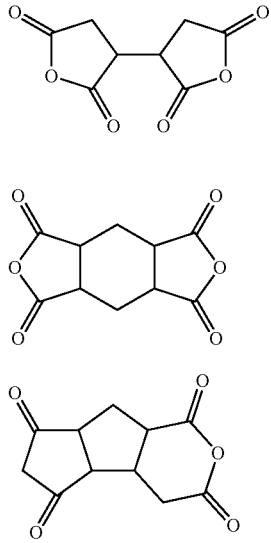

(IV-1-1) (IV-2-1) (IV-3-1) (IV-3-2) (IV-7-1) (IV-10-1)

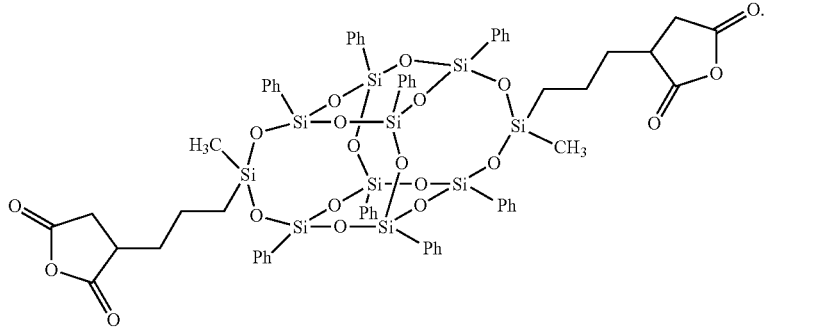

(IV-12-1)

Item 36. The liquid crystal display element according to any one of items 6 to 29, wherein the reactive monomer is a photopolymerizable monomer being at least one compound selected from the group of compounds represented by formula (3):

R$^{a1}$—Z-(E-Z)$_{m1}$—R$^{a1}$ (3)

Wherein, R$^{a1}$ is independently a polymerizable group represented by the following formula (3-1-1) to formula (3-1-6), hydrogen, halogen, cyano, —CF$_3$, —CF$_2$H, —CFH$_2$, —OCF$_3$, —OCF$_2$H, —N═C═O, —N═C═S or alkyl having 1 to 20 carbons, and in the alkyl, arbitrary —CH$_2$— may be replaced by —O—, —S—, —SO$_2$—, —CO—, —COO—, —OCO—, —CH═CH—, —CF═CF— or —C≡C—, arbitrary hydrogen may be replaced by halogen or cyano, and at least one of R$^{a1}$ is a polymerizable group represented by formula (3-1-1) to formula (3-1-6); ring E is a saturated or unsaturated independent ring having 3 to 10 carbons, a condensed ring or a spiro ring divalent group, and in the rings, arbitrary —CH$_2$— may be replaced by —O—, arbitrary —CH═ may be replaced by —N═, arbitrary hydrogen may be replaced by halogen, cyano, nitro, isocyano, isothiocyanato, silyl monosubstituted to trisubstituted by alkyl having 1 to 4 carbons, straight-chain or branched-chain alkyl having 1 to 10 carbons or alkyl halide having 1 to 10 carbons, and in the alkyl, arbitrary —CH$_2$— may be replaced by —O—, —CO—, —COO—, —OCO—, —OCOO—, —CH═CH— or —C≡C—; Z is independently a single bond or alkylene having 1 to 20 carbons, and in the alkylene, arbitrary —CH$_2$— may be replaced by —O—, —S—, —CO—, —COO—, —OCO—, —OCOO—, —CH═CH—, —CF═CF—, —CH═N—, —N(O)═N— or —C≡C—, and arbitrary hydrogen may be replaced by halogen; and m1 is an integer from 1 to 6; when m1 is an integer from 2 to 6, a plurality of E-Z in a parenthesis may be identical or different;

Chemical formula 29:

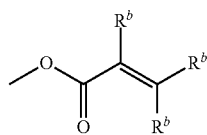

(3-1-1)

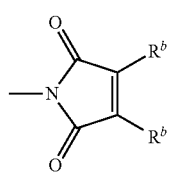

(3-1-2)

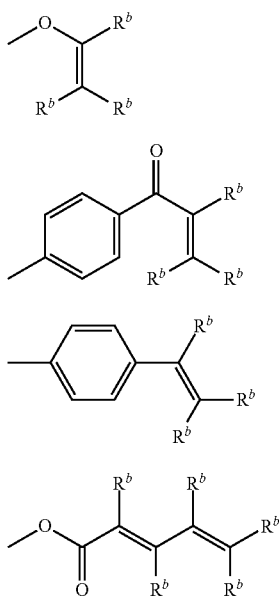

wherein, $R^b$ is hydrogen, halogen, —$CF_3$ or alkyl having 1 to 5 carbons.

Item 37. The liquid crystal display element according to item 36, wherein $R^{a1}$ is independently acrylate, methacrylate, styrene, acrylamide or methacrylamide in formula (3) in the photopolymerizable monomer.

Item 38. The liquid crystal display element according to any one of items 6 to 29, 36 or 37, wherein the aligning agent or the liquid crystal layer further contains an initiator and a polymerization inhibitor.

Item 39. The liquid crystal display element according to any one of items 1 to 29, wherein the reactive monomer or oligomer is a photopolymerizable monomer or oligomer, or a thermally polymerizable monomer or oligomer.

Item 40. The liquid crystal display element according to item 36 or 37, wherein the photopolymerizable monomer or oligomer is subjected to photopolymerization by ultraviolet light irradiation in the range of 1,000 to 100,000 mJ/cm².

Item 41. The liquid crystal display element according to item 40, wherein 50% by weight or more of the photopolymerizable monomer or oligomer is allowed to remain as a monomer or oligomer without thermal polymerization at a calcination temperature in the range of 100 to 230° C. before the photopolymerizable monomer or oligomer is photopolymerized.

Item 42. The liquid crystal display element according to item 41, wherein the calcination temperature is in the range of 180 to 230° C.

Item 43. A liquid crystal composition, in the liquid crystal display element according to any one of items 6 to 27.

Item 44. A method for producing the liquid crystal display element according to any one of items 1 to 29 or 36 to 42.

Item 45. Use of the liquid crystal composition, in the liquid crystal display element according to any one of items 6 to 27.

The invention further includes the following items: (1) a device using the composition further containing the optically active compound; (2) a device using the composition further containing the additive such as an antioxidant, an ultraviolet light absorber or an antifoaming agent; (3) an AM device containing the composition; (4) a device containing the composition, and having a TN, ECB, IPS or VA mode; (5) a transmissive device containing the composition; (6) use of the composition as the liquid crystal composition having the nematic phase in the device; and (7) use as an optically active composition prepared by addition of the optically active compound to the composition.

As described below, the liquid crystal composition used in the invention includes a composition having characteristics such as a high maximum temperature of a nematic phase, a low minimum temperature of the nematic phase, a small viscosity, a suitable optical anisotropy, a large negative dielectric anisotropy or a large positive dielectric anisotropy, a large specific resistance, a high stability to heat or ultraviolet light and a small content of an impurity, and is a liquid crystal composition having a suitable balance regarding at least two of the characteristics. Furthermore, the reactive monomer or oligomer used in the invention has solubility to the aligning agent and a high capability for aligning the liquid crystal molecules.

Furthermore, use of the reactive monomer or oligomer of the invention allows to widely correspond to a process for manufacturing a cell, and to manufacture a liquid crystal display element with a low level of a poor display and a high quality level by a small content of the impurity such as an unreacted monomer or oligomer in the liquid crystal composition.

The composition used in the invention will be explained in the following order. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained.

Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive and the impurity. "Any other liquid crystal compound" means a liquid crystal compound different from compound (1) and compound (2). Such a compound is mixed with the composition for the purpose of further adjusting the characteristics. Of any other liquid crystal compounds, a ratio of a cyano compound is preferably as small as possible in view of stability to heat or ultraviolet light. A further preferred ratio of the cyano compound is 0% by weight.

The additive includes the optically active compound, the antioxidant, the ultraviolet light absorber, a coloring matter, the antifoaming agent, the polymerizable compound and the polymerization initiator. The impurity includes a compound mixed in a process such as preparation of the component compounds. Even in the case where the compound is liquid crystalline, the compound is classified as the impurity herein.

Composition B consists essentially of compound (1) and compound (2). A term "essentially" means that the composition does not contain any liquid crystal compound different from the compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of characteristics of a liquid crystal compound of the invention. In a symbol in Table 2, a symbol L stands for "large" or "high," a symbol M stands for "medium," and a symbol S stands for "small" or "low." The symbols L, M and S represent a classification based on a qualitative comparison among the component compounds.

TABLE 2

Characteristics of Liquid Crystal Compounds

| Compounds | Compound (1) | Compound (2) |
| --- | --- | --- |
| Maximum Temperature | S to L | S to L |
| Viscosity | M to L | S to M |
| Optical Anisotropy | M to L | S to L |
| Dielectric Anisotropy | M to L | S |
| Specific Resistance | L | L |

Upon mixing the component compounds with the composition, the main effects of the component compounds on the characteristics of the composition are as described below. Compound (1) increases an absolute value of the dielectric anisotropy and decreases the minimum temperature. Compound (2) decreases viscosity and increases the maximum temperature.

Third, the combination of the components in the composition, the preferred ratio of the component compounds and the basis thereof will be explained. The combination of the components in the composition includes the first component and a combination of the first component and the second component.

A preferred ratio of the first component is 20% by weight or more for increasing the absolute value of the dielectric anisotropy, and 80% by weight or less for decreasing the minimum temperature. A further preferred ratio is in the range of 30% by weight to 70% by weight. A particularly preferred ratio is in the range of 40% by weight to 60% by weight.

A preferred ratio of the second component is 20% by weight or more for decreasing the viscosity or increasing the maximum temperature, and 80% by weight or less for increasing the absolute value of the dielectric anisotropy. A further preferred ratio is in the range of 30% by weight to 75% by weight. A particularly preferred ratio is in the range of 40% by weight to 70% by weight.

Fourth, the preferred embodiment of the component compounds will be explained.

$R^1$, $R^2$, $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine. Preferred $R^1$ or $R^2$ is alkyl having 1 to 12 carbons for increasing the stability to ultraviolet light or heat, or the like, or alkoxy having 1 to 12 carbons for increasing the absolute value of the dielectric anisotropy. Preferred $R^3$ or $R^4$ is alkyl having 1 to 12 carbons for increasing the stability to ultraviolet light or heat, or the like, or alkenyl having 2 to 12 carbons for decreasing the viscosity.

Preferred alkyl is methyl, ethyl, propyl, butyl, pentyl, hexyl, heptyl or octyl. Further preferred alkyl is ethyl, propyl, butyl, pentyl or heptyl for decreasing the viscosity Preferred alkoxy is methoxy, ethoxy, propoxy, butoxy, pentyloxy, hexyloxy or heptyloxy. Further preferred alkoxy is methoxy or ethoxy for decreasing the viscosity Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity. Cis is preferred in the alkenyl such as 2-butenyl, 2-pentenyl and 2-hexenyl. In the alkenyl, straight-chain alkenyl is preferred to branched-chain alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity Ring A and ring B are independently 1,4-cyclohexylene, tetrahydropyran-2,5-diyl, 1,3-dioxane-2,5-diyl, 1,4-phenylene, 2-fluoro-1,4-phenylene, 2,5-difluoro-1,4-phenylene, 2,3-difluoro-1,4-phenylene, 2-fluoro-3-chloro-1,4-phenylene, 2,3-difluoro-6-methyl-1,4-phenylene, 2,6-naphthalenediyl and 7,8-difluorochroman-2,6-diyl. Herein, at least one of ring A and ring B is 2,3-difluoro-1,4-phenylene, 2-fluoro-3-chloro-1,4-phenylene, 2,3-difluoro-6-methyl-1,4-phenylene or 7,8-difluorochroman-2,6-diyl, and when j is 2 or 3, two of arbitrary ring A may be identical or different. Preferred ring A and ring B each are 2,3-difluoro-1,4-phenylene or tetrahydropyran-2,5-diyl for increasing the dielectric anisotropy, and 1,4-cyclohexylene for decreasing the viscosity Ring $A^1$, ring $A^2$, ring $A^3$, ring $B^1$ and ring $B^2$ are independently 1,4-cyclohexylene or 1,4-phenylene. Preferred ring $A^1$, ring $A^2$, ring $A^3$, ring $B^1$ and ring $B^2$ each are 1,4-cyclohexylene for decreasing the viscosity Ring C and ring D are independently 1,4-cyclohexylene, tetrahydropyran-2,5-diyl, 1,3-dioxanediyl, 1,4-phenylene, 2-fluoro-1,4-phenylene, 2,5-difluoro-1,4-phenylene or 2,6-naphthalenediyl, and when k is 2 or 3, two of arbitrary ring C may be identical or different.

Preferred ring C and ring D each are 1,4-phenylene for increasing the optical anisotropy, and 1,4-cyclohexylene for decreasing the viscosity $Z^1$ and $Z^2$ are independently a single bond, —(CH$_2$)$_2$—, —CH$_2$O—, —COO— and —CF$_2$O—, and when j is 2 or 3, two of arbitrary $Z^1$ may be identical or different, and when k is 2 or 3, two of arbitrary $Z^2$ may be identical or different, and preferred $Z^1$ and $Z^2$ are —CH$_2$O— for increasing the dielectric anisotropy, and a single bond for decreasing the viscosity $Z^{11}$ and $Z^{12}$ are independently a single bond, —(CH$_2$)$_2$—, —CH$_2$O—, or —COO—. Preferred $Z^{11}$ and $Z^{12}$ are —CH$_2$O— for increasing the dielectric anisotropy, and a single bond for decreasing the viscosity Then, j is 1, 2, or 3. Preferred j is 1 for decreasing the minimum temperature, and 2 for increasing the maximum temperature. Moreover, k is 1, 2 or 3. Preferred k is 1 for decreasing the viscosity, and 3 for increasing the maximum temperature.

Fifth, the specific examples of the component compounds will be shown. In the preferred compounds described below, $R^5$ and $R^6$ each are straight-chain alkyl having 1 to 12 carbons, straight-chain alkoxy having 1 to 12 carbons or straight-chain alkenyl having 2 to 12 carbons. $R^7$ is straight-chain alkyl having 1 to 12 carbons or straight-chain alkenyl having 2 to 12 carbons. $R^8$ is straight-chain alkyl having 1 to 12 carbons, straight-chain alkenyl having 2 to 12 carbons or straight-chain alkoxy having 1 to 12 carbons. In the compounds, a configuration with regard to 1,4-cyclohexylene is preferably trans to cis for increasing the maximum temperature.

Preferred compound (1) includes compound (1-1-1) to compound (1-31-1). Further preferred compound (1) includes compound (1-1-1) to compound (1-18-1) and compound (1-21-3). Particularly preferred compound (1) includes compound (1-1-1) to compound (1-7-1), compound (1-11-1) to compound (1-17-1) and compound (1-21-3).

Preferred compound (2) includes compound (2-1-1) to compound (2-13-1). Further preferred compound (2) includes compound (2-1-1) to compound (2-3-1) and compound (2-5-1) to compound (2-13-1). Particularly preferred compound (2) includes compound (2-1-1), compound (2-5-1), compound (2-7-1), compound (2-8-1) and compound (2-13-1).

Chemical formula 30:

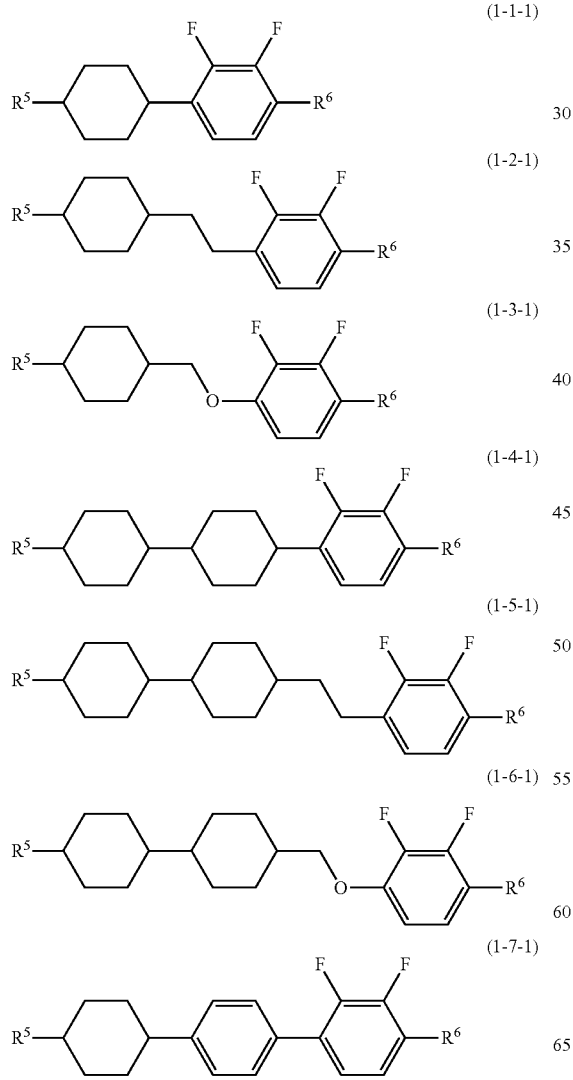

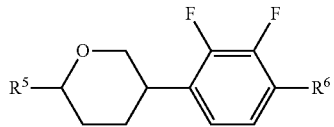

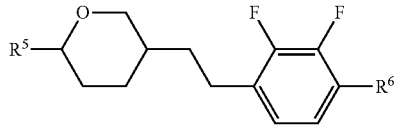

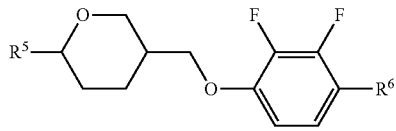

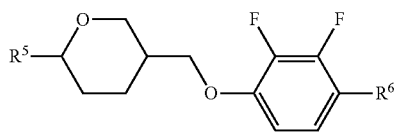

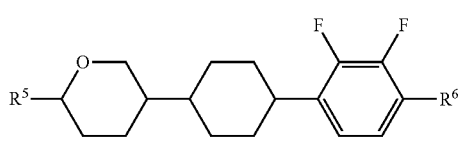

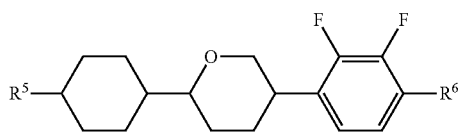

Chemical formula 31:

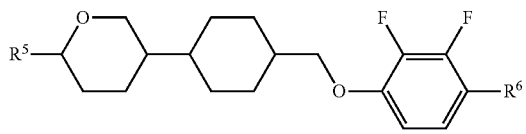

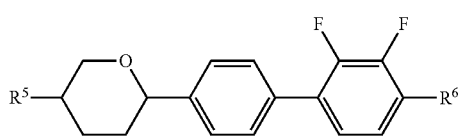

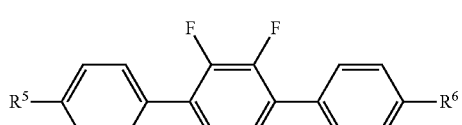

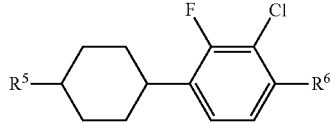

(1-17-1)
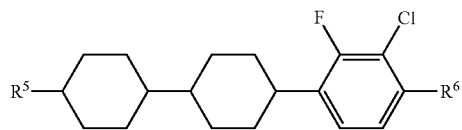
(1-18-1)
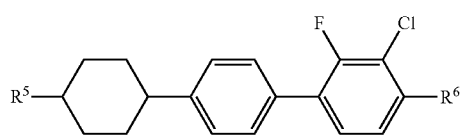
(1-19-1)
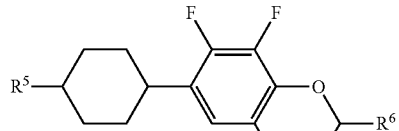
(1-19-2)
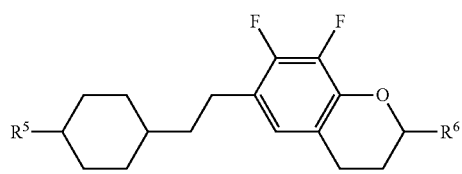
(1-19-3)
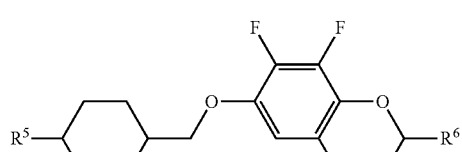
(1-19-4)
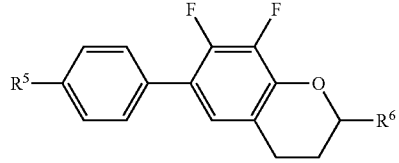
Chemical formula 32:
(1-20-1)
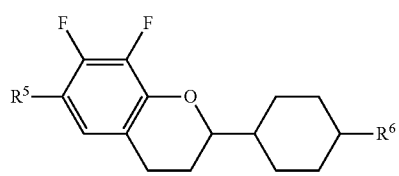
(1-20-2)
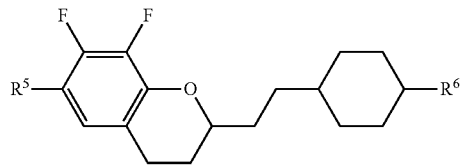
(1-21-1)
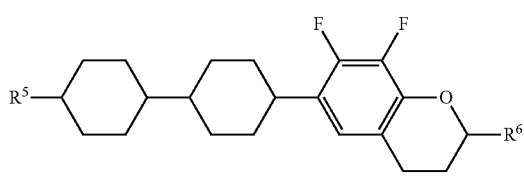
(1-21-2)
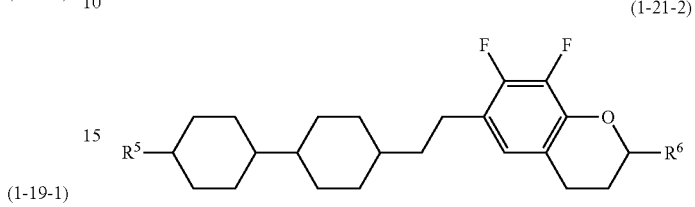
(1-21-3)
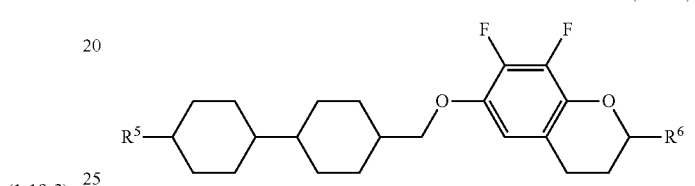
(1-21-4)
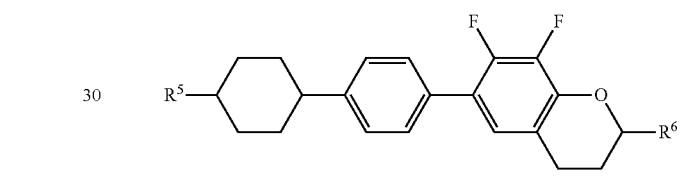
(1-21-5)
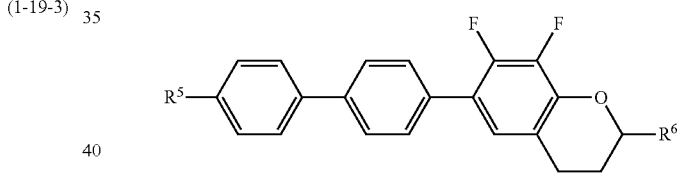
(1-22-1)
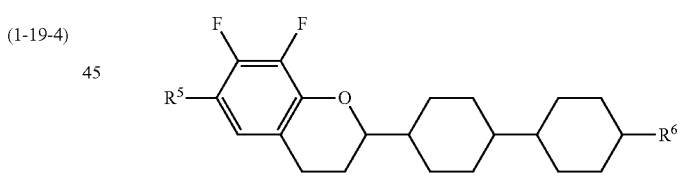
(1-22-2)
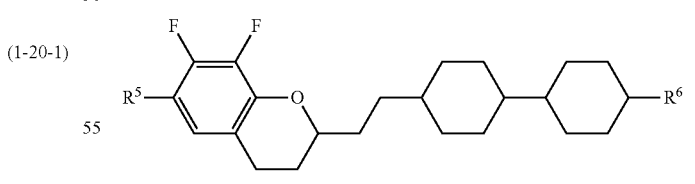
Chemical formula 33:
(1-23-1)
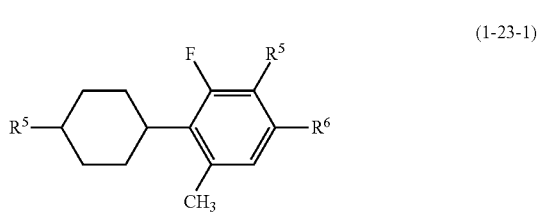

(1-24-1)
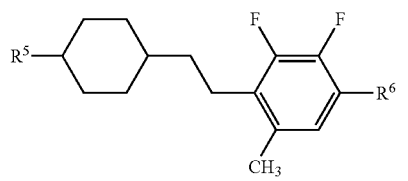
(1-25-1)
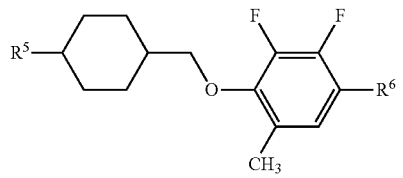
(1-26-1)
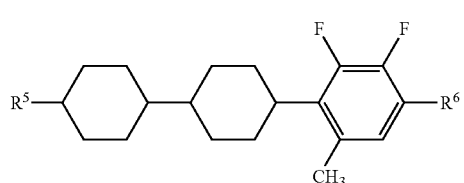
(1-27-1)
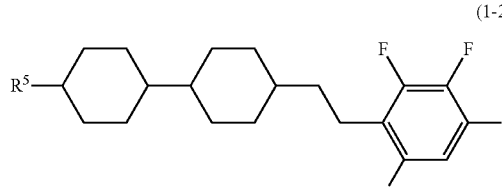
(1-28-1)
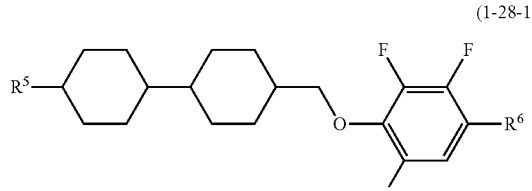
(1-29-1)
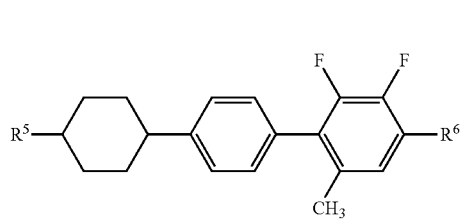
(1-30-1)
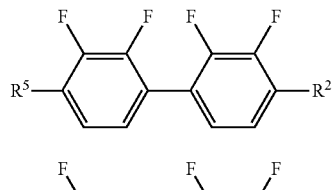
(1-31-1)
Chemical formula 34:
(2-1-1)
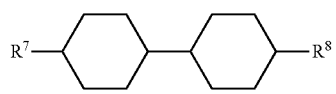
(2-2-1)
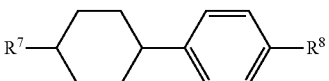
(2-3-1)
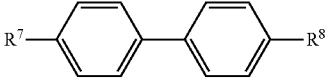
(2-4-1)
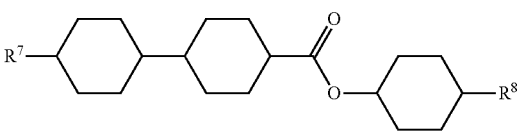
(2-5-1)
(2-6-1)
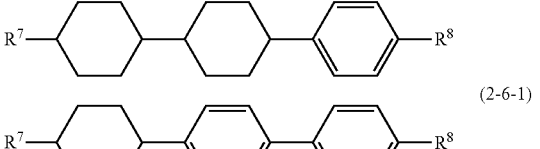
(2-7-1)
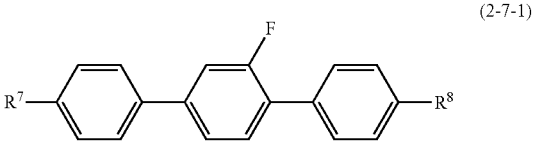
(2-8-1)
(2-9-1)
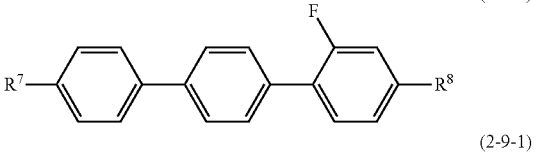
(2-10-1)
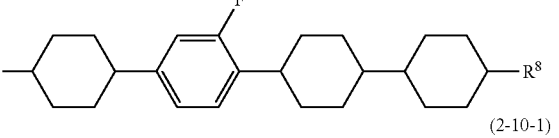
(2-11-1)
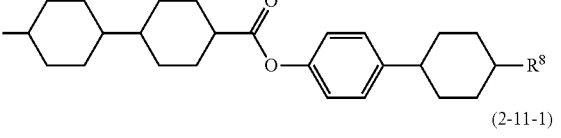
(2-12-1)
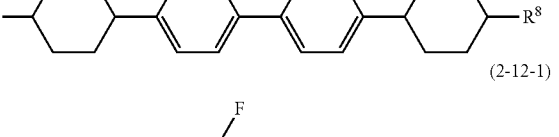
(2-13-1)
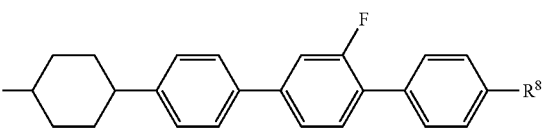
The aligning agent is used for the display device for exhibiting the anisotropy on the surface and immobilizing the anisotropy by light irradiation, contains at least one selected from the polyimide obtained by allowing the tetracarboxylic dianhydride to react with the diamine, the polyamic acid and the polyamic acid derivative being the precursor thereof, and the photopolymerizable monomer and/or oligomer as the components.

Examples of preferred diamines include a compound selected from the group of compounds represented by each of formula (III-1) to formula (III-7). Then, at least one of the diamines may be selected from the diamines and used, or the diamine and any other diamine (diamine other than compound (III-1) to compound (III-7)) may be mixed and used.

Chemical formula 35:

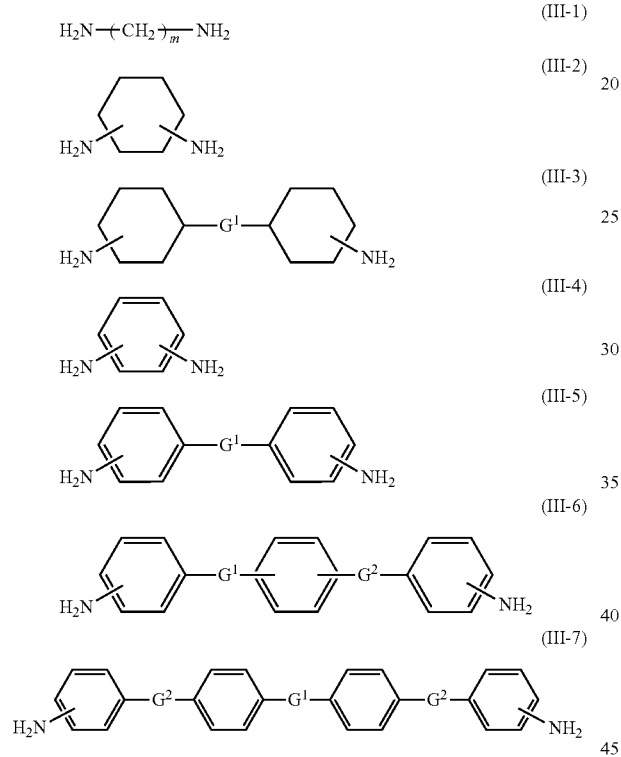

In formula (III-1) to formula (III-7), m is an integer from 1 to 12; $G^1$ is independently a single bond, —O—, —S—, —S—S—, —SO$_2$—, —CO—, —CONH—, —NHCO—, —C(CH$_3$)$_2$—, —C(CF$_3$)$_2$—, —(CH$_2$)$_m$—, —O—(CH$_2$)$_m$—O—, or —S—(CH$_2$)$_m$—S—, and m is an integer from 1 to 12; $G^2$ is independently a single bond, —O—, —S—, —CO—, —C(CH$_3$)$_2$—, —C(CF$_3$)$_2$— or alkylene having 1 to 3 carbons; arbitrary hydrogen of a cyclohexane ring and a benzene ring may be replaced by fluorine or —CH$_3$; a position of bonding an NH$_2$ group to a cyclohexane ring or a benzene ring is arbitrary except a position of bonding with $G^1$ or $G^2$.

Examples of compound (III-1) to compound (III-3) are shown below.

Chemical formula 36:

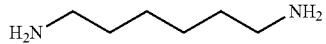

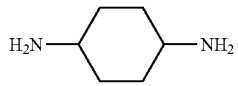

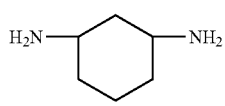

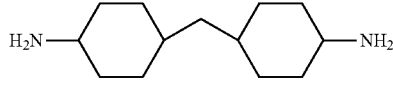

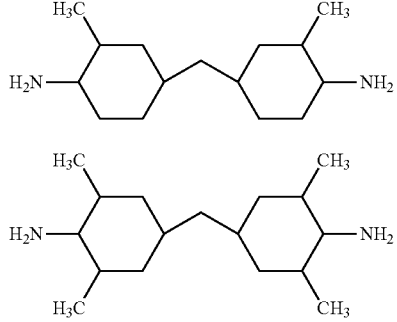

Examples of compound (III-4) are shown below.

Chemical formula 37:

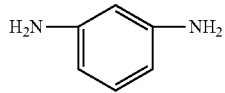

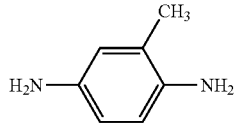

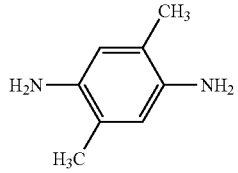

(III-4-5) 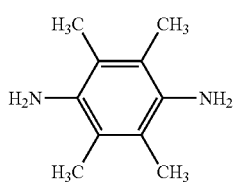
Examples of compound (III-5) are shown below.
Chemical formula 38:
(III-5-1) 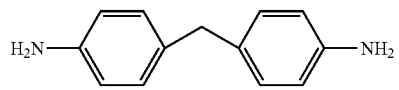
(III-5-2) 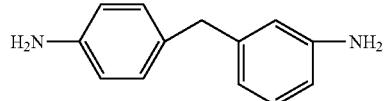
(III-5-3) 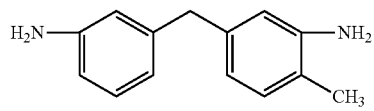
(III-5-4) 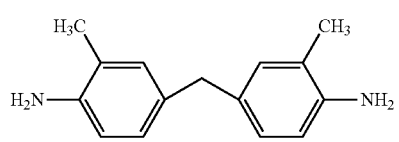
(III-5-5) 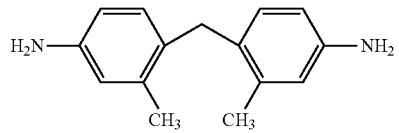
(III-5-6) 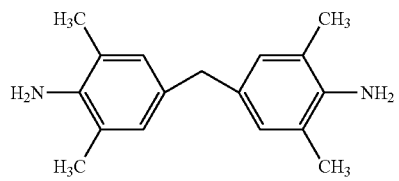
(III-5-7) 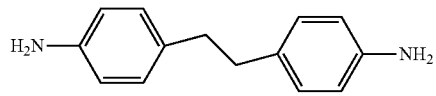
(III-5-8) 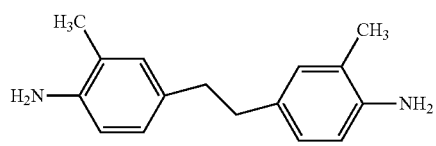
(III-5-9) 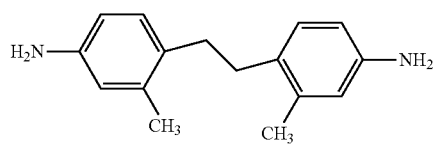
(III-5-10) 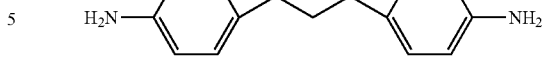
(III-5-11) 
(III-5-12) 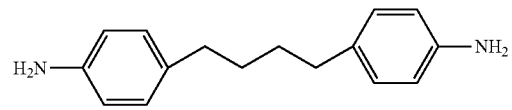
(III-5-13) 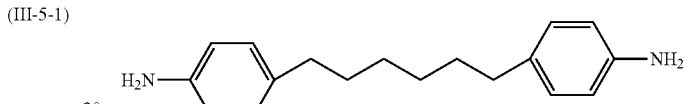
(III-5-14) 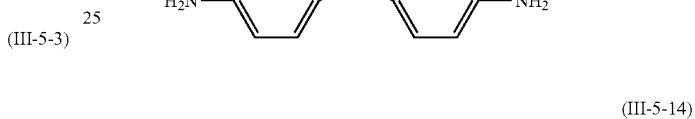
(III-5-15) 
(III-5-16) 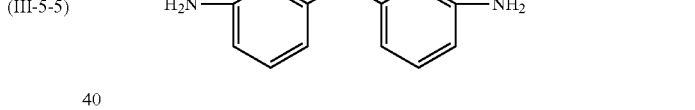
(III-5-17) 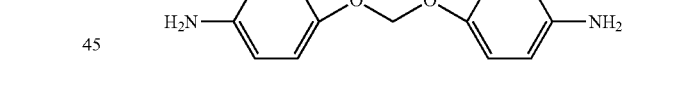
(III-5-18) 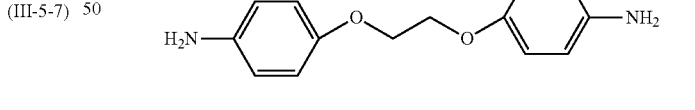
(III-5-19) 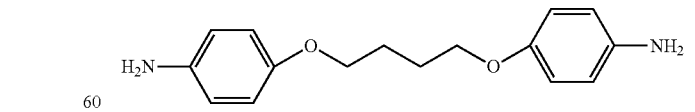

-continued

Chemical formula 39:

(III-5-20) H₂N–⌬–S–⌬–NH₂

(III-5-21) H₂N–⌬–S–S–⌬–NH₂

(III-5-22) H₂N–⌬–S–CH₂–S–⌬–NH₂

(III-5-23) H₂N–⌬–S–(CH₂)₂–S–⌬–NH₂

(III-5-24) H₂N–⌬–S–(CH₂)₄–S–⌬–NH₂

(III-5-25) H₂N–⌬–S–(CH₂)₅–S–⌬–NH₂

(III-5-26) 2,2'-dimethyl biphenyl diamine (III-5-27) H₂N–⌬–C(CH₃)₂–⌬–NH₂

(III-5-28) H₂N–⌬–C(CF₃)₂–⌬–NH₂

-continued (III-5-29) H₂N–⌬–C(=O)–⌬–NH₂

(III-5-30) H₂N–⌬–S(=O)₂–⌬–NH₂

Examples of compound (III-6) are shown below.

Chemical formula 40:

(III-6-1) H₂N–⌬–CH₂–⌬–CH₂–⌬–NH₂

(III-6-2) H₂N–⌬–CH₂CH₂–⌬–CH₂CH₂–⌬–NH₂

(III-6-3) H₂N–⌬–O–⌬–O–⌬–NH₂

(III-6-4) H₂N–⌬–O–⌬(meta)–O–⌬–NH₂

(III-6-5) H₂N–⌬–S–⌬–S–⌬–NH₂

(III-6-6) H₂N–⌬–C(CH₃)₂–⌬–C(CH₃)₂–⌬–NH₂

Examples of compound (III-7) are shown below.

Chemical formula 41:

(III-7-1) H₂N–⌬–CH₂–⌬–CH₂–⌬–CH₂–⌬–NH₂

(III-7-2) H₂N–⌬–CH₂–⌬–(CH₂)₃–⌬–CH₂–⌬–NH₂

(III-7-3) H₂N–⌬–CH₂–⌬–(CH₂)₆–⌬–CH₂–⌬–NH₂

-continued

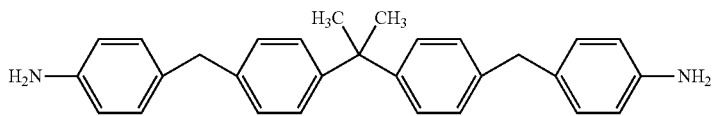
(III-7-4)

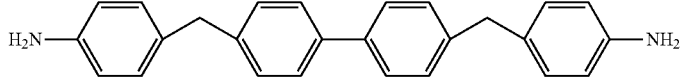
(III-7-5)

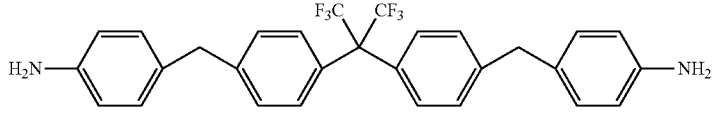
(III-7-6)

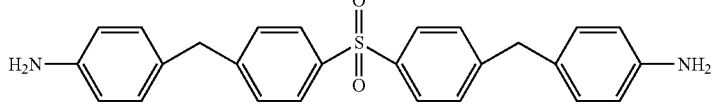
(III-7-7)

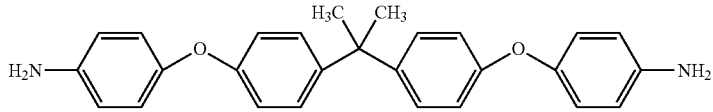
(III-7-8)

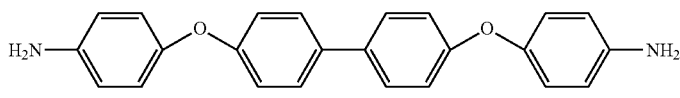
(III-7-9)

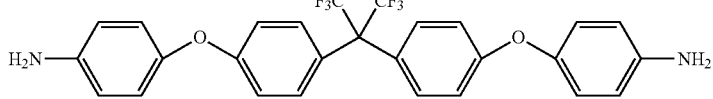
(III-7-10)

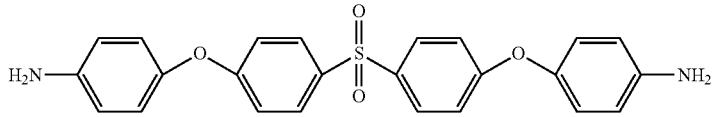
(III-7-11)

Among the specific examples described above with regard to compound (III-1) to compound (III-7), further preferred examples include compound (III-4-1) to compound (III-4-5), compound (III-5-1) to compound (III-5-12), compound (III-5-26), compound (III-5-27), compound (III-6-1), compound (III-6-2), compound (III-6-6) and compound (III-7-1) to compound (III-7-5), particularly preferred examples include compound (III-4-1), compound (III-4-2) and compound (III-5-1) to compound (III-5-12).

When using compound (III-1) to compound (III-7) in the invention, a ratio of compound (III-1) to compound (III-7) based on the total amount of diamine to be used is adjusted according to structure of a selected diamine, a desired voltage holding ratio and an effect for reducing residual DC. A preferred ratio thereof is in the range of 20 to 100 mol %, a further preferred ratio is in the range of 50 to 100 mol %, and a still further preferred ratio is in the range of 70 to 100 mol %.

Another example of a preferred diamine includes a diamine having a side chain structure. The diamines are used in an application in which a large pretilt angle is particularly required, such as a VA type liquid crystal display element. In addition, in the specification, the diamine having the side chain structure means a diamine having a substituent positioned laterally to a main chain when a chain connecting two amino groups is defined to be the main chain. More specifically, the diamine having the side chain structure reacts with the tetracarboxylic dianhydride and thus can provide a polyamic acid or polyimide having a substituent on a position lateral to a polymer main chain (a branched-chain polyamic acid or branched-chain polyimide). The alignment layer formed from the aligning agent containing such a polyamic acid or polyimide can increase a pretilt angle in the liquid crystal display element.

Accordingly, a lateral substituent in the diamine having the side chain structure may be appropriately selected according to a required pretilt angle. Specific examples of the lateral substituents preferably include a group having 3 or more carbons. The specific examples include:

1) phenyl that may have a substituent, cyclohexyl that may have a substituent, cyclohexylphenyl that may have a substituent, bis(cyclohexyl)phenyl that may have a substituent, or alkyl, alkenyl or alkynyl having 3 or more carbons;

2) phenyloxy that may have a substituent, cyclohexyloxy that may have a substituent, bis(cyclohexyl)oxy that may have a substituent, phenylcyclohexyloxy that may have a substituent, cyclohexylphenyloxy that may have a substituent, or alkyloxy, alkenyloxy or alkynyloxy having 3 or more carbons;

3) phenylcarbonyl, or alkylcarbonyl, alkenylcarbonyl or alkynylcarbonyl having 3 or more carbons;

4) phenylcarbonyloxy, or alkylcarbonyloxy, alkenylcarbonyloxy or alkynylcarbonyloxy having 3 or more carbons;

5) phenyloxycarbonyl that may have a substituent, cyclohexyloxycarbonyl that may have a substituent, bis(cyclohexyl)oxycarbonyl that may have a substituent, bis(cyclohexyl)phenyloxycarbonyl that may have a substituent, cyclohexyl bis(phenyl)oxycarbonyl that may have a substituent, or alkyloxycarbonyl, alkenyloxycarbonyl or alkynyloxycarbonyl having 3 or more carbons;

6) phenylaminocarbonyl, or alkylaminocarbonyl, alkenylaminocarbonyl or alkynylaminocarbonyl having 3 or more carbons;

7) cycloalkyl having 3 or more carbons;

8) cyclohexylalkyl that may have a substituent, phenylalkyl that may have a substituent, bis(cyclohexyl)alkyl that may have a substituent, cyclohexylphenylalkyl that may have a substituent, bis(cyclohexyl)phenylalkyl that may have a substituent, phenylalkyloxy that may have a substituent, alkylphenyloxycarbonyl or alkylbiphenylyloxycarbonyl;

9) a group having two or more rings in which a benzene ring that may have a substituent and/or a cyclohexane ring that may have a substituent is bonded through a single bond, —O—, —COO—, —OCO—, —CONH— or alkylene having 1 to 3 carbons, or a group having a steroid skeleton, but not limited thereto.

Specific examples of the substituents include alkyl, fluorine-substituted alkyl, alkoxy and alkoxyalkyl. In the specification, "alkyl" used without particular explanation means straight-chain alkyl and branched-chain alkyl without any preference. A same rule applies to "alkenyl" and "alkynyl."

Preferred examples of the diamine having the side chain structure include a compound selected from the group of compounds represented by each of formula (III-8) to formula (III-10), formula (III-12) and formula (III-13).

Chemical formula 42:

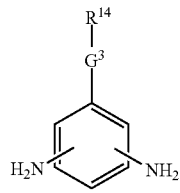

(III-8)

Meanings of symbols in formula (III-8) are as described below. $G^3$ is a single bond, —O—, —COO—, —OCO—, —CO—, —CONH— or —(CH$_2$)$_m$—, and m is an integer from 1 to 12. $R^{14}$ is alkyl having 3 to 20 carbons, phenyl, a group having a steroid skeleton, or a group represented by the following formula (III-8-a). In the alkyl, arbitrary hydrogen may be replaced by fluorine and arbitrary —CH$_2$— may be replaced by —O—, —CH=CH— or —C≡C—. The hydrogen of phenyl may be replaced by —F, —CH$_3$, —OCH$_3$, —OCH$_2$F, —OCHF$_2$ or —OCF$_3$. A position of bonding an NH$_2$ group to a benzene ring is arbitrary, but a relationship between the bonding positions of two NH$_2$ groups is preferably meta or para. More specifically, when a position of bonding with a group "$R^{14}$-$G^3$-" is defined to be position 1, two NH$_2$ groups are preferably bonded to position 3 and position 5, or position 2 and position 5, respectively.

Chemical formula 43:

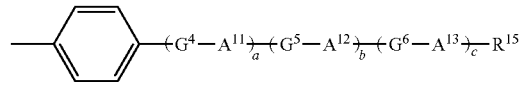

(III-8-a)

Meanings of symbols in formula (III-8-a) are as described below. $R^{15}$ is hydrogen, fluorine, alkyl having 1 to 20 carbons, fluorine-substituted alkyl having 1 to 20 carbons, alkoxy having 1 to 20 carbons, —CN, —OCH$_2$F, —OCHF$_2$ or —OCF$_3$; $G^4$, $G^5$ and $G^6$ are a bonding group, and are independently a single bond, —O—, —COO—, —OCO—, —CONH—, —CH=CH— or alkylene having 1 to 12 carbons; $A^{11}$, $A^{12}$ and $A^{13}$ are a ring, and are independently 1,4-phenylene, 1,4-cyclohexylene, 1,3-dioxane-2,5-diyl, pyrimidine-2,5-diyl, pyridine-2,5-diyl, naphthalene-1,5-diyl, naphthalene-2,7-diyl or anthracene-9,10-diyl; in all rings, arbitrary hydrogen may be replaced by fluorine or —CH$_3$; a, b and c are independently an integer from 0 to 2, a sum thereof is 1 to 5; and when a, b or c is 2, two bonding groups may be identical or different, and two rings may be identical or different.

Chemical formula 44:

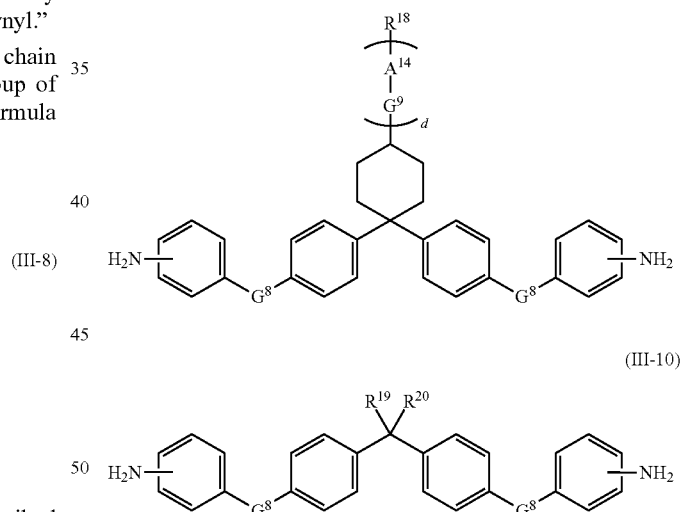

(III-9)

(III-10)

Meanings of symbols in formula (III-9) and formula (III-10) are as described below. $R^{18}$ is hydrogen or alkyl having 1 to 20 carbons, and in the alkyl, arbitrary —CH$_2$— in alkyl having 2 to 20 carbons may be replaced by —O—, —CH=CH— or —C≡C—. $R^{19}$ is alkyl having 6 to 22 carbons, and $R^{20}$ is hydrogen or alkyl having 1 to 22 carbons. $G^8$ is —O— or alkylene having 1 to 6 carbons. $A^{14}$ is 1,4-phenylene or 1,4-cyclohexylene, $G^9$ is a single bond or alkylene having 1 to 3 carbons, and d is 0 or 1. A position of bonding an NH$_2$ group to a benzene ring is arbitrary, but preferably a meta position or a para position to a position of bonding with $G^8$.

Chemical formula 45:

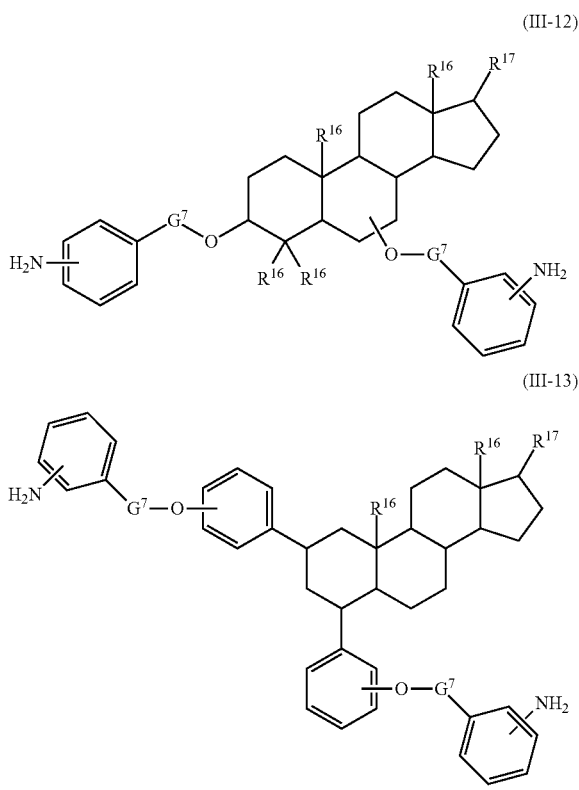

Meanings of symbols in formula (III-12) and formula (III-13) are as described below. $R^{16}$ is independently hydrogen or —$CH_3$. $R^{17}$ is independently hydrogen, alkyl having 1 to 20 carbons or alkenyl having 2 to 20 carbons. $G^7$ is independently a single bond, —CO— or —$CH_2$—. One of hydrogen of a benzene ring in formula (III-13) may be replaced by alkyl having 1 to 20 carbons or phenyl. Then, a group of which bonding position is not fixed to any one of carbon atoms constituting a ring shows that the bonding position in the ring is arbitrary.

One of two groups of "$NH_2$-phenylene-$G^7$-O—" in formula (III-12) is preferably bonded to position 3 of a steroid nucleus, and the other is preferably bonded to position 6 of the steroid nucleus. Positions of bonding two groups of "$NH_2$-phenylene-$G^7$-O—" to a benzene ring in formula (III-13) is preferably a meta position or a para position relative to a position of bonding with a steroid nucleus, respectively. In formula (III-12) and formula (III-13), a position of bonding an $NH_2$ group to a benzene ring is preferably a meta position or a para position relative to a position of bonding with $G^7$.

When using compound (III-8) to compound (III-13) as a diamine raw material in the invention, at least one of the diamines may be selected from the diamines and used, or the diamine and any other diamine (diamine other than compound (III-8) to compound (III-13)) may be mixed and used. On the occasion, compound (III-1) to compound (III-7) described above are also contained in a selection range of any other diamine.

Examples of compound (III-8) are shown below.

Chemical formula 46:

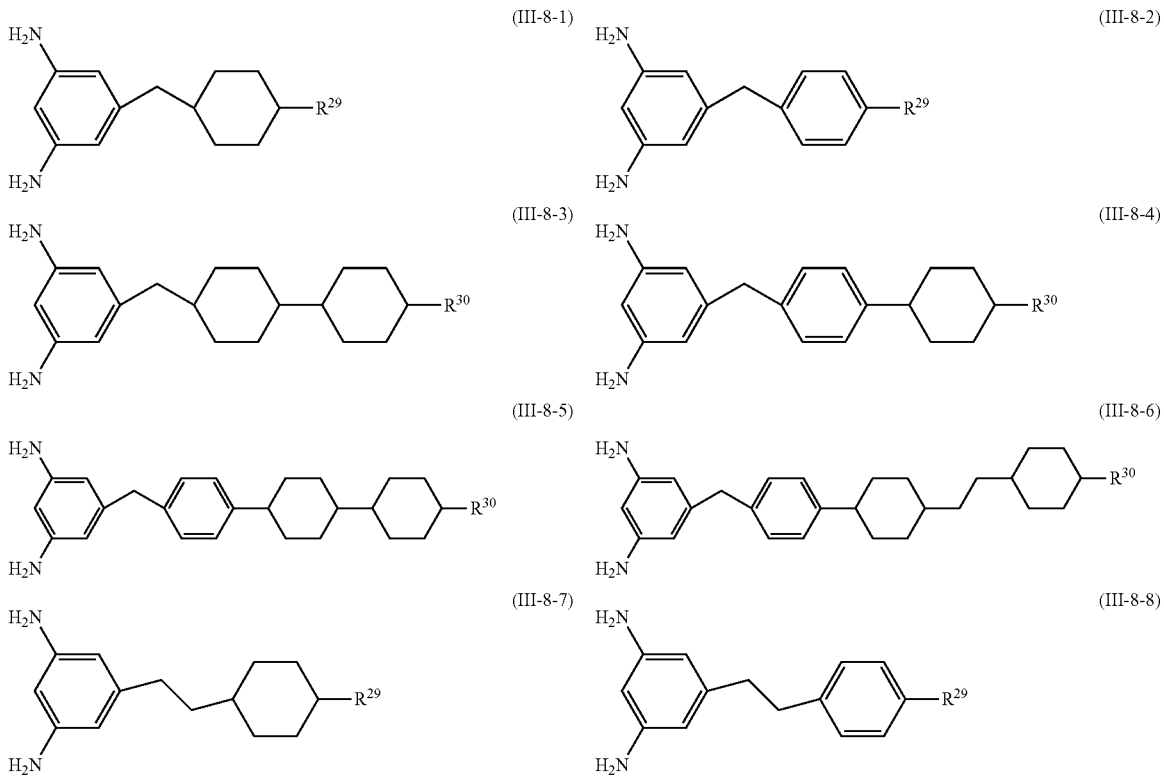

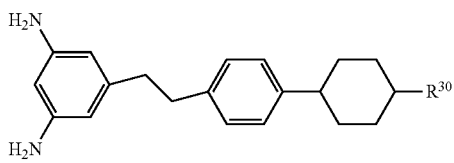
(III-8-9)

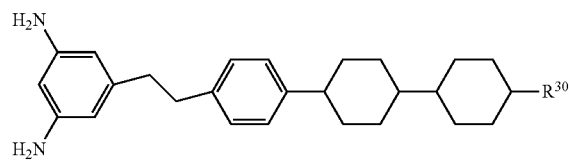
(III-8-10)

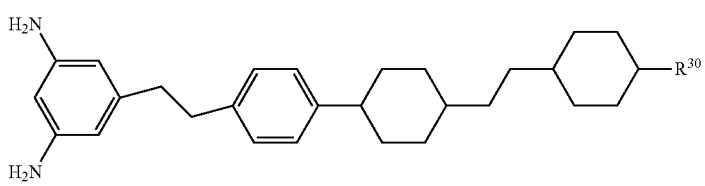
(III-8-11)

In the formulas, $R^{29}$ is alkyl having 3 to 20 carbons or alkoxy having 3 to 20 carbons, preferably, alkyl having 5 to 20 carbons or alkoxy having 5 to 20 carbons. $R^{30}$ is alkyl having 1 to 18 carbons or alkoxy having 1 to 18 carbons, preferably, alkyl having 3 to 18 carbons or alkoxy having 3 to 18 carbons.

Chemical formula 47:

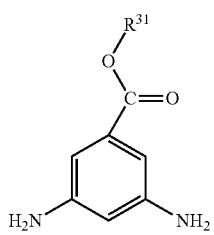
(III-8-12)

(III-8-13)

(III-8-14)

(III-8-15)

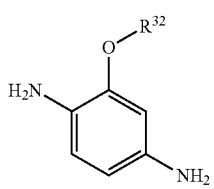
(III-8-16)

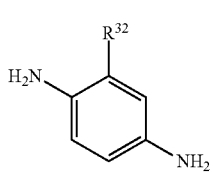
(III-8-17)

In the formulas, $R^{31}$ is alkyl having 4 to 16 carbons, preferably, alkyl having 6 to 16 carbons. $R^{32}$ is alkyl having 6 to 20 carbons, preferably, alkyl having 8 to 20 carbons.

Chemical formula 48:

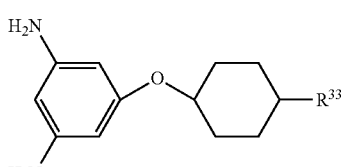
(III-8-18)

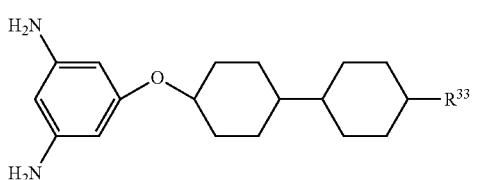
(III-8-19)

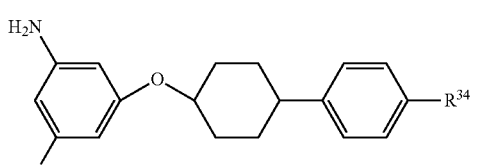
(III-8-20)

(III-8-21), (III-8-22), (III-8-23), (III-8-24), (III-8-25), (III-8-26), (III-8-27), (III-8-28), (III-8-29), (III-8-30), (III-8-31), (III-8-32), (III-8-33), (III-8-34)

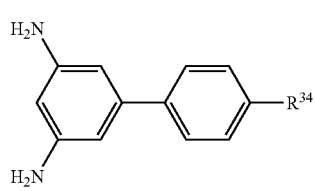
(III-8-35)

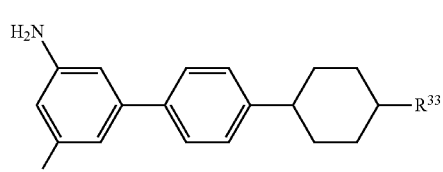
(III-8-36)

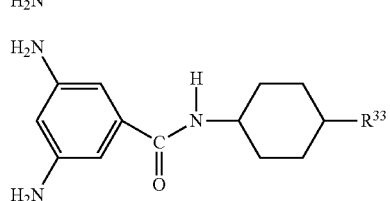
(III-8-37)

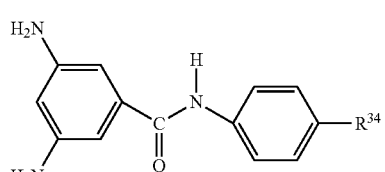
(III-8-38)

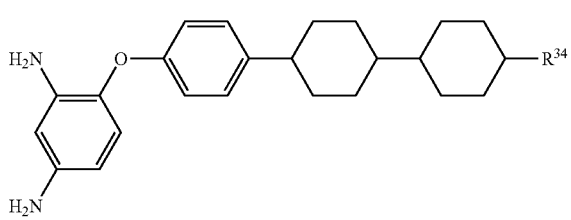
(III-8-39)

In the formulas, $R^{33}$ is alkyl having 1 to 20 carbons or alkoxy having 1 to 20 carbons, preferably, alkyl having 3 to 20 carbons or alkoxy having 3 to 20 carbons. $R^{34}$ is hydrogen, fluorine, alkyl having 1 to 20 carbons, alkoxy having 1 to 20 carbons, —CN, —OCH$_2$F, —OCHF$_2$ or —OCF$_3$, preferably, alkyl having 3 to 20 carbons or alkoxy having 3 to 20 carbons. Then, $G^{14}$ is alkylene having 1 to 20 carbons.

Chemical formula 49:

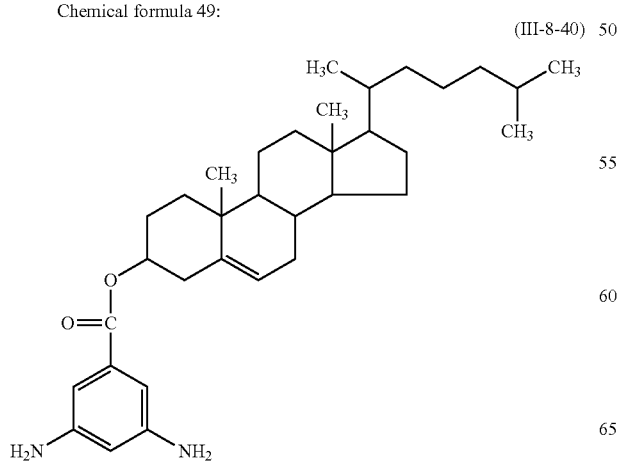
(III-8-40)

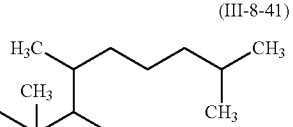
(III-8-41)

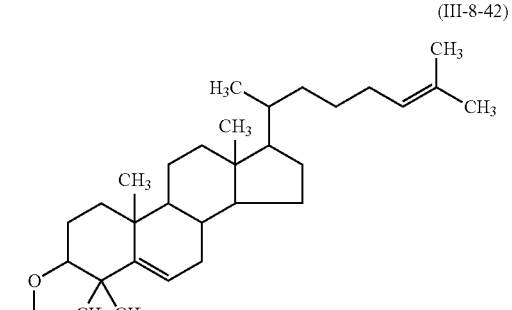
(III-8-42)

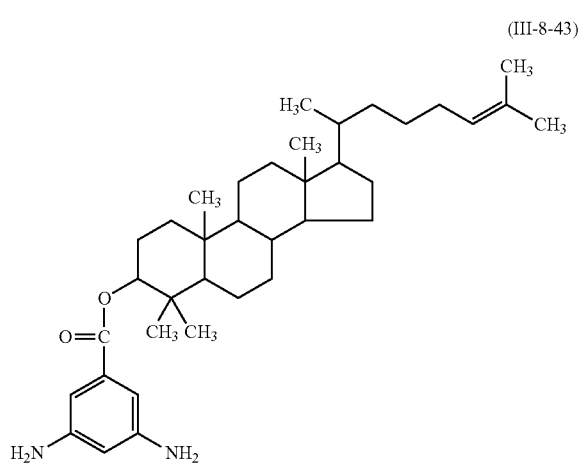
(III-8-43)

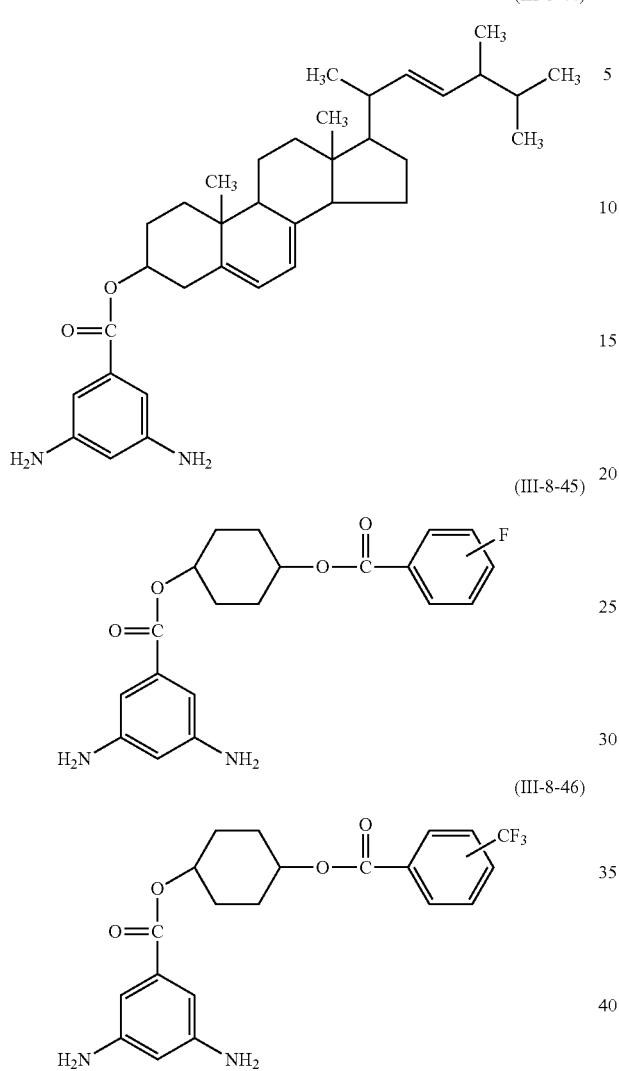
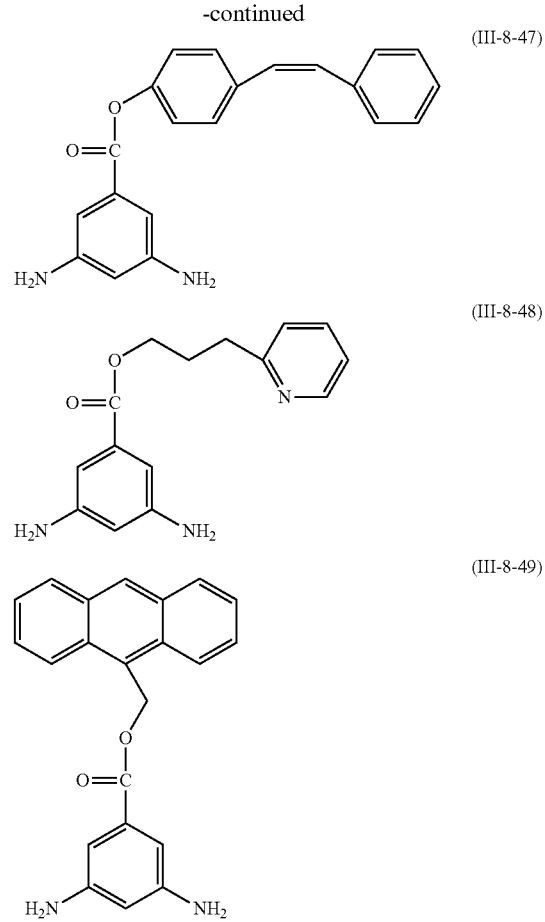
Among the specific examples with regard to compound (III-8) described above, compound (III-8-1) to compound (III-8-11) are preferred, and compound (III-8-2), compound (III-8-4), compound (III-8-5) and compound (III-8-6) are further preferred.
Examples of compound (III-12) are shown below.
Chemical formula 50:
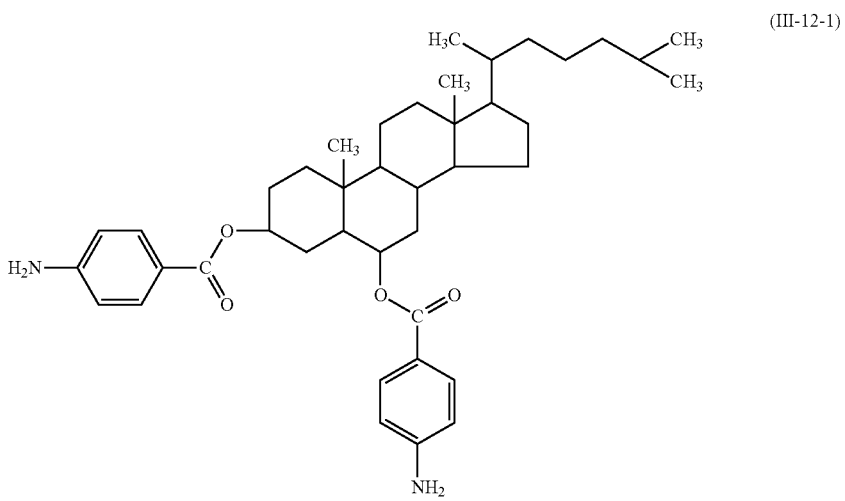

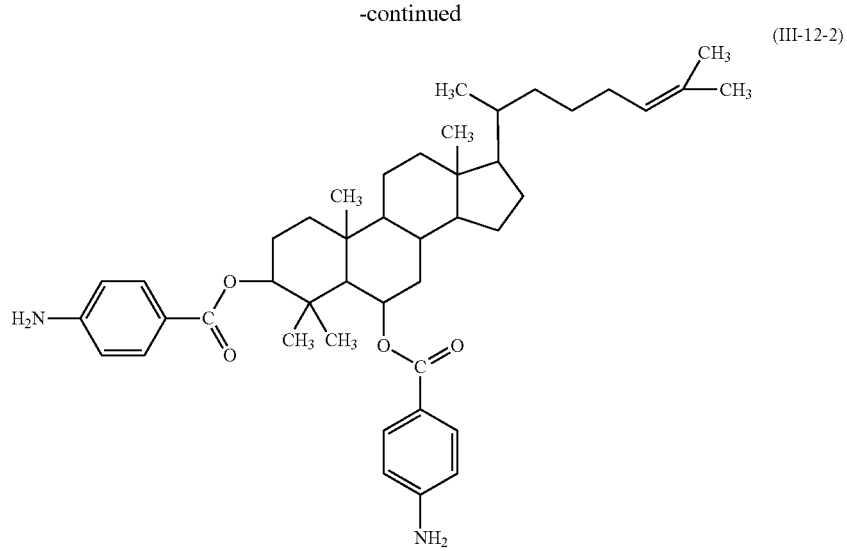
(III-12-2)
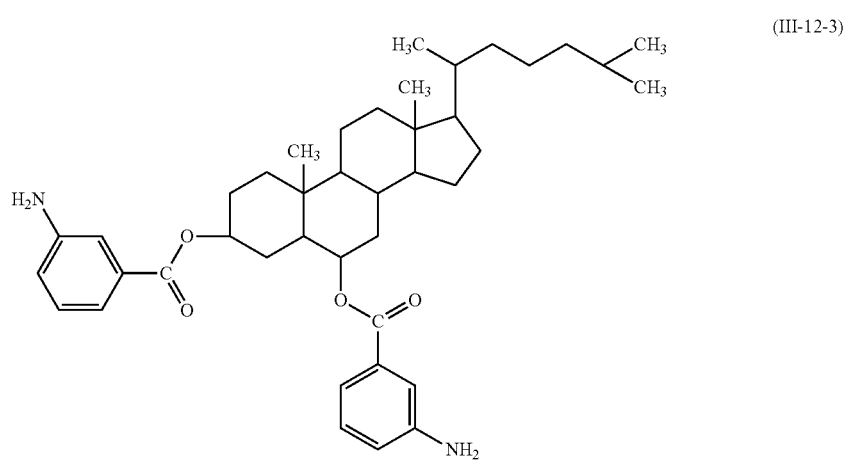
(III-12-3)
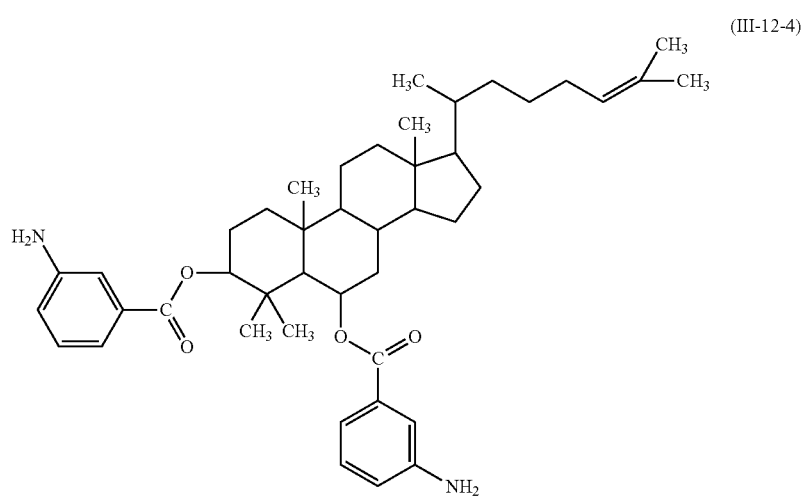 [SMILES: CC(C)=CCCCC(C)C1CCC2C3CC(OC(=O)c4cccc(N)c4)C4C(C)(C)C(OC(=O)c5cccc(N)c5)CCC4(C)C3CCC12C]
(III-12-4)

Examples of compound (III-13) are shown below.
Chemical formula 51:
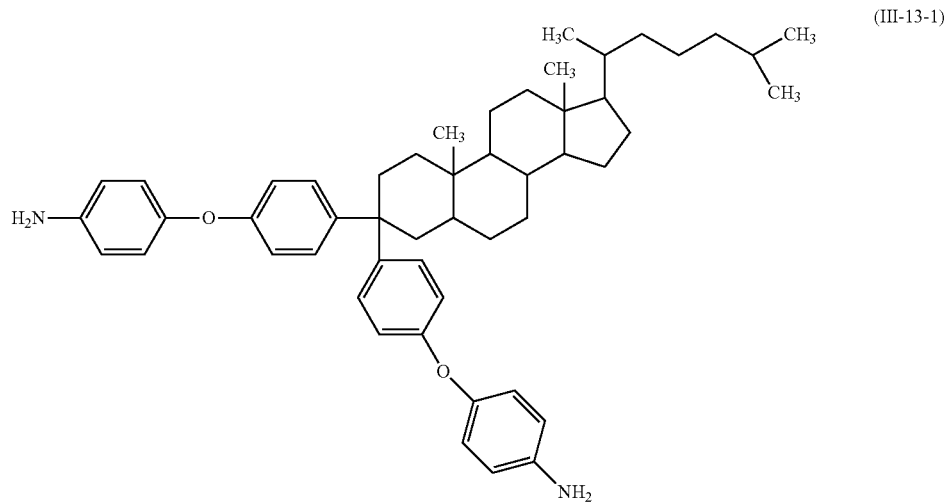
(III-13-1)
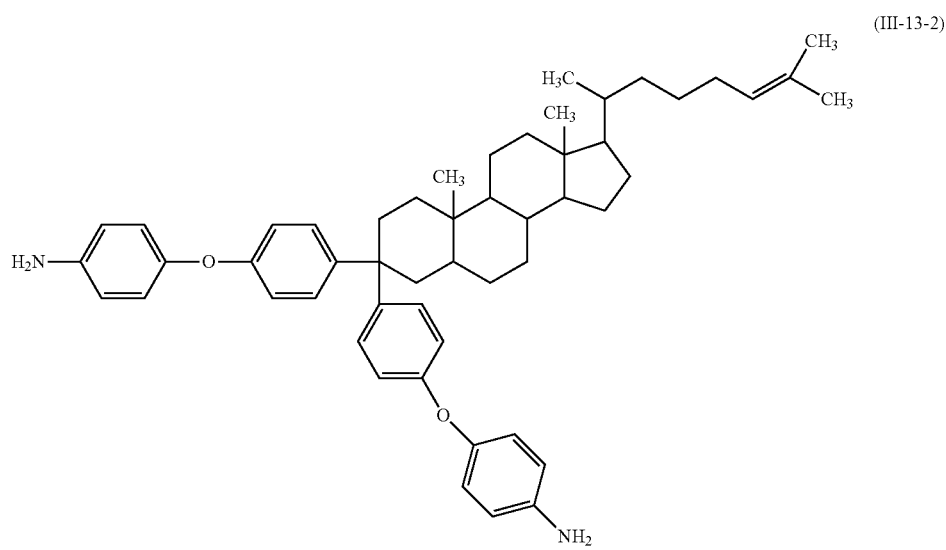
(III-13-2)
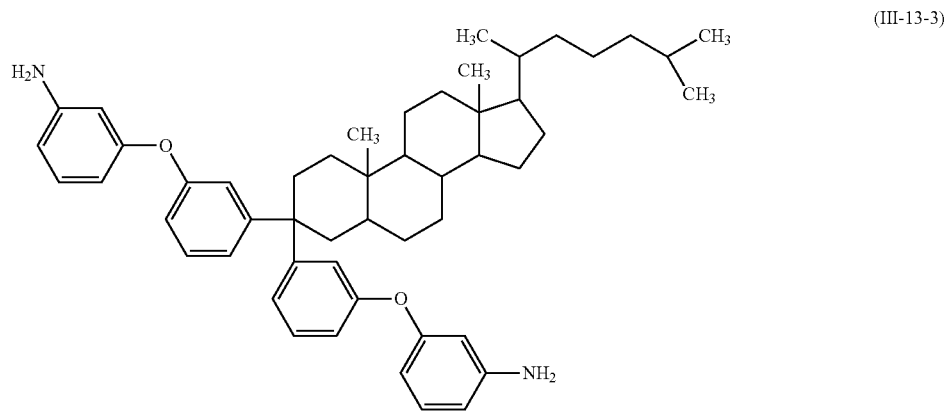
(III-13-3)

(III-13-4)
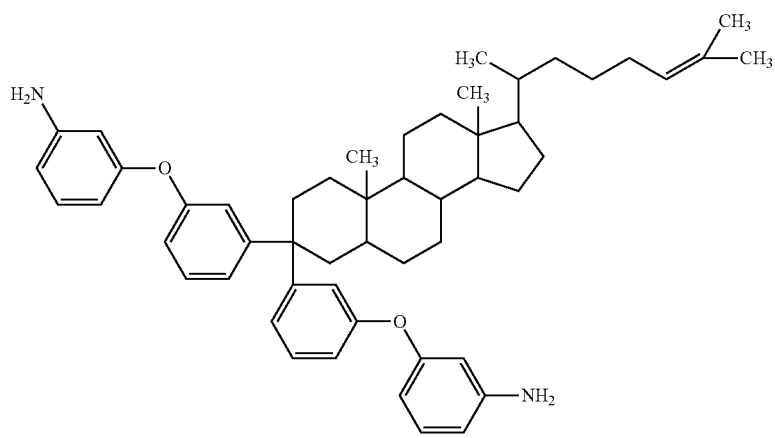
(III-13-5)
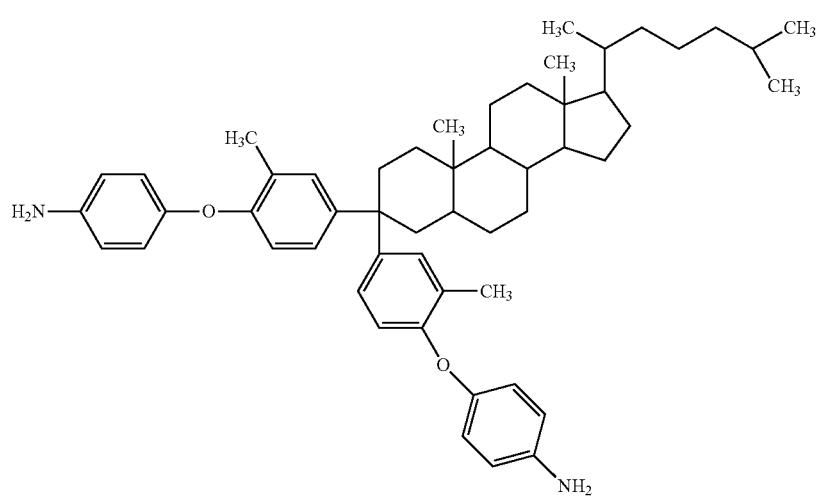
(III-13-6)
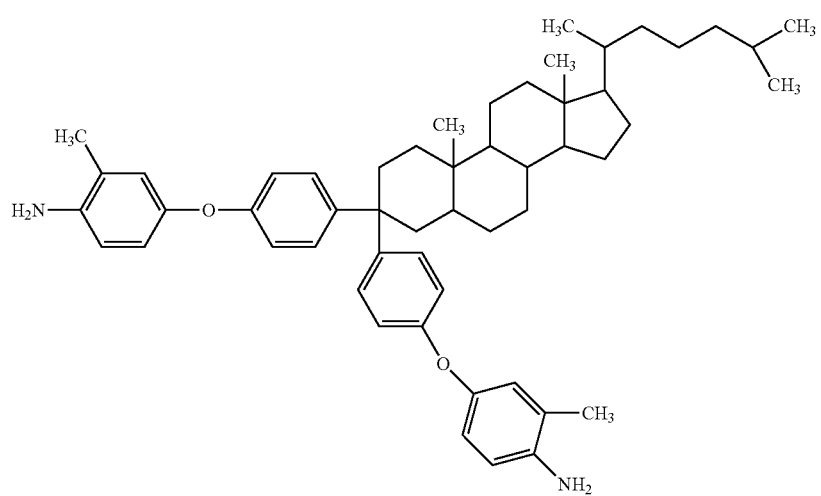

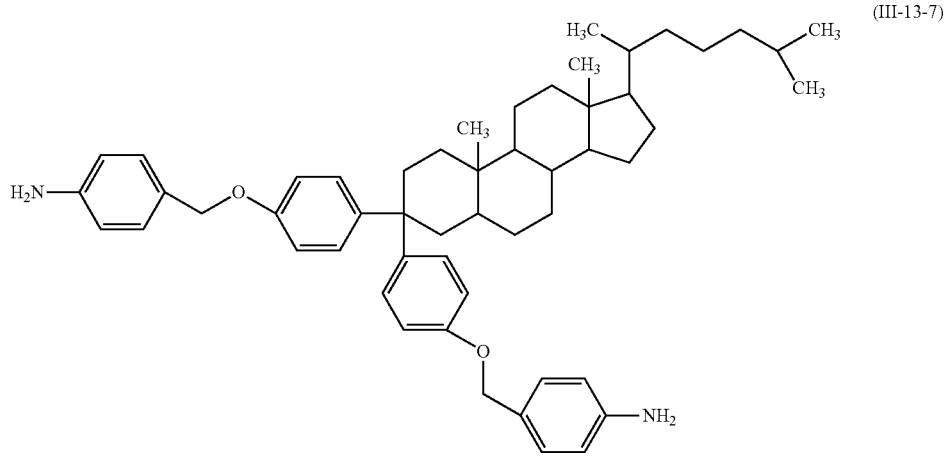
(III-13-7)
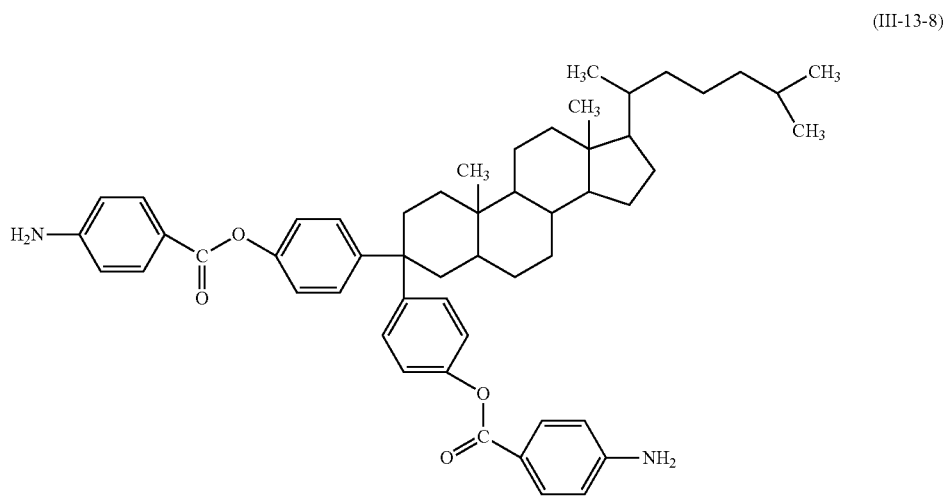
(III-13-8)
Examples of compound (III-9) are shown below.
Chemical formula 52:
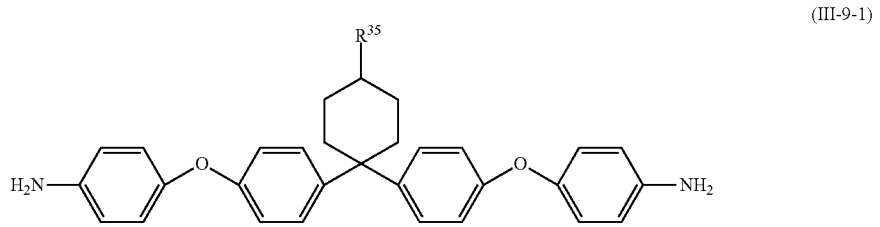
(III-9-1)
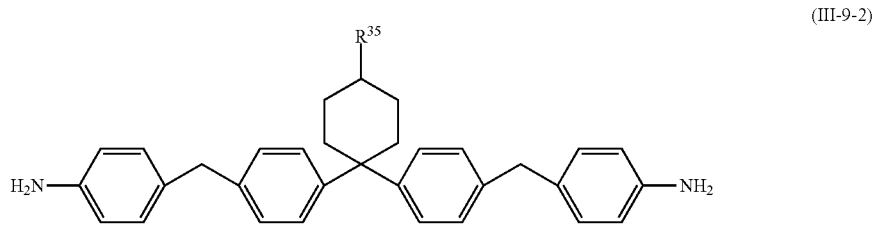
(III-9-2)

-continued
(III-9-3)
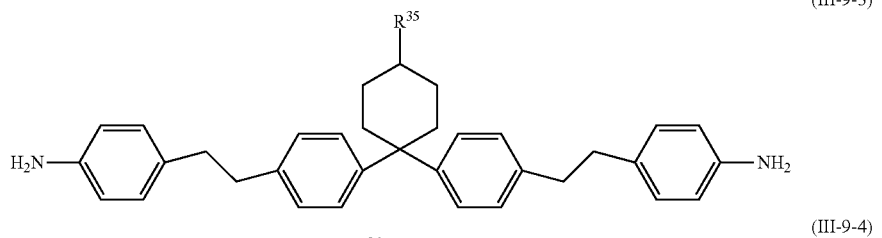
(III-9-4)
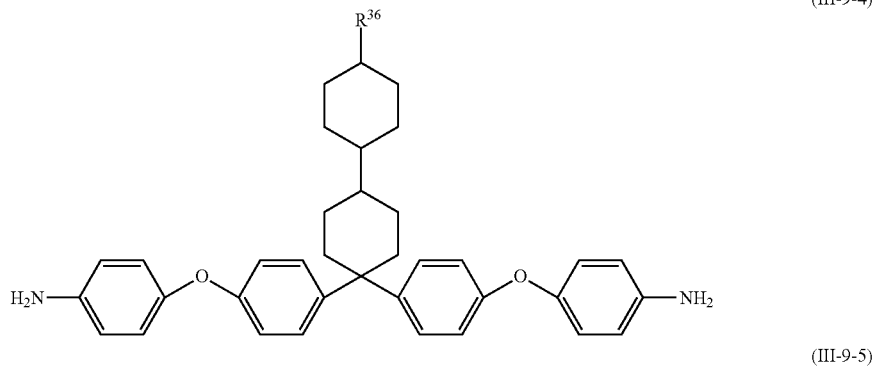
(III-9-5)
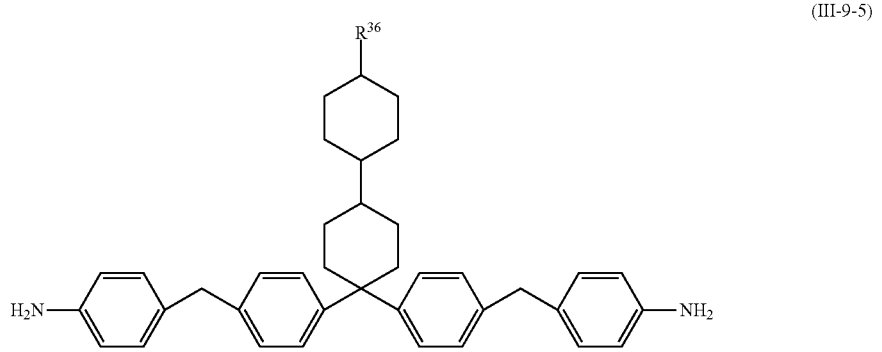
(III-9-6)
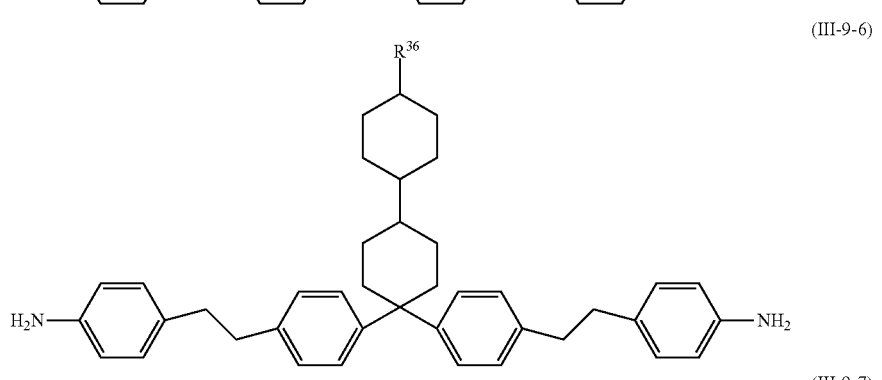
(III-9-7)
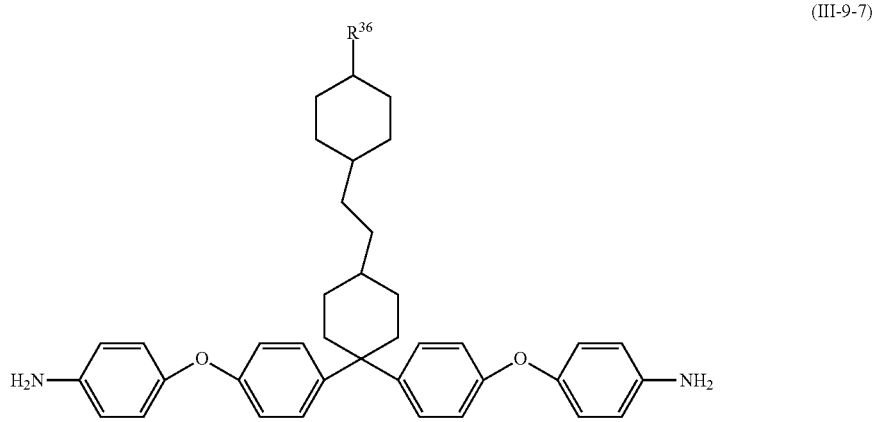

(III-9-8)

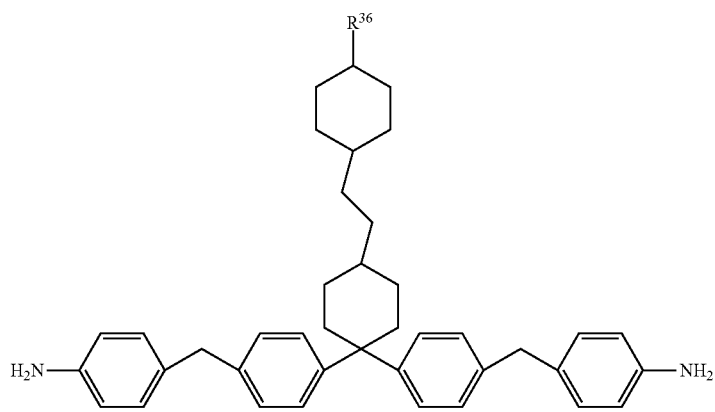

(III-9-9)

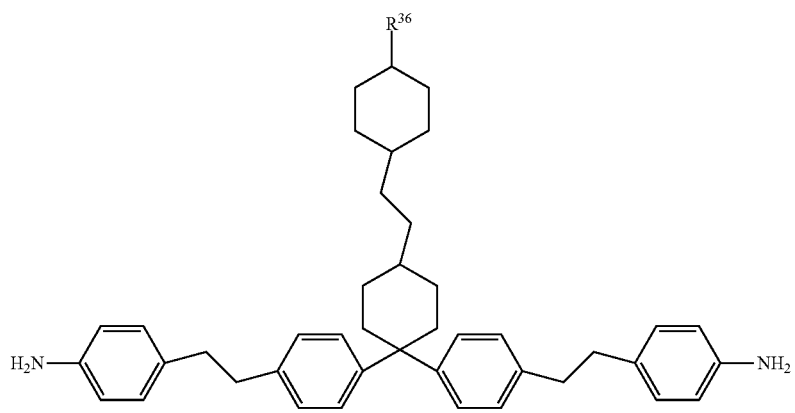

In the formulas, $R^{35}$ is hydrogen or alkyl having 1 to 20 carbons, preferably, hydrogen or alkyl having 1 to 10 carbons, and $R^{36}$ is hydrogen or alkyl having 1 to 10 carbons.

Examples of compound (III-10) are shown below.

Chemical formula 53:

(III-10-1)

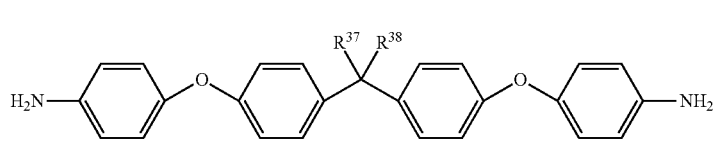

(III-10-2)

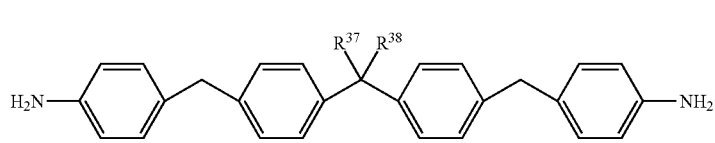

(III-10-3)

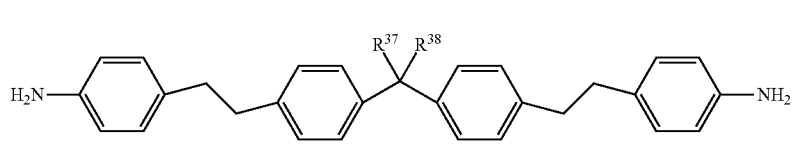

In the formulas, $R^{37}$ is alkyl having 6 to 20 carbons, and $R^{38}$ is hydrogen or alkyl having 1 to 10 carbons.

More specifically, compound (III-10) includes the following diamines.

Chemical formula 54:

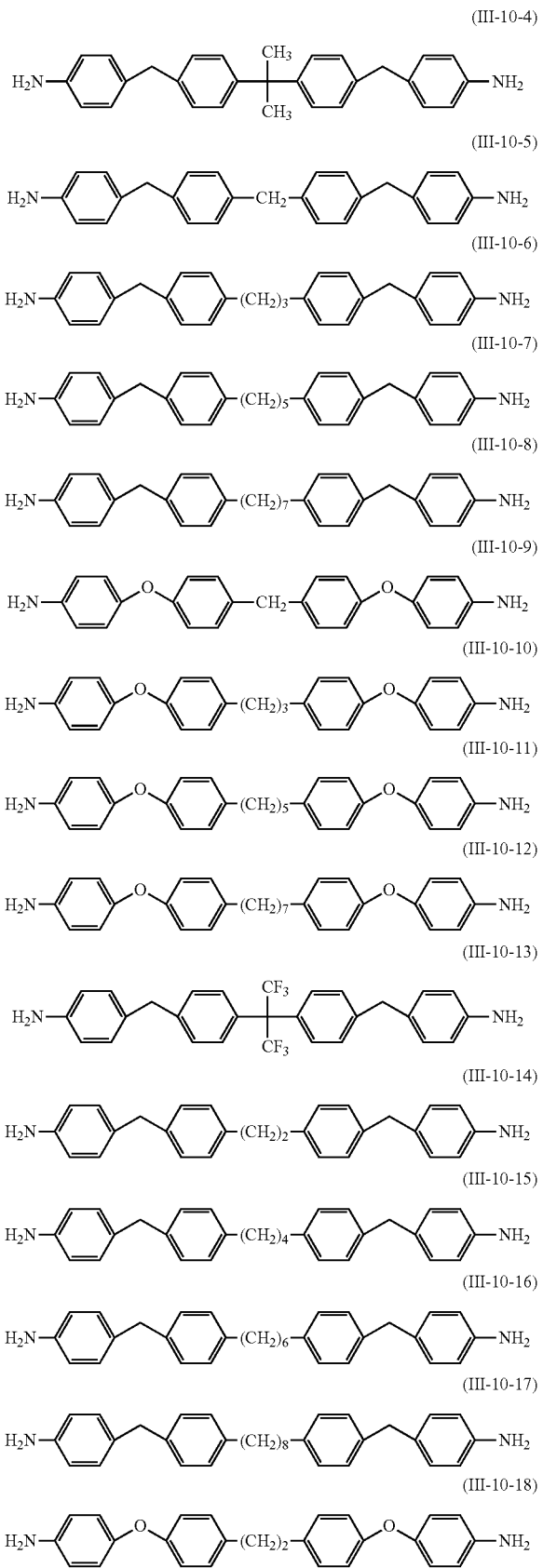

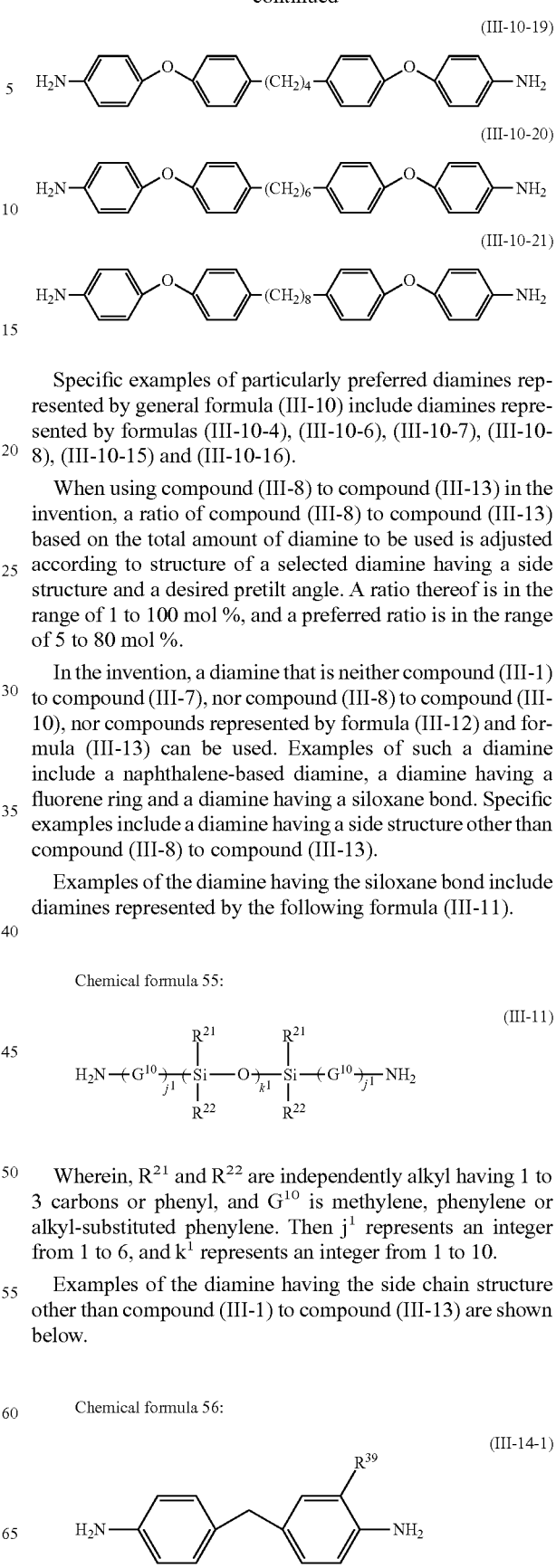

Specific examples of particularly preferred diamines represented by general formula (III-10) include diamines represented by formulas (III-10-4), (III-10-6), (III-10-7), (III-10-8), (III-10-15) and (III-10-16).

When using compound (III-8) to compound (III-13) in the invention, a ratio of compound (III-8) to compound (III-13) based on the total amount of diamine to be used is adjusted according to structure of a selected diamine having a side structure and a desired pretilt angle. A ratio thereof is in the range of 1 to 100 mol %, and a preferred ratio is in the range of 5 to 80 mol %.

In the invention, a diamine that is neither compound (III-1) to compound (III-7), nor compound (III-8) to compound (III-10), nor compounds represented by formula (III-12) and formula (III-13) can be used. Examples of such a diamine include a naphthalene-based diamine, a diamine having a fluorene ring and a diamine having a siloxane bond. Specific examples include a diamine having a side structure other than compound (III-8) to compound (III-13).

Examples of the diamine having the siloxane bond include diamines represented by the following formula (III-11).

Chemical formula 55:

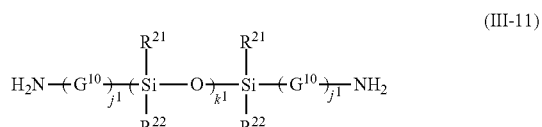

Wherein, $R^{21}$ and $R^{22}$ are independently alkyl having 1 to 3 carbons or phenyl, and $G^{10}$ is methylene, phenylene or alkyl-substituted phenylene. Then $j^1$ represents an integer from 1 to 6, and $k^1$ represents an integer from 1 to 10.

Examples of the diamine having the side chain structure other than compound (III-1) to compound (III-13) are shown below.

Chemical formula 56:

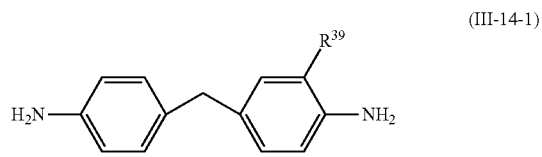

(III-14-2)
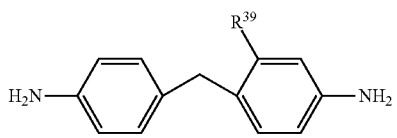

(III-14-3)
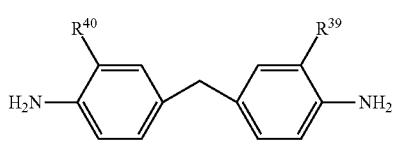

(III-14-4)
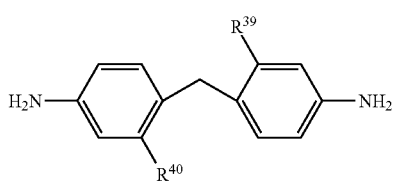

(III-14-5)
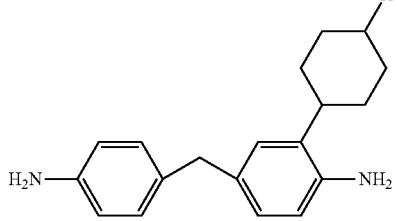

(III-14-6)
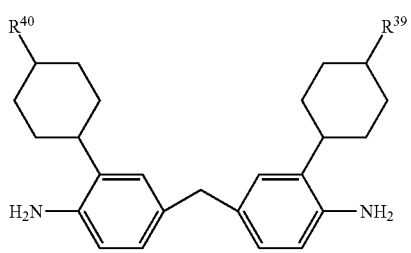

(III-14-7)
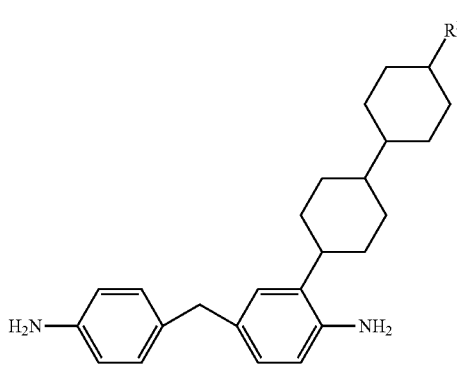

(III-14-8)
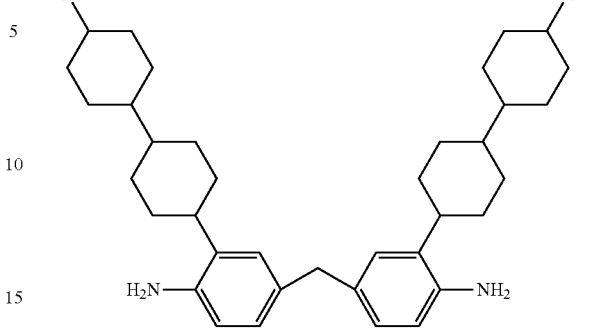

wherein, $R^{39}$ and $R^{40}$ are independently alkyl having 3 to 20 carbons.

Specific examples of the tetracarboxylic dianhydride used in the invention include tetracarboxylic dianhydrides represented by the general formula (IV-1) to the general formula (IV-12).

Chemical formula 57:

(IV-1)
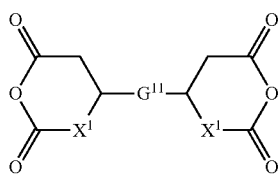

In the general formula (IV-1), $G^{11}$ represents a single bond, alkylene having 1 to 12 carbons, a 1,4-phenylene ring or a 1,4-cyclohexylene ring, and $X^1$ each independently represents a single bond or $CH_2$. Specific examples include tetracarboxylic dianhydrides represented by the following structural formulas.

Chemical formula 58:

(IV-1-1)
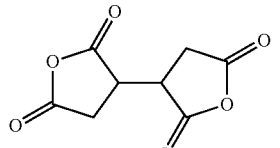

(IV-1-2)
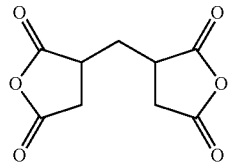

(IV-1-3)
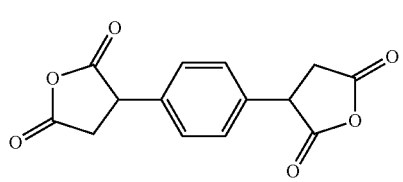

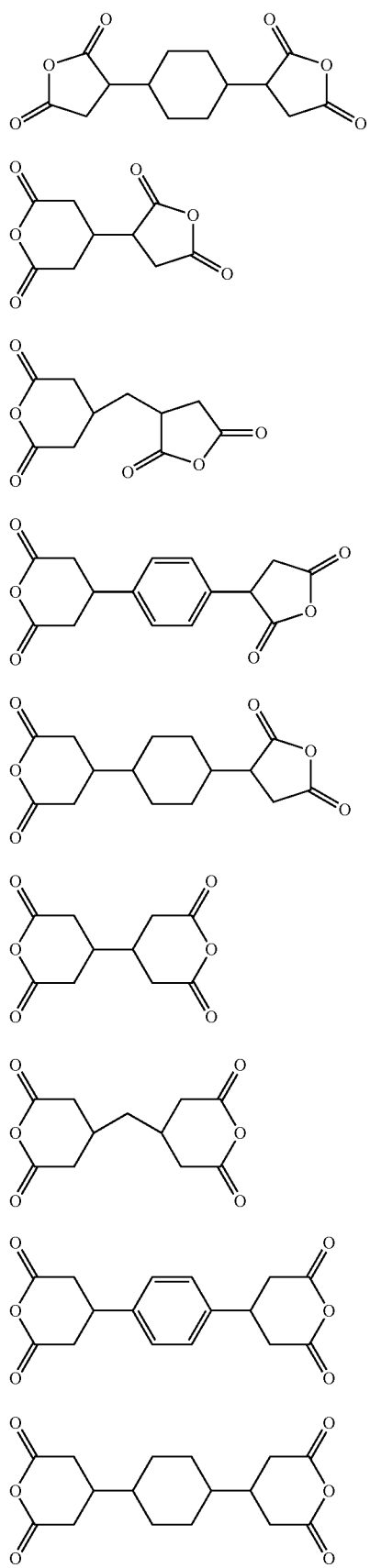
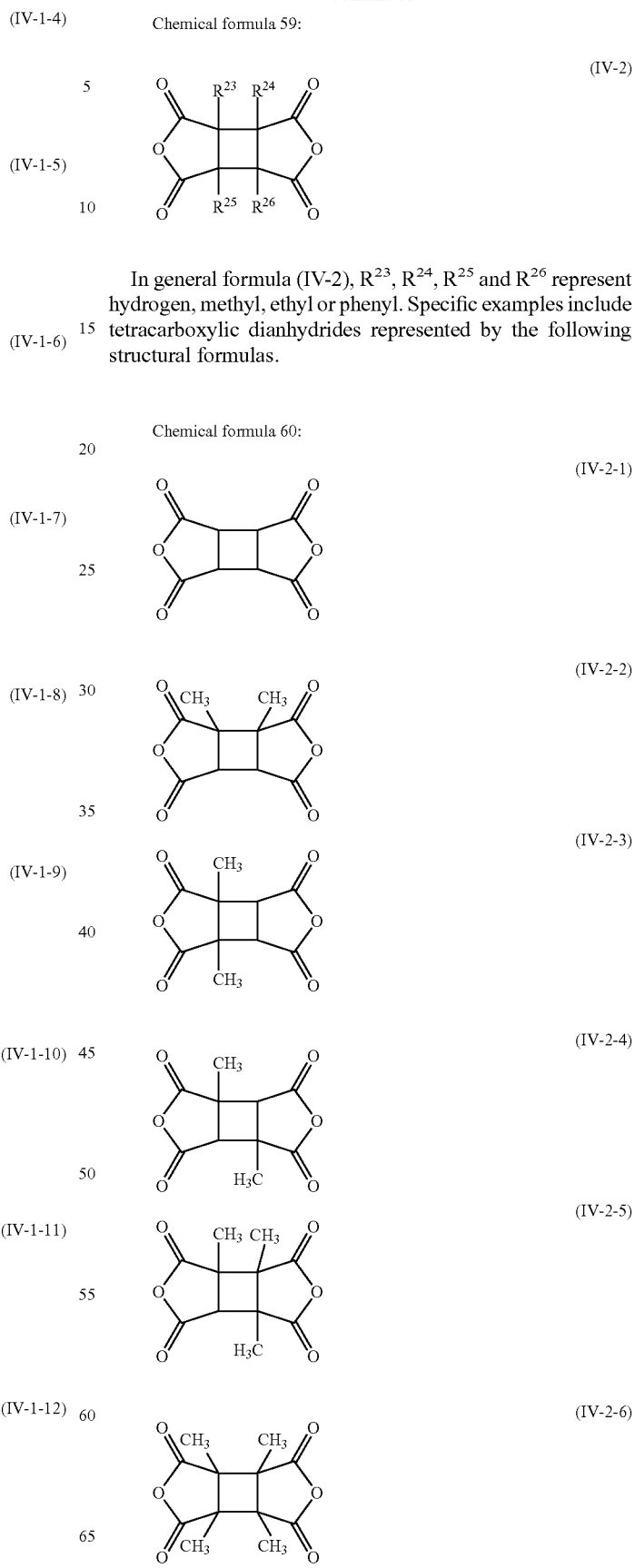
In general formula (IV-2), $R^{23}$, $R^{24}$, $R^{25}$ and $R^{26}$ represent hydrogen, methyl, ethyl or phenyl. Specific examples include tetracarboxylic dianhydrides represented by the following structural formulas.
Chemical formula 60:

(IV-2-7)

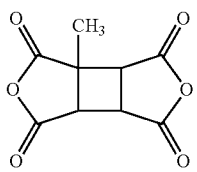

Chemical formula 61:

(IV-3)

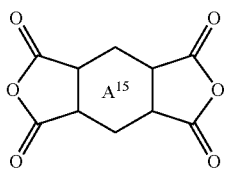

In general formula (IV-3), ring $A^{15}$ represents a cyclohexane ring or a benzene ring. Specific examples include tetracarboxylic dianhydrides represented by the following structural formulas.

Chemical formula 62:

(IV-3-1)

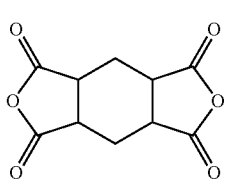

(IV-3-2)

Chemical formula 63:

(IV-4)

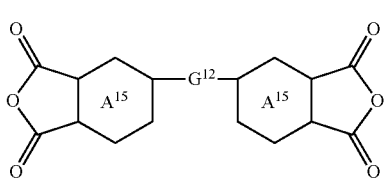

In general formula (IV-4), $G^{12}$ represents a single bond, $CH_2$, $CH_2CH_2$, O, S, $C(CH_3)_2$, SO or $C(CF_3)_2$, and ring $A^{15}$ each independently represents a cyclohexane ring or a benzene ring. Specific examples include tetracarboxylic dianhydrides represented by the following structural formulas.

Chemical formula 64:

(IV-4-1)

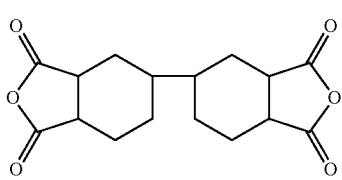

(IV-4-2)

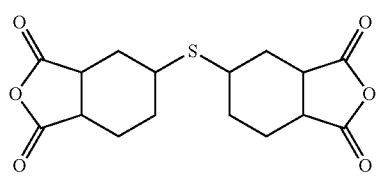

(IV-4-3)

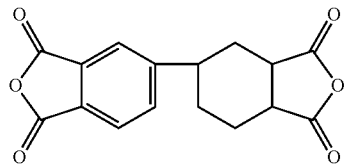

(IV-4-4)

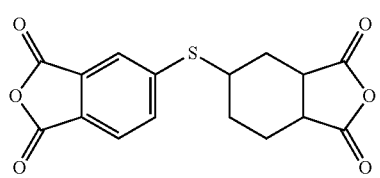

(IV-4-5)

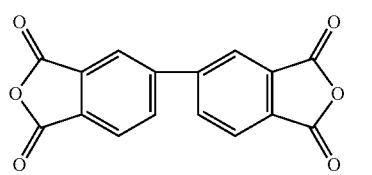

(IV-4-6)

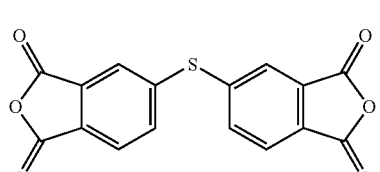

(IV-4-7)

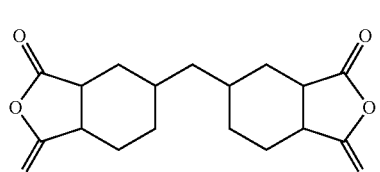

(IV-4-8)

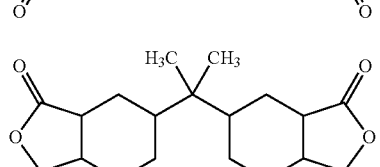

(IV-4-9)

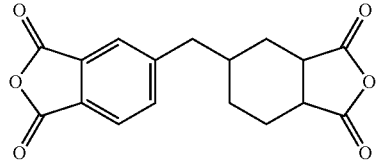

(IV-4-10)

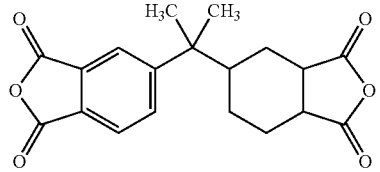

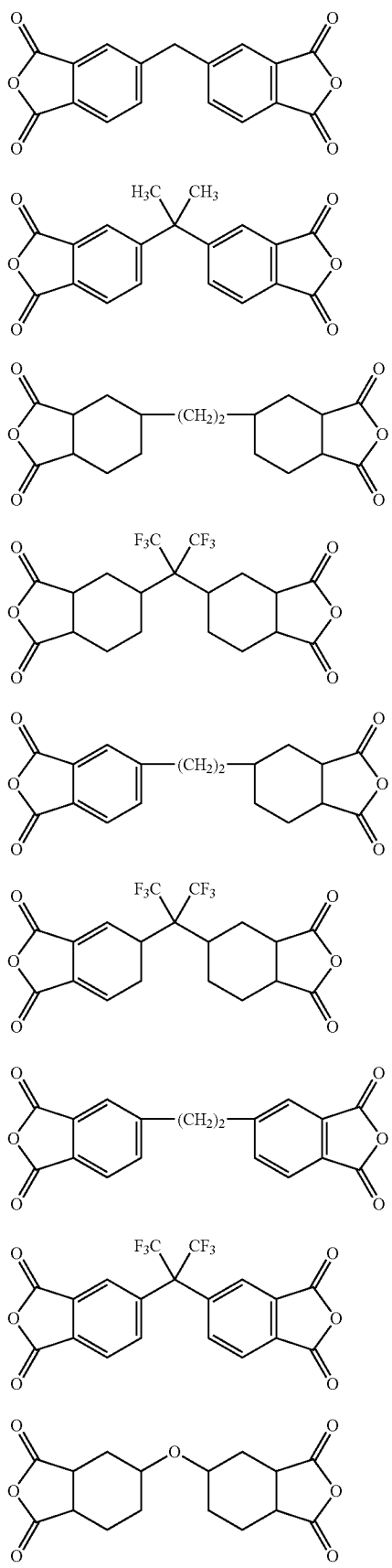
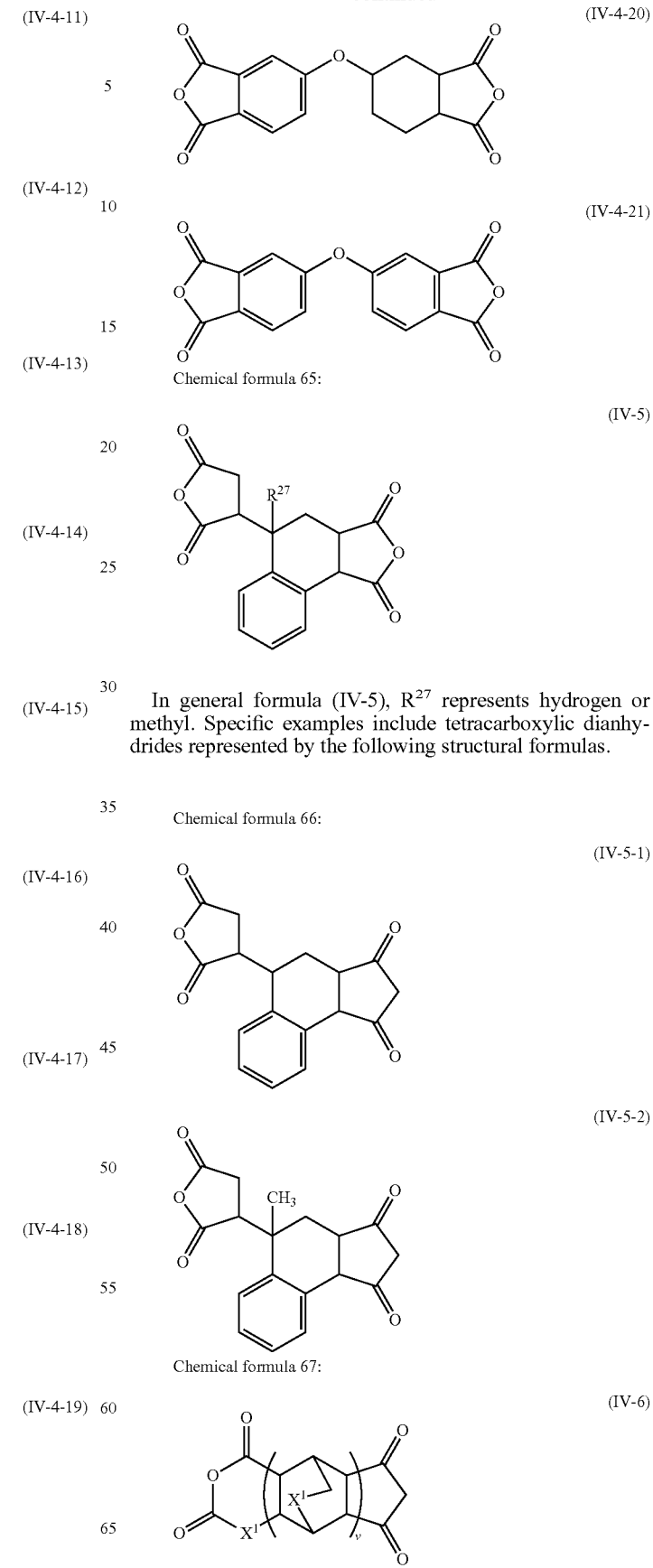
Chemical formula 65:
In general formula (IV-5), $R^{27}$ represents hydrogen or methyl. Specific examples include tetracarboxylic dianhydrides represented by the following structural formulas.
Chemical formula 66:
Chemical formula 67:

In general formula (IV-6), $X^1$ each independently represents a single bond or $CH_2$, and v represents 1 or 2. Specific examples include tetracarboxylic dianhydrides represented by the following structural formulas.

Chemical formula 68:

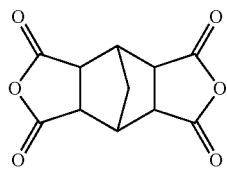
(IV-6-1)

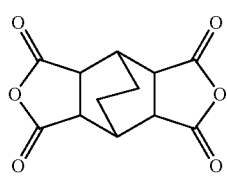
(IV-6-2)

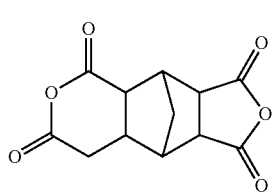
(IV-6-3)

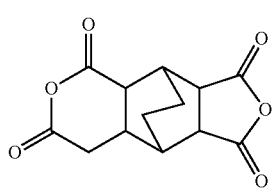
(IV-6-4)

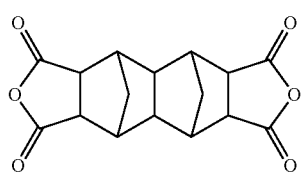
(IV-6-5)

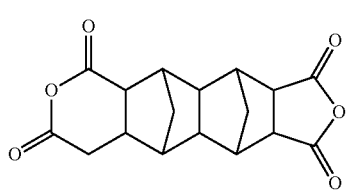
(IV-6-6)

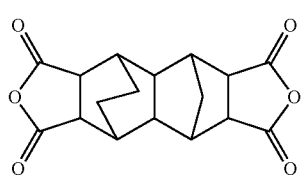
(IV-6-7)

-continued

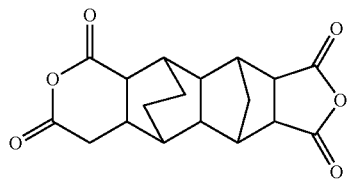
(IV-6-8)

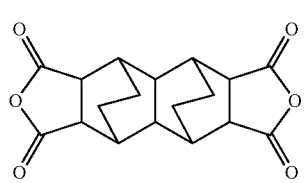
(IV-6-9)

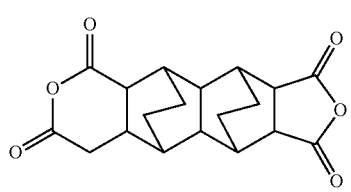
(IV-6-10)

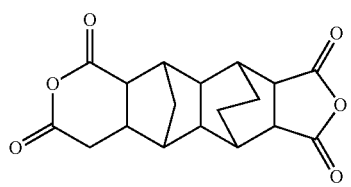
(IV-6-11)

Chemical formula 69:

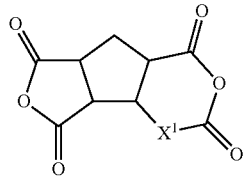
(IV-7)

In general formula (IV-7), $X^1$ represents a single bond or $CH_2$. Specific examples include tetracarboxylic dianhydrides represented by the following structural formulas.

Chemical formula 70:

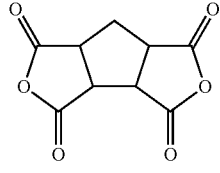
(IV-7-1)

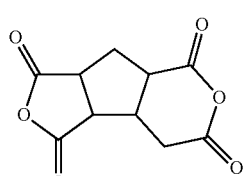
(IV-7-2)

Chemical formula 71:
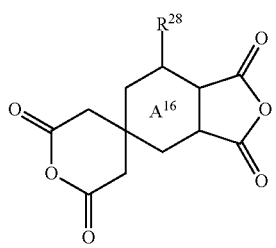
(IV-8)
In general formula (IV-8), $R^{28}$ represents hydrogen, methyl, ethyl or phenyl, and ring $A^{16}$ represents a cyclohexane ring or a cyclohexene ring. Specific examples include tetracarboxylic dianhydrides represented by the following structural formulas.
Chemical formula 72:
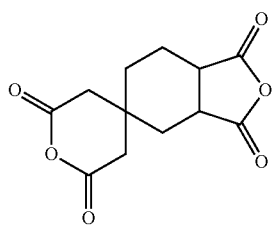
(IV-8-1)
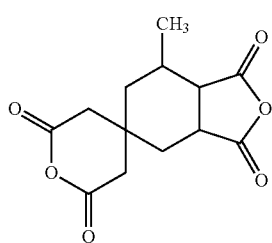
(IV-8-2)
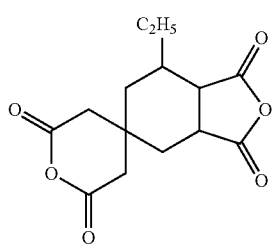
(IV-8-3)
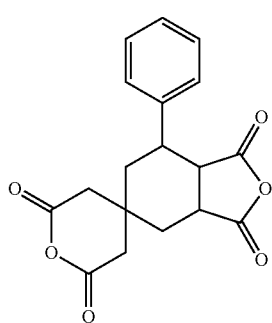
(IV-8-4)
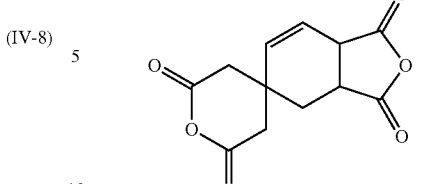
(IV-8-5)
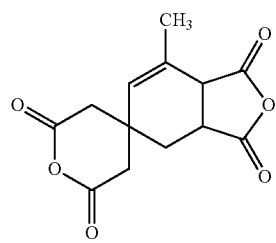
(IV-8-6)
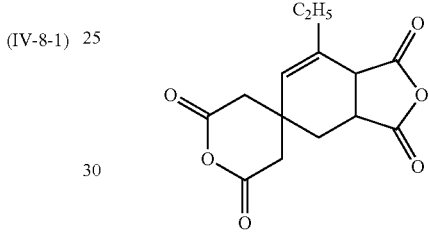
(IV-8-7)
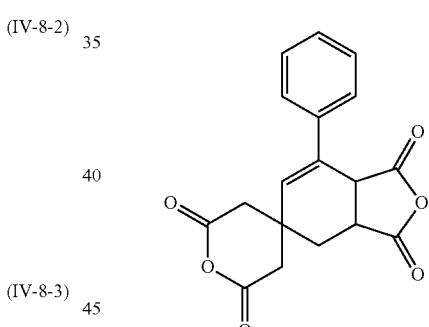
(IV-8-8)
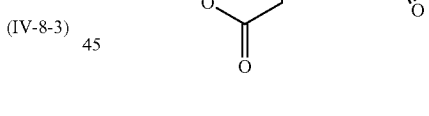
(IV-8-9)
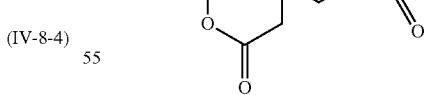
(IV8-10)

(IV-8-11)
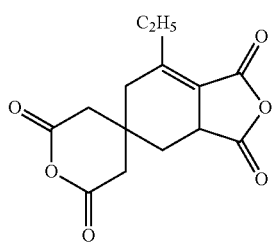
(IV-8-12)
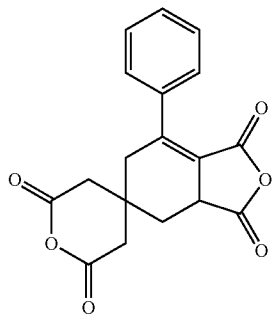
(IV-8-13)
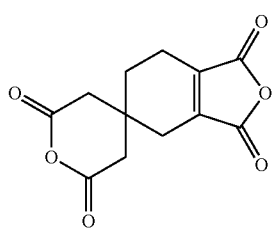
(IV-8-14)
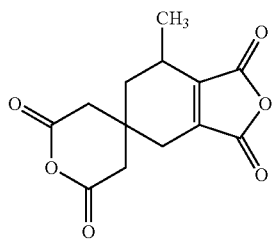
(IV-8-15)
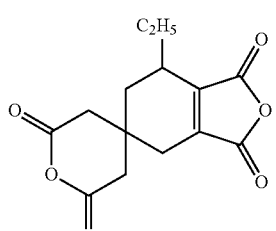
(IV-8-16)
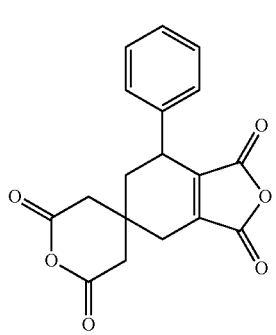
(IV-8-17)
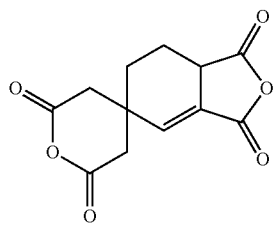
(IV-8-18)
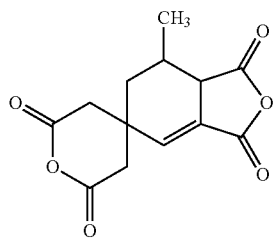
(IV-8-19)
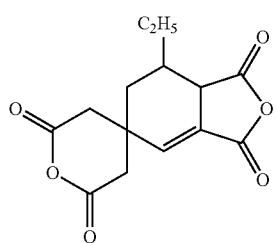
(IV-8-20)
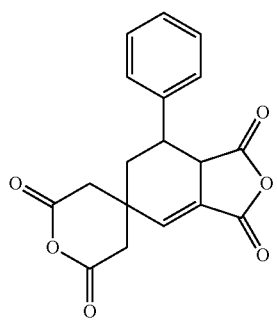
Chemical formula 73:
(IV-9)
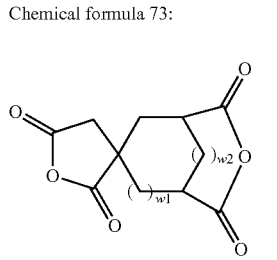
In general formula (IV-9), w1 and w2 are 0 or 1. Specific examples include tetracarboxylic dianhydrides represented by the following structural formulas.

Chemical formula 74:

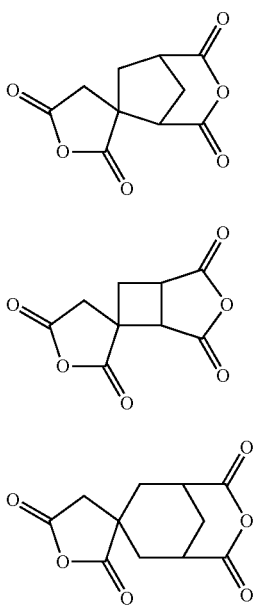

(IV-9-1)

(IV-9-2)

(IV-9-3)

General formula (IV-10) represents the following tetracarboxylic dianhydrides.

Chemical formula 75:

(IV-10)

Chemical formula 76:

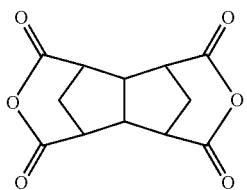

(IV-11)

In general formula (IV-11), ring $A^{15}$ each independently represents a cyclohexane ring or a benzene ring. Specific examples include tetracarboxylic dianhydrides represented by the following structural formulas.

Chemical formula 77:

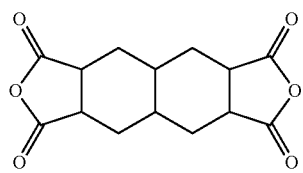

(IV-11-1)

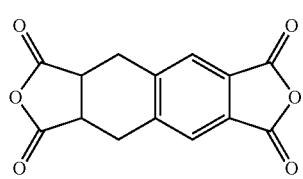

(IV-II-2)

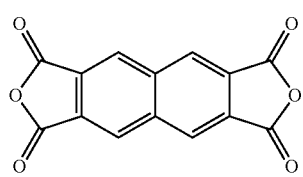

(IV-II-3)

Chemical formula 78:

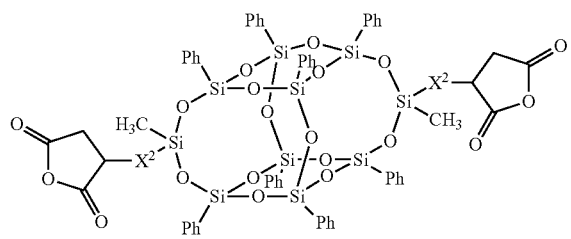

(IV-12)

In general formula (IV-12), $X^2$ represents alkylene having 2 to 6 carbons. Specific examples include a tetracarboxylic dianhydride represented by the following structural formula.

Chemical formula 79:

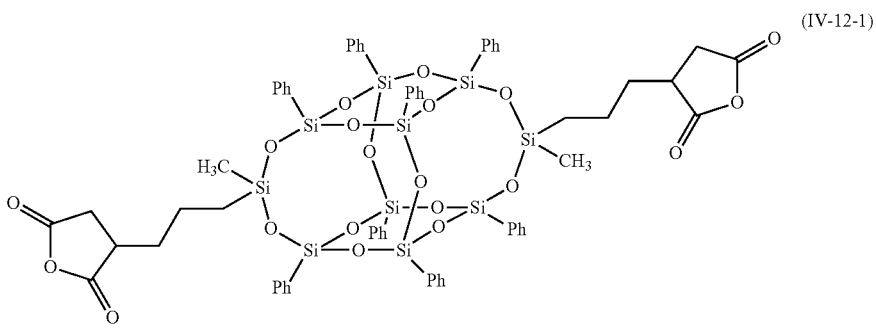

(IV-12-1)

Specific examples of preferred tetracarboxylic dianhydrides include compounds having the following structure.

Chemical formula 80:

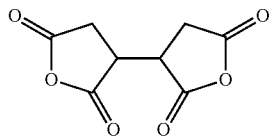
(IV-1-1)

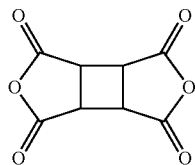
(IV-2-1)

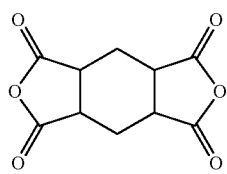
(IV-3-1)

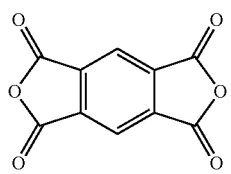
(IV-3-2)

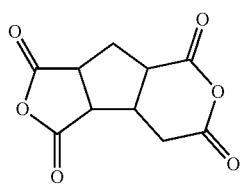
(IV-7-1)

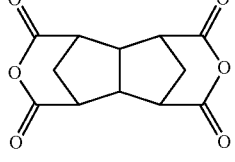
(IV-10-1)

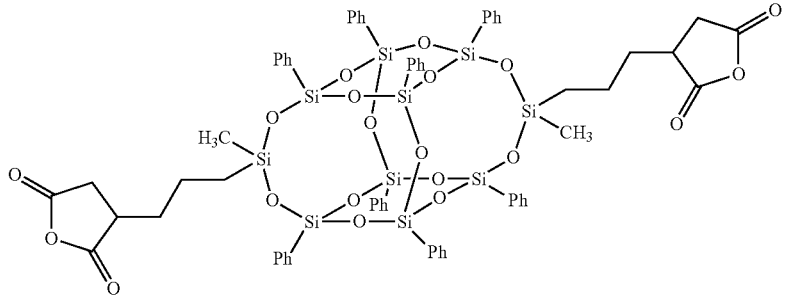
(IV-12-1)

The photopolymerizable monomer or oligomer used in the invention includes at least one kind of compound represented by general formula (3).

$$R^{a1}\text{—}Z\text{-}(E\text{-}Z)_{m1}\text{—}R^{a1} \quad (3)$$

In formula (3), $R^{a1}$ is independently a polymerizable group represented by the following formula (3-1-1) to formula (3-1-6), hydrogen, halogen, cyano, —CF$_3$, —CF$_2$H, —CFH$_2$, —OCF$_3$, —OCF$_2$H, —N=C=O, —N=C=S or alkyl having 1 to 20 carbons, and in the alkyl, arbitrary —CH$_2$— may be replaced by —O—, —S—, —SO$_2$—, —CO—, —COO—, —OCO—, —CH=CH—, —CF=CF— or —C≡C—, arbitrary hydrogen may be replaced by halogen or cyano, and at least one of $R^{a1}$ is a polymerizable group represented by formula (3-1-1) to formula (3-1-6); ring E is a saturated or unsaturated independent ring having 3 to 10 carbons, a condensed ring or a Spiro ring divalent group, and in the ring, arbitrary —CH$_2$— may be replaced by —O—, arbitrary —CH= may be replaced by —N=, arbitrary hydrogen may be replaced by halogen, cyano, nitro, isocyano, isothiocyanato, silyl monosubstituted to trisubstituted by alkyl having 1 to 4 carbons, straight-chain or branched-chain alkyl having 1 to 10 carbons or alkyl halide having 1 to 10 carbons, and in the alkyl, arbitrary —CH$_2$— may be replaced by —O—, —CO—, —COO—, —OCO—, —OCOO—, —CH=CH— or —C≡C—; Z is independently a single bond or alkylene having 1 to 20 carbons, and in the alkylene, arbitrary —CH$_2$— may be replaced by —O—, —S—, —CO—, —COO—, —OCO—, —OCOO—, —CH=CH—, —CF=CF—, —CH=N—, —N=CH—, —N=N—, —N(O)=N— or —C≡C—, and arbitrary hydrogen may be replaced by halogen; and m1 is an integer from 1 to 6.

Chemical formula 81:

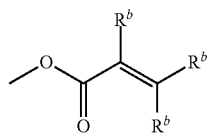
(3-1-1)

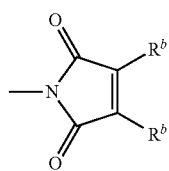
(3-1-2)

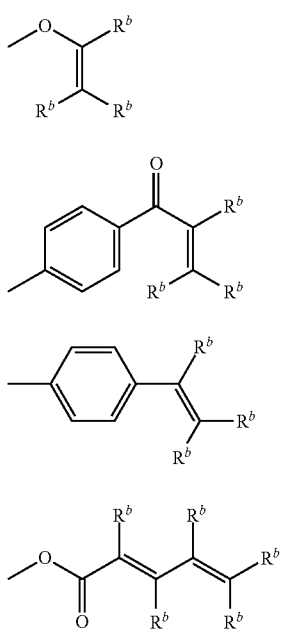

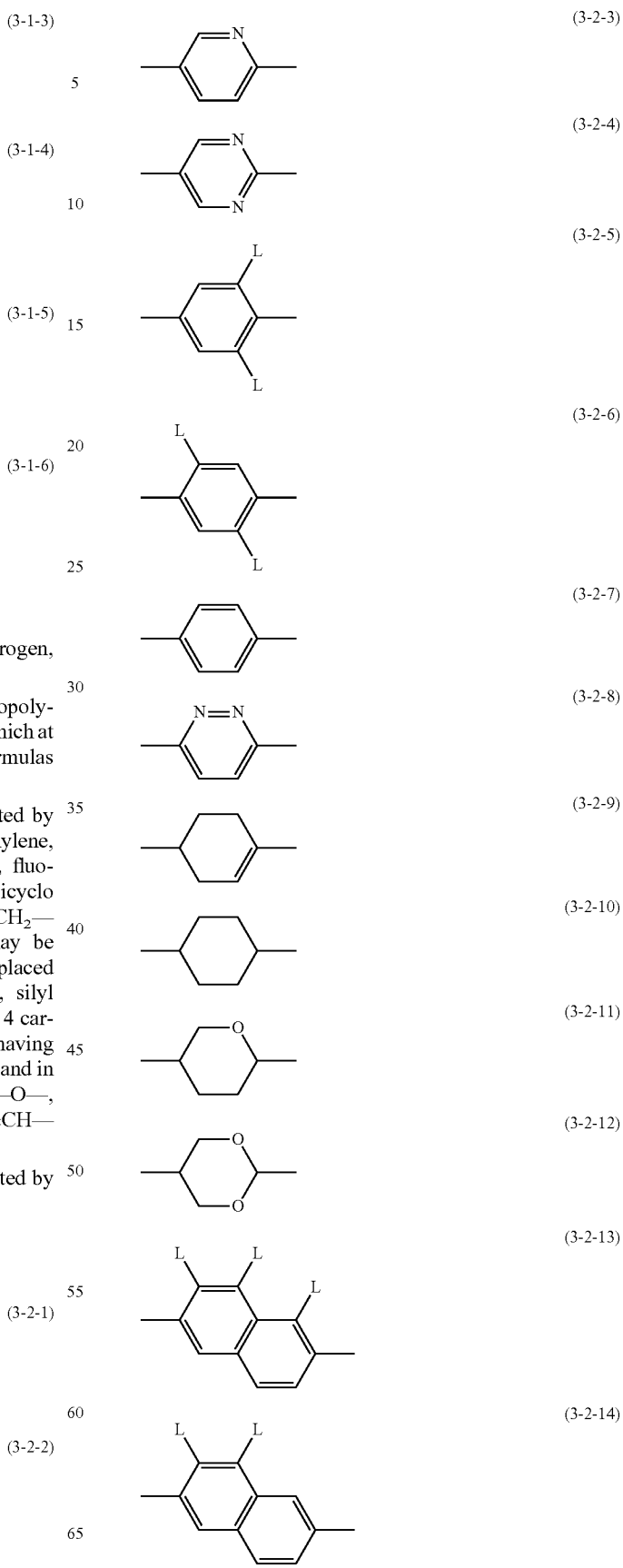

In formula (3-1-1) to formula (3-1-6), $R^b$ is hydrogen, halogen, —$CF_3$ or alkyl having 1 to 5 carbons.

Specific examples of preferred structure of the photopolymerizable monomer or oligomer include structure in which at least one of $R^{a1}$ is represented by any one of the formulas (3-1-1), (3-1-2) or (3-1-3) in the formula (3).

In the formula (3), E is a divalent group represented by 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl and bicyclo[3.1.0]hexane-3,6-diyl, and in the rings, arbitrary —$CH_2$— may be replaced by —O—, arbitrary —CH= may be replaced by —N=, and arbitrary hydrogen may be replaced by halogen, cyano, nitro, isocyano, isothiocyanato, silyl monosubstituted to trisubstituted by alkyl having 1 to 4 carbons or phenyl, straight-chain or branched-chain alkyl having 1 to 10 carbons or alkyl halide having 1 to 10 carbons, and in the alkyl, arbitrary —$CH_2$— may be replaced by —O—, —CO—, —COO—, —OCO—, —OCOO—, —CH=CH— or —C≡C—.

In the formula (3), E is preferably a group represented by the following formulas (3-2-1) to (3-2-21).

Chemical formula 82:

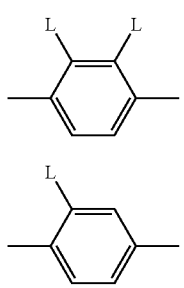

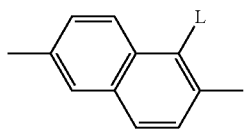 (3-2-15)
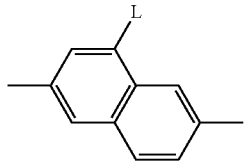 (3-2-16)
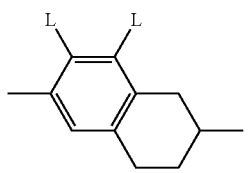 (3-2-17)
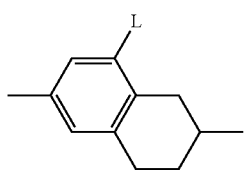 (3-2-18)
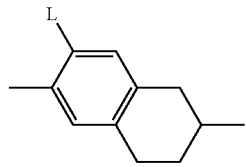 (3-2-19)
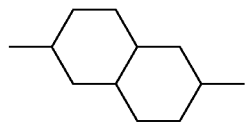 (3-2-20)
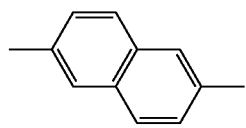 (3-2-21)
In formula (3-2-1) to formula (3-2-21), L represents a halogen atom or alkyl having 1 to 3 carbons.
Specific examples of further preferred structure of the photopolymerizable monomer or oligomer include the following structure.
Chemical formula 83:
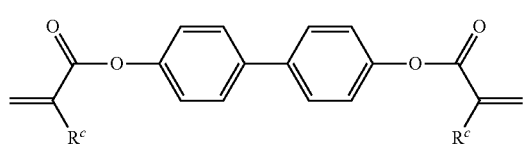 (3-3-1)
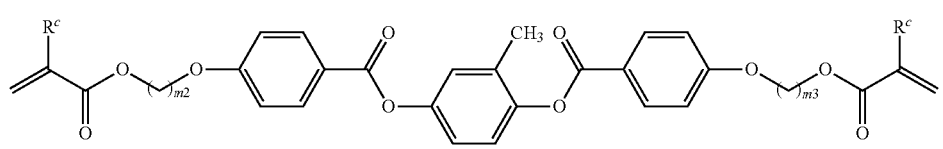 (3-3-2)
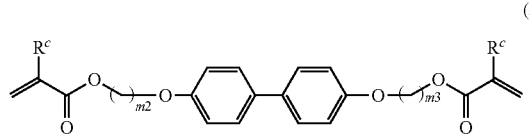 (3-3-3)
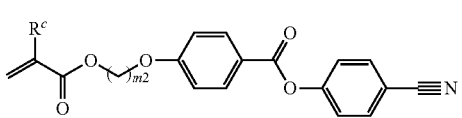 (3-3-4)
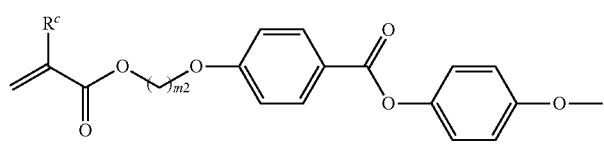 (3-3-5)
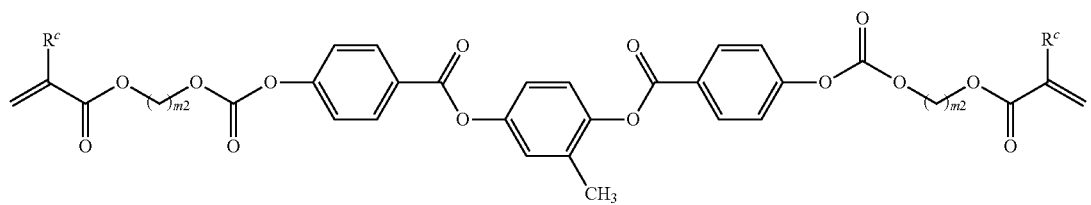 (3-3-6)

In the formulas, $R^c$ represents hydrogen or methyl, m2 represents an integer from 1 to 6, and m3 represents an integer from 1 to 6.
Specific examples of still further preferred structure of the photopolymerizable monomer or oligomer include the following structure.
Chemical formula 84:
(3-3-2-1)
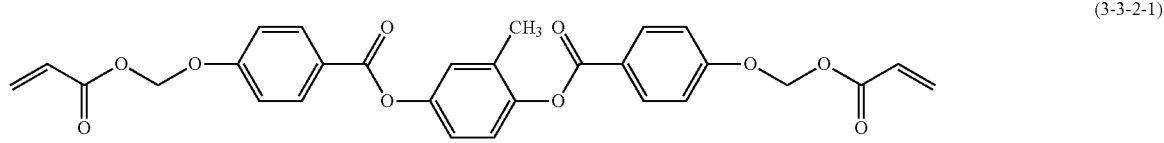
(3-3-2-2)
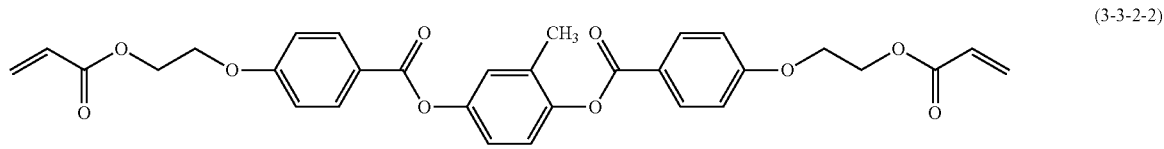
(3-3-2-3)
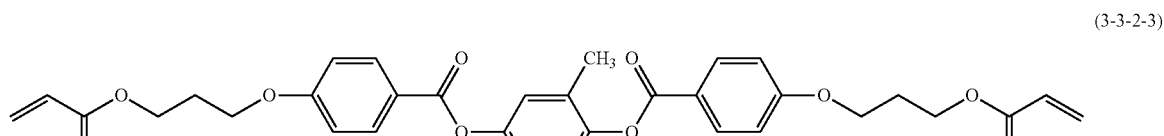
(3-3-2-4)
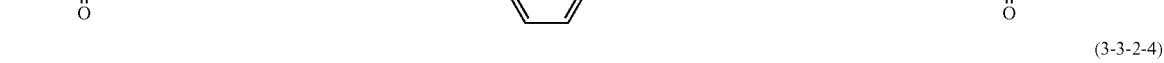
(3-3-2-5)
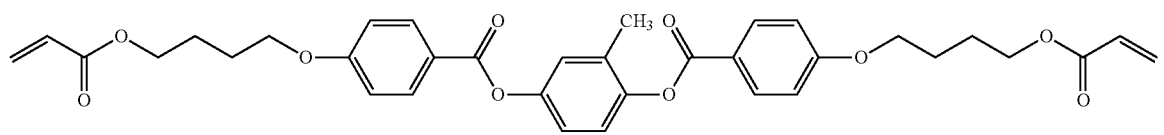
(3-3-2-6)
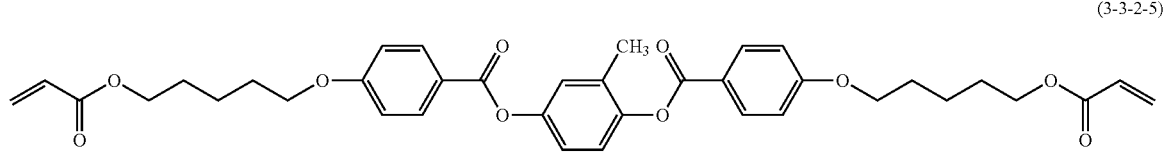
Chemical formula 85:
(3-3-3-1)    (3-3-3-2)
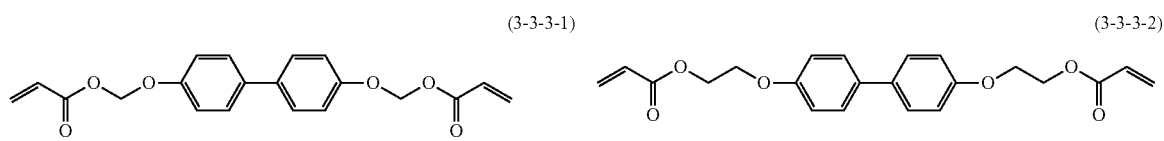
(3-3-3-3)
(3-3-3-4)
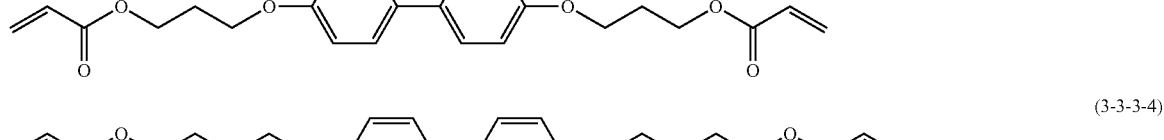
(3-3-3-5)
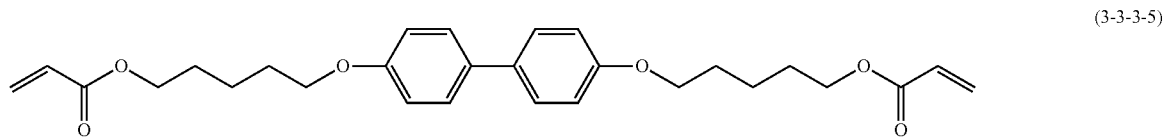

(3-3-3-6)
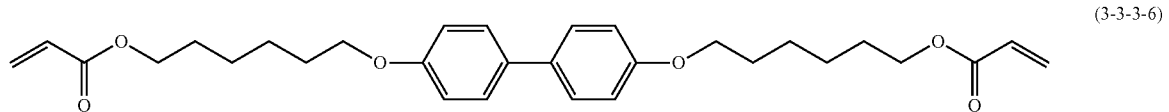
Chemical formula 86:
(3-3-4-1) (3-3-4-2)
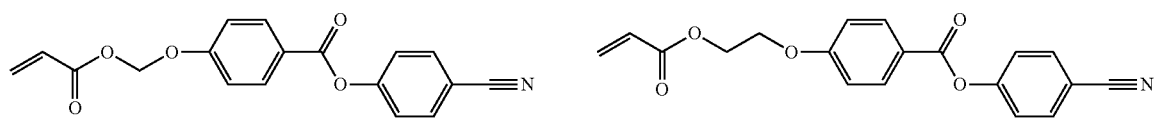
(3-3-4-3) (3-3-4-4)
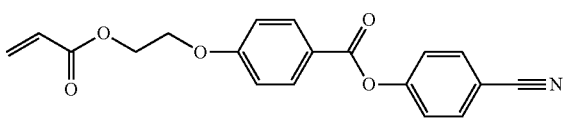
(3-3-4-5)
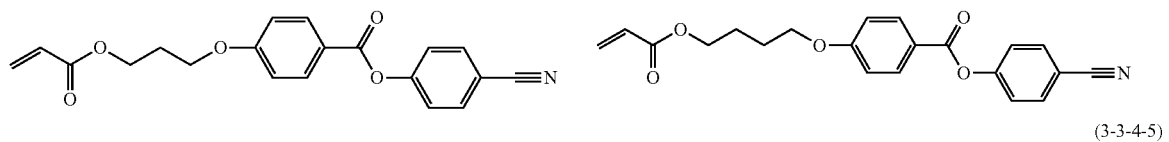
(3-3-4-6)
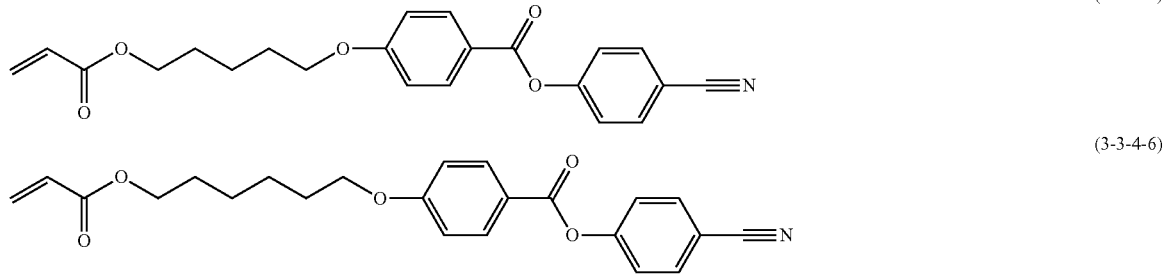
Chemical formula 87:
(3-3-5-1) (3-3-5-2)
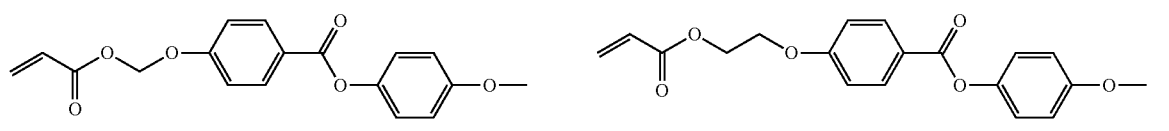
(3-3-5-3) (3-3-5-4)
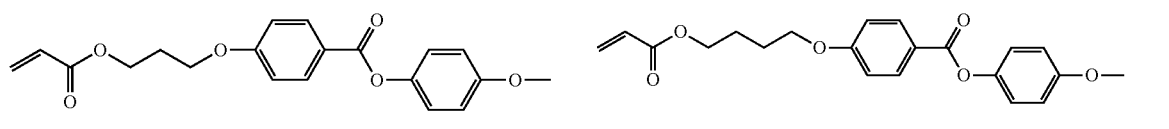
(3-3-5-5)
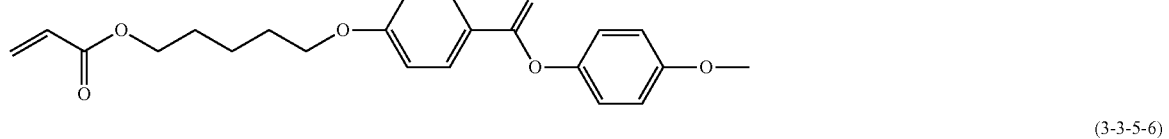
(3-3-5-6)
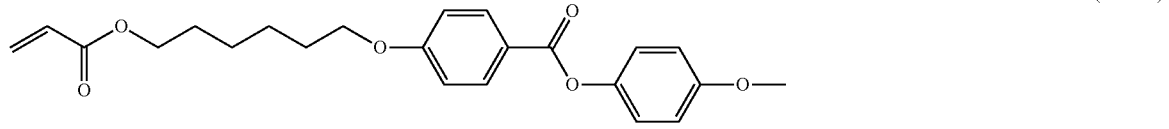
Chemical formula 88:
(3-3-6-1)
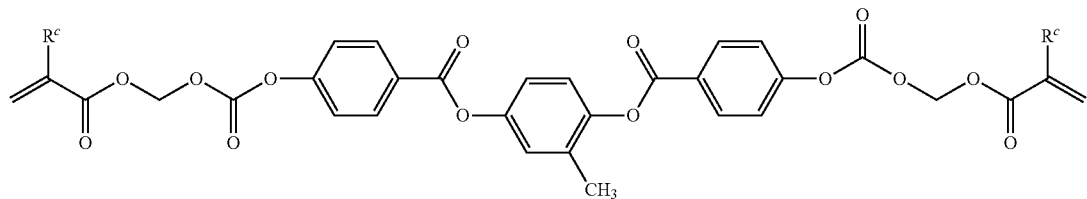

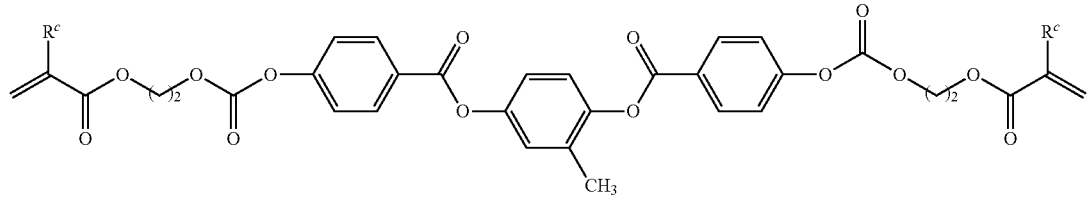
(3-3-6-2)

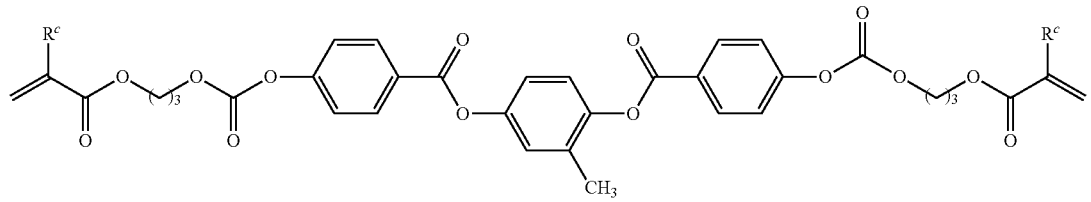
(3-3-6-3)

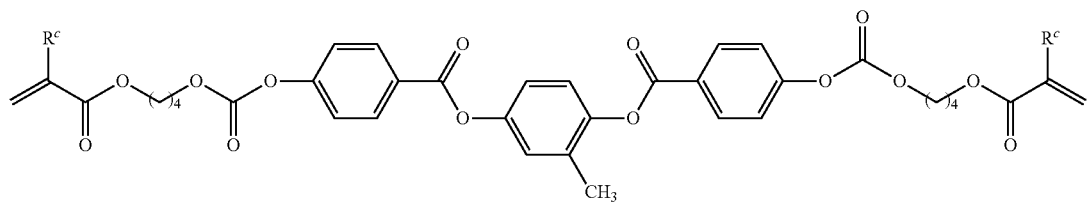
(3-3-6-4)

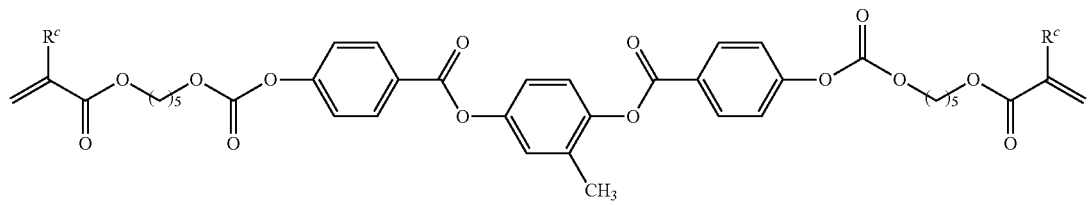
(3-3-6-5)

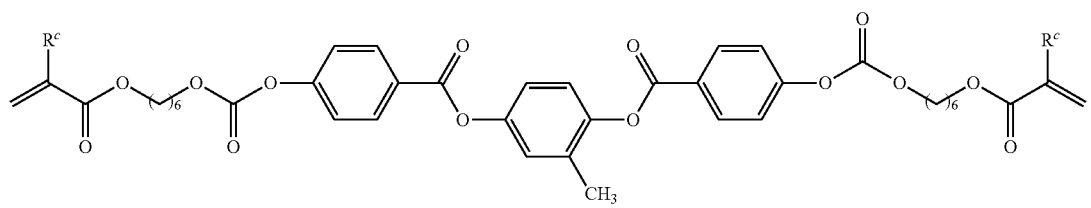
(3-3-6-6)

Specific examples of the most preferred structure of the photopolymerizable monomer or oligomer include the following structure represented by the formulas (3-3-2-3), (3-3-2-6), (3-3-3-6), (3-3-4-6) and (3-3-5-6), and the following structure.

Chemical formula 89:

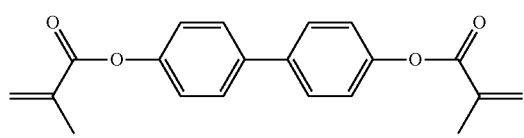
(3-3-1-1)

The photopolymerizable monomer or oligomer to be contained in the polyimide or polyamic acid can be mixed in the range of 0.01 to 30% by weight of a solid concentration of the polyimide or polyamic acid.

The photopolymerizable monomer or oligomer is desirably mixed in the range of 0.01% by weight or more in order to exhibit an effect for determining a direction of tilt of the liquid crystals after polymerization. Moreover, the photopolymerizable monomer or oligomer is desirably mixed in the range of 30% by weight or less in order to make an effect of aligning a polymer after polymerization appropriate, or to avoid leaching of the unreacted monomer or oligomer into the liquid crystals after ultraviolet light irradiation.

In the general formula (I) or (II), a polyimide or polyamic acid may be contained, having a group for generating a radical by light in $R^{11}$, $R^{12}$ or $R^{13}$ at a ratio in the range of 0.05 to 0.5 in a constitutional unit.

In the general formula (I) or (II), a polyimide or polyamic acid is preferably contained, having a group including a benzophenone, maleimide or cinnamate skeleton in $R^{11}$, $R^{12}$ or $R^{13}$ at a ratio in the range of 0.05 to 0.5 in the constitutional unit.

In the general formula (I) or (II), specific examples of $R^{11}$, $R^{12}$ or $R^{13}$ include a divalent, tetravalent or monovalent group including (VI-1) to (VI-5), (VII-1) and (VIII-1) to (VIII-2), respectively.

Chemical formula 90:

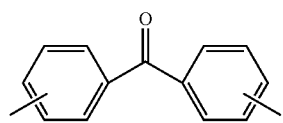
(VI-1)

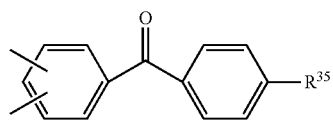
(VI-2)

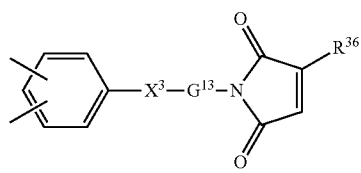
(VI-3)

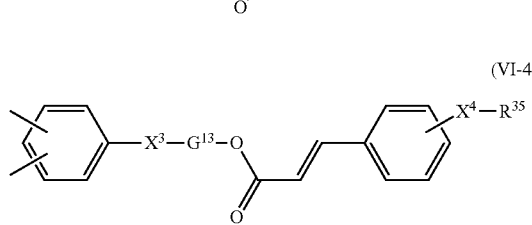
(VI-4)

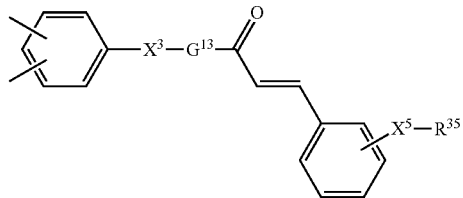
(VI-5)

In the formula, $R^{35}$ is hydrogen or a hydrocarbon group having 1 to 25 carbons, and arbitrary hydrogen of the hydrocarbon group may be replaced by F, $R^{36}$ is hydrogen, methyl or phenyl, $X^3$ and $X^4$ are a single bond, —COO— or —O—, $X^5$ is —COO— or —O—, and $G^{13}$ represents alkylene having 2 to 6 carbons.

Chemical formula 91:

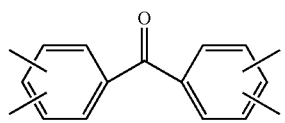
(VII-1)

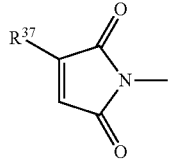
(VIII-1)

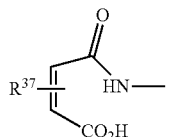
(VIII-2)

$R^{37}$ is hydrogen, methyl or phenyl.

Specific examples of (VI-1) to (VI-5), (VII-1), and (VIII-1) to (VIII-2) preferably include the following compounds.

Chemical formula 92:

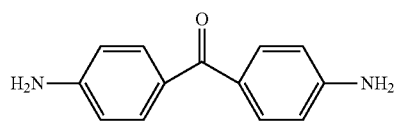
(VI-1-1)

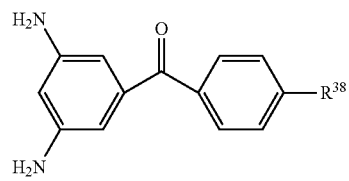
(VI-2-1)

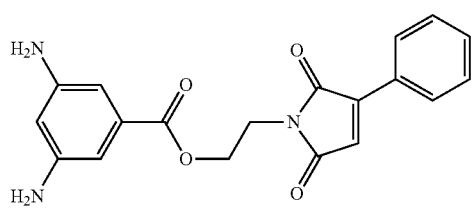
(VI-3-1)

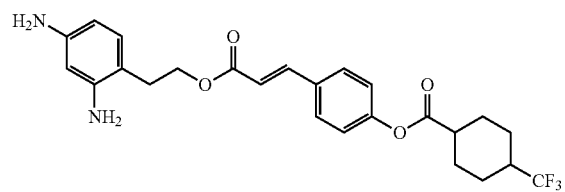
(VI-4-1)

(VI-4-2)
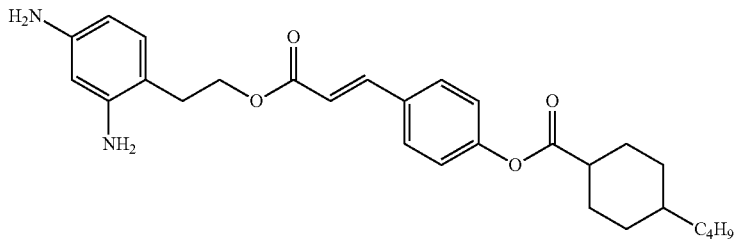
(VI-4-3)
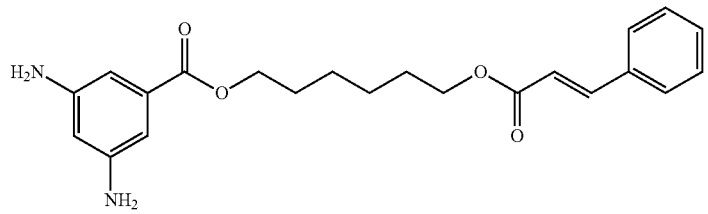
(VI-4-4)
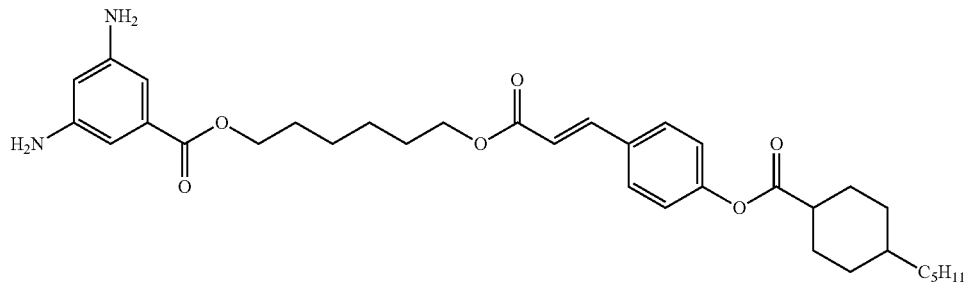
(VI-4-5)
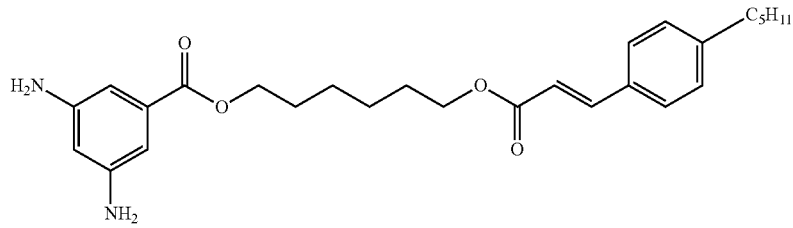
(VI-5-1)
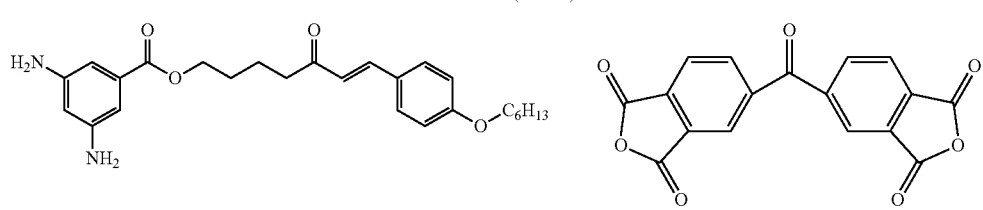
(VII-1-1)
(VIII-1-1)
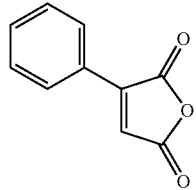

In the general formula, $R^{38}$ is hydrogen or alkyl having 1 to 25 carbons.

Molecular weight of the polyimide or polyamic acid is preferably in the range of 10,000 to 500,000, further preferably, in the range of 20,000 to 200,000, for example, in terms of polystyrene-equivalent weight average molecular weight (Mw) according to a gel permeation chromatography (GPC) method.

The polyimide or polyamic acid can be manufactured in a manner similar to manufacture of a publicly known polyimide or polyamic acid used for forming a film of the polyimide except that the tetracarboxylic dianhydride and the diamine described above are used. For example, into a reaction vessel equipped with a raw material feeding port, a nitrogen inlet, a thermometer, a stirrer and a condenser, one kind or two or more kinds of diamines represented by general formulas (III-1) to (III-5), or as the case may be, one kind or two or more kinds of diamines selected from other diamines, and where necessary, a desired amount of a monoamine are charged.

Next, a solvent (for example, N-methyl-2-pyrrolidone, dimethylformamide being an amide polar solvent) and one kind or two or more kinds of tetracarboxylic dianhydrides, and furthermore when necessary, a carboxylic anhydride are charged. On the occasion, the total amount of charging the tetracarboxylic dianhydride is preferably allowed to be substantially equimolar to the total number of moles of the diamine (a molar ratio from about 0.9 to 1.1).

The photopolymerizable monomer or oligomer may be added simultaneously upon mixing the tetracarboxylic dianhydride and the diamine, or after mixing the tetracarboxylic dianhydride and the diamine.

The structure represented by general formula (I) or (II) in the polyimide or polyamic acid can be specified according to an ordinary technology in specifying the structure of the polymer, further specifically, by means of IR or NMR.

More specifically, the polyamic acid or the derivative thereof in the invention can be identified by allowing precipitation with a large amount of poor solvent to completely separate a solid content and the solvent by filtration or the like, and then analyzing the solid content by means of IR or NMR. Furthermore, a monomer used can be identified by decomposing the polyamic acid or the derivative thereof being the solid content with an aqueous solution of a strong alkali such as KOH and NaOH, and then extracting the resultant material with an organic solvent, and analyzing the extracted material by means of GC, HPLC or GC-MS.

Concentration of a polymeric component containing the polyamic acid or the derivative thereof in the aligning agent in the invention is not particularly limited, but is preferably in the range of 0.1 to 40% by weight. When applying the aligning agent to a substrate, an operation for diluting the polymeric component contained with a solvent in advance may be needed for adjusting film thickness. When dilution of the aligning agent is needed for adjusting the film thickness, the concentration of the polymeric component is preferably 40% by weight or less from a viewpoint of adjusting viscosity of the aligning agent to a level suitable for easily mixing the solvent to the aligning agent.

The concentration of the polymeric component in the aligning agent may be adjusted according to a method for applying the aligning agent. When the method for applying the aligning agent includes a spinner method or a printing method, the concentration of the polymeric component is adjusted ordinarily to be 10% by weight or less for keeping a good film thickness in many cases. According to other application methods such as a dipping method and an ink jet method, the concentration may be adjusted to be much lower.

On the other hand, when the concentration of the polymeric component is 0.1% by weight or more, the film thickness of the alignment layer obtained easily becomes optimum. Accordingly, the concentration of the polymeric component is 0.1% by weight or more, preferably, in the range of 0.5% by weight to 10% by weight according to an ordinary spinner method, printing method or the like. However, the aligning agent may be used in a more dilute concentration depending on the method for applying the aligning agent.

In the case where the aligning agent is used for preparation of the alignment layer, the viscosity of the aligning agent of the invention can be determined according to a means and a method for forming the film of the aligning agent. For example, when forming the film of the aligning agent by using a printing machine, the viscosity is preferably 5 mPa·s or more from a viewpoint of obtaining a sufficient film thickness, preferably, 100 mPa·s or less from a viewpoint of suppressing printing unevenness, further preferably, in the range of 10 to 80 mPa·s. When applying the aligning agent according to spin coating and forming the film of the aligning agent, the viscosity is preferably in the range of 5 to 200 mPa·s, further preferably, in the range of 10 to 100 mPa·s from a similar viewpoint. The viscosity of the aligning agent can be reduced by dilution using the solvent or curing with stirring.

The aligning agent used for the device of the invention may be in a form of a so-called polymer blend. Specific examples of the aligning agent in such a form include an aligning agent in which diamine A contains a diamine represented by general formulas (III-1) to (III-13), and diamine B does not contain the diamine represented by general formulas (III-1) to (III-13) in the aligning agent containing the polyamic acid or derivative A thereof being the reaction product of tetracarboxylic dianhydride A with diamine A, or containing the polyamic acid or derivative B thereof being the reaction product of tetracarboxylic dianhydride B with diamine B.

The polyamic acid or derivative A thereof is identical with the polyamic acid or the derivative thereof described above as used for the device in the invention. The polyamic acid or derivative B thereof is identical with the polyamic acid or the derivative thereof described above in the invention except that the diamines represented by general formula (III-1) to (III-13) are not contained in the diamine, more specifically, except that any other diamine described above is used for the diamine.

The tetracarboxylic acid described above can be used for tetracarboxylic dianhydride A and tetracarboxylic dianhydride B. The diamine represented by general formulas (III-1) to (III-13) may be contained in the diamine A, and any other diamine described above may be further contained in the diamine A. Any other diamine described above, other than the diamine represented by general formulas (III-1) to (III-13), can be used for the diamine B.

Content of the polyamic acid or derivative B thereof in the aligning agent described above as used for the device of the invention is not particularly limited, if the content includes an amount for exhibiting advantageous effect of the invention, but is preferably in the range of 1 to 50% by weight based on the total amount of the polymer in the aligning agent, further preferably, in the range of 2 to 30% by weight from a viewpoint of satisfying both exhibition of the advantageous effects of the invention and adjustment of alignment properties.

The alignment layer used for the device of the invention is obtained from the aligning agent of the invention described above. The alignment layer of the invention can be obtained according to a process for forming a coating film of the aligning agent of the invention, a process for heating and calcining the coating film and a process for injecting the liquid crystals to adjust the liquid crystal display element, and then exhibiting the anisotropy on a liquid crystal interface of the aligning agent by an electric field, and immobilizing the anisotropy by light irradiation.

The coating film can be formed by applying the aligning agent of the invention to the substrate in the liquid crystal display element in a manner similar to an ordinary preparation of the alignment layer. Specific examples of the substrate include a substrate made from glass on which an electrode such as an Indium Tin Oxide (ITO) electrode, a color filter and so forth may be provided.

As a method for applying the aligning agent to the substrate, a spinner method, a printing method, a dipping method, a dropping method, an ink jet method or the like is generally known. The methods can also be applied in a similar manner in the invention.

Calcination of the coating film can be performed under conditions required for the polyamic acid or the derivative thereof to show a dehydration and ring-closure reaction. As for the calcination of the coating film, a method for performing heat treatment in an oven or an infrared furnace, a method for performing heat treatment on a hot plate, or the like, is generally known. The methods can also be applied in a similar manner in the invention. In general, the calcination is preferably performed at a temperature in the range of about 100 to about 300° C. for 1 minute to 3 hours. The calcination is further preferably performed in the range of 100 to 230° C., and thus 50% or more of the photopolymerizable monomer or oligomer wholly remains without thermal polymerization, and is still further preferably in the range of 180 to 230° C., and thus 50% or more of the photopolymerizable monomer or oligomer wholly remains without thermal polymerization.

The alignment layer of the invention is suitably obtained by a method further including any process other than the process described above. Specific examples of such any other process include a process for drying the coating film and a process for cleaning the film with a cleaning solution.

As the drying process, a method for performing heat treatment in an oven or an infrared furnace, a method for performing heat treatment on a hot plate, or the like, in a manner similar to the calcination process is generally known. The methods can also be applied to the drying process in a similar manner. The drying process is preferably performed at a temperature within which the solvent can be evaporated, further preferably, at a temperature comparatively lower than the temperature in the calcination process.

Specific examples of the methods for cleaning the alignment layer with the cleaning solution include brushing, jet spraying, vapor cleaning and ultrasonic cleaning. The methods may be applied alone or in combination. As the cleaning solution, pure water, various kinds of alcohols such as methyl alcohol, ethyl alcohol and isopropyl alcohol, aromatic hydrocarbons such as benzene, toluene and xylene, halogen solvents such as methylene chloride, or ketones such as acetone and methyl ethyl ketone can be used, but the cleaning solution is not limited thereto. A fully purified cleaning solution containing a small amount of impurities is clearly used as the cleaning solutions. Such a cleaning method can also be applied to the cleaning process in formation of the alignment layer of the invention.

The film thickness of the alignment layer of the invention is not particularly limited, but is preferably in the range of 10 to 300 nanometers, further preferably, in the range of 30 to 150 nanometers. The film thickness of the alignment layer of the invention can be measured by means of a publicly known thickness measurement apparatus such as a profilometer and an ellipsometer.

The liquid crystal display element of the invention has a pair of substrates, the liquid crystal layer containing the liquid crystal molecules to be formed between the pair of substrates, the electrode for applying voltage to the liquid crystal layer, and the alignment layer for aligning the liquid crystal molecules in a predetermined direction. The alignment layer of the invention described above is used for the alignment layer.

The substrate made from glass described above in the alignment layer of the invention can be used for the substrate, and the ITO electrode to be formed on the substrate made from glass as described above in the alignment layer of the invention can be used for the electrode.

The liquid crystal layer is formed by the liquid crystal composition to be sealed in a gap between the pair of substrates opposing such that a plane where the alignment layer in one of the pair of substrates is formed is directed toward the other substrate.

The liquid crystal display element of the invention is obtained by forming the alignment layer of the invention on at least one of the pair of substrates, opposing the pair of substrates obtained to each other by facing the alignment layer inward through a spacer, sealing the liquid crystal composition into the gap formed between the substrates, and then forming the liquid crystal layer. A further process for attaching a polarization film to the substrate, or the like, may be included in manufacture of the liquid crystal display element of the invention, when necessary Upon allowing the photopolymerizable monomer or oligomer to polymerize, ultraviolet light or visible light is ordinarily used. Wavelength of light used for light irradiation is in the range of 150 to 500 nanometers, preferably, in the range of 250 to 450 nanometers, further preferably, in the range of 300 to 400 nanometers. Specific examples of light sources for light irradiation include a low-pressure mercury lamp (a germicidal lamp, a fluorescent chemical lamp or a black light), a high-pressure discharge lamp (a high-pressure mercury lamp or a metal halide lamp) and a short arc discharge lamp (an ultra-high pressure mercury lamp, a xenon lamp or a mercury-xenon lamp).

Among the lamps, the metal halide lamp, the xenon lamp and the high-pressure mercury lamp are preferred.

As for the light from the light sources, a wavelength region of an irradiation light source may be selected by installing a filter or the like and allowing only a specific wavelength region to pass. An amount of light to be radiated from the light sources is in the range of 1,000 to 100,000 mJ/cm$^2$, preferably, in the range of 2,000 to 50,000 mJ/cm$^2$, further preferably, in the range of 5,000 to 30,000 mJ/cm$^2$.

As for the liquid crystal display element of the invention, various liquid crystal display elements for electric field modes can be formed.

Specific examples of such liquid crystal display elements for electric field modes include a liquid crystal display element for a transverse electric field mode in which the electrode applies voltage to the liquid crystal layer in a direction horizontal to the surface of the substrate, and a liquid crystal display element for a longitudinal electric field mode in which the electrode applies voltage to the liquid crystal layer in a direction perpendicular to the surface of the substrate.

For the liquid crystal display element for the transverse electric field mode, exhibition of a relatively large pretilt angle is not needed, and therefore the alignment layer using the aligning agent of the invention as obtained from the diamine containing no diamine having the side chain is suitably used therefor.

For the liquid crystal display element for the longitudinal electric field mode, exhibition of a relatively large pretilt angle is needed, and therefore the alignment layer using the aligning agent of the invention as obtained from the diamine containing the diamine having the side chain, or the diamine having the side chain for the diamine B is suitably used.

Thus, the alignment layer prepared by using the aligning agent of the invention as a raw material can be applied to liquid crystal display elements according to various display driving modes by appropriately selecting the polymer being the raw material.

Sixth, the additive that may be mixed will be explained. To begin with, the additive that may be mixed with the liquid crystal composition will be explained. Such an additive includes the optically active compound, the antioxidant, the ultraviolet light absorber, the coloring matter, the antifoaming agent, the polymerization initiator and the polymerization inhibitor. The optically active compound is mixed with the composition for the purpose of inducing a helical structure and giving a twist angle in the liquid crystals. Examples of such a compound include compound (4-1) to compound (4-4). A preferred ratio of the optically active compound is 5% by weight or less, and a further preferred ratio is in the range of 0.01% by weight to 2% by weight.

Chemical formula 93:

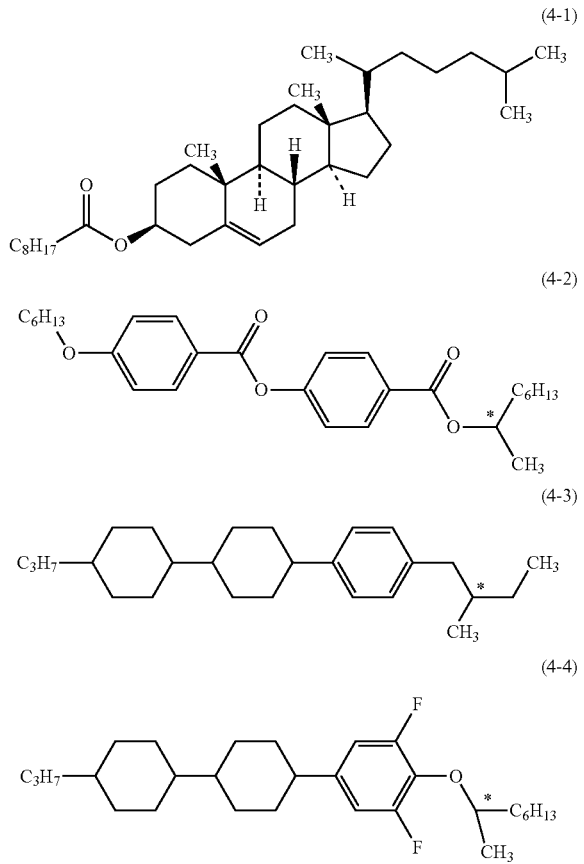

The antioxidant is mixed with the liquid crystal composition for the purpose of preventing a decrease in specific resistance caused by heating in air, or maintaining a large voltage holding ratio at room temperature and also at a high temperature after the device has been used for a long period of time.

Chemical formula 94:

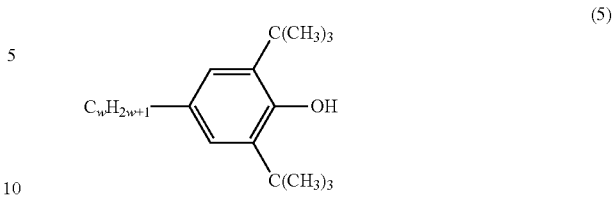

Preferred examples of the antioxidant include compound (5) where w is an integer from 1 to 9. In compound (5), preferred w is 1, 3, 5, 7 or 9. Further preferred w is 1 or 7. Compound (5) where w is 1 is effective in preventing a decrease in specific resistance caused by heating in air because the compound (5) has a large volatility. Compound (5) where w is 7 is effective in maintaining a large voltage holding ratio at room temperature and also at a high temperature after the device has been used for a long period of time because the compound (5) has a small volatility. A preferred ratio of the antioxidant is 50 ppm or more for achieving the effect thereof, and 600 ppm or less for avoiding a decrease in maximum temperature or avoiding an increase in minimum temperature. A further preferred ratio is in the range of 100 ppm to 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is 50 ppm or more for achieving the effect thereof, and 10,000 ppm or less for avoiding a decrease in maximum temperature or avoiding an increase in minimum temperature. A further preferred ratio is in the range of 100 ppm to 10,000 ppm.

A dichroic dye such as an azo dye or an anthraquinone dye is mixed with the composition to be adapted for a device having a guest host (GH) mode. A preferred ratio of the dye is in the range of 0.01% by weight to 10% by weight.

The antifoaming agent such as dimethyl silicone oil or methyl phenyl silicone oil is mixed with the composition for preventing foam formation. A preferred ratio of the antifoaming agent is 1 ppm or more for achieving the effect thereof, and 1,000 ppm or less for avoiding a poor display. A further preferred ratio is in the range of 1 ppm to 500 ppm.

The polymerization initiator is mixed as a substance easily generating radicals or ions and required for initiating a chain polymerization reaction. For example, Irgacure 651 (registered trademark), Irgacure 184 (registered trademark) or Darocure 1173 (registered trademark) (Ciba Japan K K.), each being a photopolymerization initiator, is suitable for radical polymerization. The polymerizable compound contains the photopolymerization initiator preferably in the range of 0.1% by weight to 5% by weight, particularly preferably, in the range of 1% by weight to 3% by weight.

The polymerization inhibitor is mixed in a radical polymerization system for the purpose of quickly reacting with the radials generated from the polymerization initiator or a monomer to change into a stable radical or a neutral compound, as a result, to terminate the polymerization reaction. The polymerization inhibitor is structurally classified into several forms. One of the forms is a radical that is stable in itself, such as tri-p-nitrophenylmethyl or di-p-fluorophenylamine, and the other is a compound that easily reacts with the radical present in a polymerization system to change into the stable radical, such as a nitro, nitroso, amino or polyhydroxy compound as the representative thereof. The representatives of the latter include hydroquinone and dimethoxybenzene. A preferred ratio of the polymerization inhibitor is 5 ppm or more for achieving the effect thereof and 1,000 ppm or less for avoiding a poor display. A further preferred ratio is in the range of 5 ppm to 500 ppm.

Next, the additive that may be mixed with the aligning agent will be explained. The aligning agent of the invention may further contain components other than the polyimide or polyamic acid, and the photopolymerizable monomer or oligomer. Other components may include one kind or two ore more kinds.

For example, the polymerization initiator or the polymerization inhibitor can be added to the polyimide or polyamic acid, and the photopolymerizable monomer or oligomer.

The polymerization initiator is not necessarily added, but the polymerization can be quickly performed by adding the polymerization initiator.

The polymerization initiator is not particularly limited, but a publicly known product can be used. Specific examples include 4-methoxyphenyl-2,4-bis(trichloromethyl)triazine, 2-(4-butoxystyryl)-5-trichloromethyl-1,3,4-oxadiazole, 9-phenylacridine, 9,10-benzphenazine, a benzophenone/Michler's ketone mixture, a hexaarylbiimidazole/mercaptobenzimidazole mixture, 1-(4-isopropylphenyl)-2-hydroxymwrhylpropane-1-one, benzyl dimethyl ketal, 2-methyl-1-[4-(methylthio)phenyl]-2-morpholinopropane-1-one, a 2,4-diethylxanthone/methyl p-dimethylaminobenzoate mixture, and a benzophenone/methyltriethanolamine mixture. Specific examples of commercial products include "Darocure series 1173 and 4265," "Irgacure series 184, 369, 500, 651, 784, 819, 907, 1300, 1700, 1800, 1850 and 2959" made by Ciba Specialty Chemicals Inc. The polymerization initiator may be used alone or by suitably mixing the products.

Moreover, an amount of polymerization initiator addition is desirably 10% by weight or less based on the photopolymerizable monomer or oligomer. If the polymerization initiator is added in 10% by weight or more, the polymerization initiator may act as the impurity, and a display quality level of the display device may decrease.

The polymerization inhibitor is not necessarily added, but the photopolymerizable monomer or oligomer has high polymerization properties, and therefore the polymerization inhibitor may be added in order to facilitate handling the photopolymerizable monomer or oligomer.

As such a stabilizer, a publicly known product can be used without limitation. Specific examples include hydroquinone, 4-ethoxy-phenol and 3,5-di-t-butyl-4-hydroxytoluene (BHT). The stabilizer may be used alone or by suitably mixing the products.

Moreover, an amount of polymerization inhibitor addition is desirably 10% by weight or less based on the photopolymerizable monomer or oligomer. If the polymerization inhibitor is added over 10% by weight, the polymerization inhibitor may act as the impurity For example, the aligning agent used for the device of the invention may further contain an epoxy compound from a viewpoint of improving durability in the alignment layer. The epoxy compound is not particularly limited, if the compound has an epoxy, but a compound having two or more oxiranes is preferred. The epoxy compound may include one kind of compound or two or more compounds.

In the invention, content of the epoxy compound in the aligning agent is not particularly limited, but is preferably in the range of 0.1 to 40% by weight, further preferably, in the range of 0.2 to 30% by weight based on the aligning agent from a viewpoint of improving durability in the alignment layer formed from the aligning agent.

Specific examples of the epoxy compound include a bisphenol A type epoxy resin, a glycidyl ester type epoxy resin, a cycloaliphatic epoxy resin, a polymer of a monomer having an oxirane, a copolymer of a monomer having an oxirane and any other monomer, a compound represented by the following structural formulas (E1) to (E3) and (E5), and a compound represented by the following general formula (E4).

Chemical formula 95:

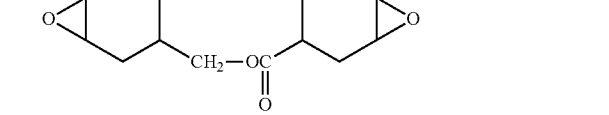

(E1)

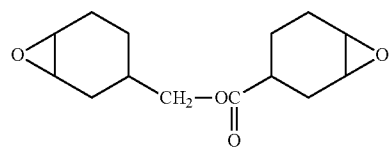

(E2)

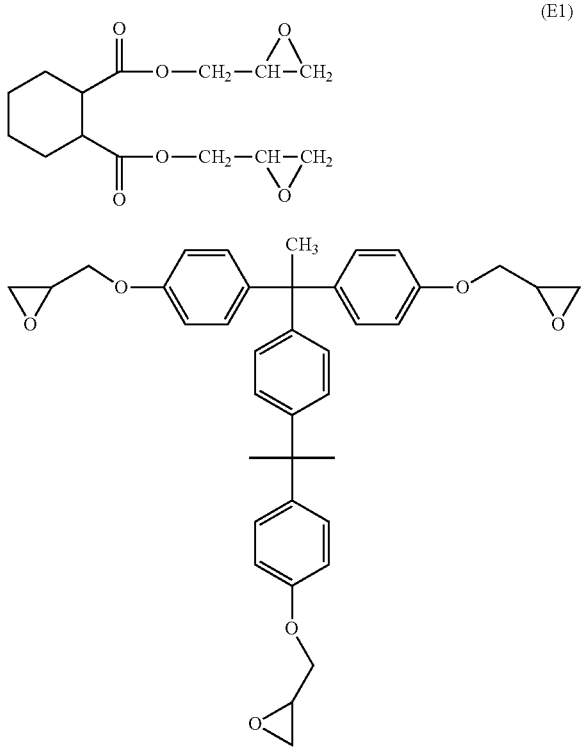

(E3)

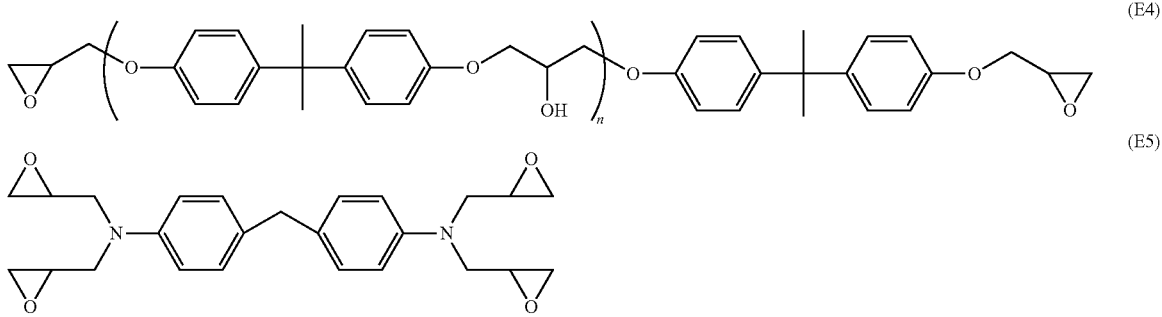

(E4)

(E5)

In general formula (E4), n represents an integer from 0 to 10.

Further specific examples of the epoxy resin include "Epicoat 807," "Epicoat 815," "Epicoat 825" and "Epicoat 827" (trade names).

Specific examples of compounds represented by general formula (E4) include "Epicoat 828," "Epicoat 190P," "Epicoat 191P," "Epicoat 1004" and "Epicoat 1256" (trade names) (made by Japan Epoxy Resin Co., Ltd.), and "Araldite CY177" (trade name).

Specific examples of compounds represented by structural formula (E1) include "Araldite CY184" (trade name) (made by Ciba Japan K.K.).

Specific examples of compounds represented by structural formula (E2) include "Celloxide 2021P" and "EHPE-3150" (trade names) (made by Daicel Chemical Industries, Ltd.).

Specific examples of compounds represented by structural formula (E3) include "Techmore VG3101L" (trade name) (made by Mitsui Chemicals, Inc.).

Specific examples of compounds represented by structural formula (E5) include "4,4'-methylenebis(N,N-diglycidylaniline)" (made by Sigma-Aldrich Corporation).

Among the compounds, the epoxy compound preferably include "Epicoat 828" being the compound (a mixture of compounds of n being 0 to 4) represented by general formula (E4), "Araldite CY184" (made by Nihon Ciba Geigy K.K) being the compound represented by structural formula (El), "Celloxide 2021P" (trade name) (made by Daicel Chemical Industries, Ltd.) being the compound represented by structural formula (E2), "Techmore VG3101L" (trade name) (made by Mitsui Chemicals, Inc.) being the compound represented by structural formula (E3), and "4,4'-methylenebis(N,N-diglycidylaniline)" (made by Sigma-Aldrich Corporation) being the compound represented by structural formula (E5) from a viewpoint of improving transparency and flatness in the alignment layer.

For example, the aligning agent of the invention may further contain a coupling agent such as a silane coupling agent, a titanium-based coupling agent and an aminosilicone compound from a viewpoint of improving close contact to the substrate. The coupling agent may include one kind of compound or two or more compounds.

Specific examples of the aminosilicone compounds include p-aminophenyl trimethoxysilane, p-aminophenyl triethoxysilane, m-aminophenyl trimethoxysilane, m-aminophenyl triethoxysilane, aminopropyl trimethoxysilane and aminopropyl triethoxysilane.

Content of the coupling agent is preferably in the range of 0.01 to 6% by weight in the aligning agent.

For example, the aligning agent of the invention may further contain a polymer component such as a polyester, an acrylic acid polymer and an acrylate polymer within the range where characteristics of the invention are not adversely affected (preferably within 20% by weight of the polyamic acid or the derivative thereof).

For example, the aligning agent of the invention may further contain any other polymer component such as a polyamide being a reaction product of a dicarboxylic acid or a derivative thereof with the diamine, and a polyamideimide being a reaction product of a tetracarboxylic dianhydride, dicarboxylic acid or a derivative thereof with the diamine within the range where an aim of the invention is not adversely affected.

For example, the aligning agent of the invention may further contain a surfactant in accordance with the aim from a viewpoint of improving applicability of the aligning agent, or an antistatic agent from a viewpoint of improving antistatic properties of the aligning agent.

For example, the aligning agent of the invention may further contain a solvent from a viewpoint of adjusting applicability of the aligning agent or a concentration of the polyamic acid or the derivative thereof. The solvent can be applied without a significant limitation, if the solvent has capacity for dissolving the polymeric component. The solvent widely includes a solvent ordinarily used in a process for manufacturing the polymeric components such as the polyamic acid and the soluble polyimide or in terms of applications, and can be appropriately selected according to the purpose. The solvent may include one kind or a mixed solvent including two or more kinds.

Specific examples of the solvent include a solvent having affinity for the polyamic acid or the derivative thereof, and any other solvent for the purpose of improving applicability.

Specific examples of aprotic polar organic solvent being the solvent having affinity for the polyamic acid or the derivative thereof include N-methyl-2-pyrrolidone, dimethylimidazolidinone, N-methylcaprolactam, N-methylpropionamide, N,N-dimethylacetamide, dimethyl sulfoxide, N,N-dimethylformamide, N,N-diethylformamide, diethylacetamide and lactone such as γ-butyrolactone.

Specific examples of other solvents for the purpose of improving applicability include alkyl lactate, 3-methyl-3-methoxybutanol, tetralin, isophorone, ethylene glycol monoalkyl ether such as ethylene glycol monobutyl ether, diethylene glycol monoalkyl ether such as diethylene glycol monoethyl ether, ethylene glycol monoalkyl or phenyl acetate, triethylene glycol monoalkyl ether, propylene glycol monoalkyl ether such as propylene glycol monobutyl ether, dialkyl malonate such as diethyl malonate, dipropylene glycol monoalkyl ether alkyl such as dipropylene glycol monomethyl ether, and an ester compound such as acetates thereof.

Among the solvents, N-methyl-2-pyrrolidone, dimethylimidazolidinone, γ-butyrolactone, ethylene glycol monobutyl ether, diethylene glycol monoethyl ether, propylene glycol monobutyl ether, dipropylene glycol monomethyl ether or the like can be particularly preferably used for the solvent.

Seventh, the methods for synthesizing the component compounds will be explained. The methods for synthesizing the liquid crystal composition will be explained. The compounds can be prepared according to known methods.

Examples of the synthetic methods are shown. Compound (1-1-1), compound (1-2-1) and compound (1-4-1) are prepared by the method disclosed in JP H2-503441 A (1990). Compound (2-1-1) is prepared by the method disclosed in JP S59-70624 A (1984). Compound (2-6-1) is prepared by the method disclosed in JP S59-176221 A (1984). The antioxidant is commercially available. A compound represented by formula (5) where w is 1 is available from Sigma-Aldrich Corporation. Compound (5) where w is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

The reactive monomer or oligomer is polymerized or bridged by allowing the aligning agent to polymerize in the alignment layer under a state of applying voltage. A preferred polymerization method includes, for example, thermal polymerization or photopolymerization, preferably, photopolymerization. If required, at least one kind of the polymerization initiator can also be added herein. Polymerization conditions and suitable types of initiators are publicly known to a person skilled in the art.

The reactive monomer or oligomer of the invention is excellent in view of reacting quickly without particularly using the initiator. Thus, reduction of a poor display originating from a photoinitiator or a residue remaining in the system and prolongation of a product service life can be achieved.

The reactive monomer or oligomer of the invention may be used alone or by mixing with any other reactive monomer or oligomer. Specific examples of reactive monomers or oligomers that can be used simultaneously include a commercially available or publicly known monomer such as an existing monofunctional or multifunctional liquid crystalline monomer suitable for the liquid crystal display element as described in JP 2004-123829 A or the like.

The liquid crystal display element of the invention is a liquid crystal display apparatus having two substrates including the transparent electrode and the alignment layer for aligning the liquid crystal molecules, and the alignment layer formed by arranging the aligning agent containing the reactive monomer or oligomer between the substrates and the liquid crystal layer and through a process for polymerizing the reactive monomer or oligomer while applying voltage between the opposing transparent electrodes of the substrates.

In the liquid crystal display element of the invention, the device is suitable for a VA type display device in which each of the transparent electrodes arranged in an upper and lower pair of substrates has a discontinuous part and a continuous part, and the discontinuous part of one transparent electrode opposes with the continuous part of the other transparent electrode, and simultaneously the liquid crystal layer is divided in the opposing part to be formed into a plurality of pixels, and the device is particularly preferred for a VA device using a slit type electrode.

A suitable and preferred structure of the device in the invention is clearly applied to a device structure as listed in the background art, for example, but the invention is not limited by the structure, and can be applied to various VA types of display devices.

Last, the application of the composition will be explained. Most of the compositions have a minimum temperature of −10° C. or lower, a maximum temperature of 70° C. or higher, and an optical anisotropy in the range of 0.07 to 0.20. The device containing the composition has a large voltage holding ratio. The composition is suitable for use in the AM device. The composition is particularly suitable for use in a transmissive AM device. The composition having an optical anisotropy in the range of 0.08 to 0.25 may be prepared by adjusting a ratio of the component compounds or by mixing with any other liquid crystal compound. The composition can be used as the composition having the nematic phase and used as the optically active composition by adding the optically active compound.

The composition can be used for the AM device, and also for a PM device.

The composition can be used for an AM device and a PM device having a mode such as PC, TN, ECB, IPS or VA. The devices may be of a reflective type, a transmissive type or a transreflective type. Use for the transmissive device is preferred. The composition can be also used for an amorphous silicon-TFT device or a polycrystal silicon-TFT device.

EXAMPLES

In the following, the invention will be explained in more detail by way of Examples, but the invention is not limited by the Examples. In addition, unless otherwise noted, "%" means "% by weight."

A compound obtained by a synthesis was identified by means of proton nuclear magnetic resonance spectroscopy ($^1$H-NMR), high performance liquid chromatography (HPLC), ultraviolet/visible spectrophotometry (UV/Vis) or the like. A melting point of the compound was determined by differential scanning calorimetry (DSC). Moreover, a composition ratio of a specific substance in a liquid crystal composition was determined according to an IR measurement.

Each analytical method will be first explained.

$^1$H-NMR Analysis: As a measuring apparatus, DRX-500 (made by Bruker BioSpin Corporation) was used. A sample prepared in Example and so forth was dissolved in a deuterated solvent such as $CDCl_3$ in which the sample was soluble, and measurement was carried out under the conditions of room temperature, 500 MHz and 24 times of accumulation. In addition, in explaining magnetic resonance spectra obtained, s, d, t, q and m mean a singlet, a doublet, a triplet, a quartet and a multiplet, respectively. Moreover, tetramethylsilane (TMS) was used as a reference material for a zero point of chemical shifts (δ values).

HPLC Analysis: As a measuring apparatus, Prominence (LC-20 AD; SPD-20A) made by Shimadzu Corporation was used. As a column, YMC-Pack ODS-A made by YMC Co., Ltd. (length 150 mm, bore 4.6 mm, particle diameter 5 μm) was used. As an eluate, acetonitrile/water (volume ratio: 80/20) was used and a flow rate was adjusted at 1 milliliter per minute. As a detector, a UV detector, an RI detector, a CORONA detector or the like was appropriately used. When the UV detector was used, a detection wavelength was allowed to be 254 nanometers.

A sample was dissolved in acetonitrile, adjusted to be a solution of 0.1% by weight, and 1 microliter of the solution obtained was introduced into a sample chamber.

As a recorder, C-R7Aplus made by Shimadzu Corporation was used. A chromatogram obtained shows a retention time of peaks and a value of a peak area corresponding to each of component compounds.

A ratio of the peak areas in the chromatogram obtained from HPLC corresponds to a ratio of the component compounds. In general, weight percent of the component compound in an analytical sample is not completely identical with a percentage of each of the peak areas in the analytical sample. However, because a correction coefficient is essentially 1 (one) when the column described above was used in the invention, the weight percent of the component compounds in the analytical sample substantially corresponds to the percentage of each of the peak areas in the analytical sample. The reason is that no big difference exists in the correction coefficient of components in a liquid crystal compound. In order to more accurately determine a composition ratio of the liquid crystal compounds in the liquid crystal composition using the chromatogram, an internal standard method using the chromatogram is applied. A predetermined amount of each accurately weighed liquid crystal compound component (test component) and a standard liquid crystal compound (reference material) are simultaneously measured by means of HPLC, and a relative intensity of the area ratio between a peak obtained of the test component and a peak obtained of the reference material is calculated in advance. When correction is performed using the relative intensity of the peak area of each component to the reference material, the composition ratio of the liquid crystal compounds in the liquid crystal composition can be more accurately determined from the chromatogram.

UV/Vis Analysis: As a measuring apparatus, PharmaSpec UV-1700 made by Shimadzu Corporation was used. A detection wavelength was allowed to be 190 to 700 nanometers.

A sample was dissolved in acetonitrile, and adjusted to be a solution of 0.01 millimole per liter, and measurement was carried out by putting the solution in a quartz cell (optical path length 1 cm).

DSC Measurement: A melting point was determined using a scanning calorimeter DSC-7 system or Diamond DSC system made by PerkinElmer, Inc., increasing or decreasing temperature at a rate of 3° C. per minute, and determining a starting point (on set) of an endothermic peak or exothermic peak associated with a phase change of a sample according to extrapolation.

IR Measurement: As a measuring apparatus, Nicolet 6700 FT-IR made by Thermo Fisher Scientific Inc. was used, and Nicolet Continuum Infrared Microscope being a microscope IR system was simultaneously used. The detection wave number was allowed to be 750 to 4,000 cm$^{-1}$.

Presence or absence of a specific substance is found from a position of peak of a test component obtained. A relative intensity of an absorbance in a peak of the test component and a peak of a reference material is calculated in advance. When correction is performed using the relative intensity of the absorbance of each component to the reference material, a composition ratio of the specific substance in a liquid crystal composition can be accurately determined.

Next, a method for determining each value of characteristics will be explained.

In order to evaluate the characteristics of a composition and a compound to be contained in the composition, the composition and the compound were made a measurement object. When the measurement object was the composition, the measurement object was measured as is, and values obtained were described. When the measurement object was the compound, a sample for measurement was prepared by mixing the compound (15% by weight) into mother liquid crystals (85% by weight). The values of the characteristics of the compound were calculated from values obtained by measurement, according to an extrapolation method: (extrapolated value)={ (measured value of a sample for measurement)−0.85×(measured value of mother liquid crystals)}/0.15. When a smectic phase (or crystals) precipitated at the ratio thereof at 25° C., a ratio of the compound to the mother liquid crystals was changed step by step in the order of (10% by weight: 90% by weight), (5% by weight: 95% by weight) and (1% by weight: 99% by weight). Values of a maximum temperature, an optical anisotropy, viscosity and a dielectric anisotropy with regard to the compound were determined by the extrapolation method.

The composition of the mother liquid crystals was as described below.

Chemical formula 96:

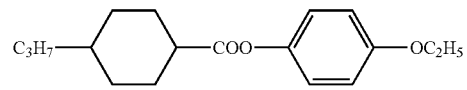

17.2 wt %

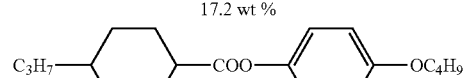

27.6 wt %

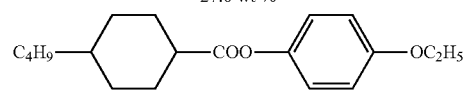

20.7 wt %

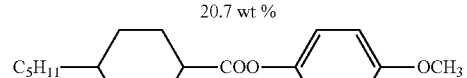

20.7 wt %

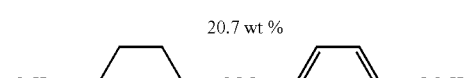

13.8 wt %

The values of the characteristics were determined according to the methods described below. Most of the methods are applied as described in EIAJ ED-2521A of the Standard of Electronic Industries Association of Japan, or modified thereon.

Maximum Temperature of a Nematic Phase (NI; ° C.): A sample was placed on a hot plate in a melting point apparatus equipped with a polarizing microscope and was heated at a rate of 1° C. per minute. Temperature when a part of the sample began to change from a nematic phase to an isotropic liquid was measured.

Minimum Temperature of a Nematic Phase ($T_c$; ° C.): A sample having a nematic phase was put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c \leq -20°$ C.

Viscosity (η; measured at 20° C.; mPa·s): A cone-plate (E type) viscometer was used for measurement.

Optical Anisotropy (refractive index anisotropy; Δn; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric Anisotropy (Δ∈; measured at 25° C.): A value of dielectric anisotropy was calculated from an equation: Δ∈=∈∥−∈⊥. A dielectric constant (∈∥ and ∈⊥) was measured as described below.

1) Measurement of dielectric constant (∈∥): An ethanol (20 mL) solution of octadecyl triethoxysilane (0.16 mL) was applied to a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive.

Sine waves (0.5 V, 1 kHz) were applied to the device, and after 2 seconds, a dielectric constant (∈∥) in the major axis direction of liquid crystal molecules was measured.

2) Measurement of dielectric constant (∈⊥): A polyimide solution was applied to a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) in the minor axis direction of the liquid crystal molecules was measured.

Threshold Voltage (Vth; measured at 25° C.; V): An LCD-5100 luminance meter made by Otsuka Electronics Co., Ltd. was used for measurement. A light source was a halogen lamp. Voltage (60 Hz, rectangular waves) to be applied to a VA device as described in Examples of the invention was stepwise increased from 0 V to 10 V at an increment of 0.02 V. On the occasion, the device was irradiated with light from a direction perpendicular to the device, and the amount of light passing through the device was measured. A voltage-transmittance curve was prepared, in which the maximum amount of light corresponds to 100% transmittance and the minimum amount of light corresponds to 0% transmittance. A threshold voltage is voltage at 10% transmittance.

Voltage Holding Ratio (VHR-1; at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; at 80° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; at 25° C.; %): Stability to ultraviolet light was evaluated by measuring a voltage holding ratio after ultraviolet light irradiation. A composition having a large VHR-3 has a high stability to ultraviolet light. A TN device used for measurement had a polyimide alignment film and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decaying voltage was measured for 16.7 milliseconds. A value of VHR-3 is preferably in the range of 90% or more, further preferably, 95% or more.

Voltage Holding Ratio (VHR-4; at 25° C.; %): A TN device into which a sample was injected was heated in a constant-temperature bath at 80° C. for 500 hours, and then stability to heat was evaluated by measuring a voltage holding ratio. A composition having a large VHR-4 has a high stability to heat. In measuring VHR-4, a decaying voltage was measured for 16.7 milliseconds.

Response Time (τ; measured at 25° C.; millisecond): An LCD-5100 luminance meter made by Otsuka Electronics Co., Ltd. was used for measurement. A light source was a halogen lamp. A low-pass filter was set at 5 kHz. A VA device as described in Example of the invention was prepared. Rectangular waves (60 Hz, 10 V, 0.5 second) were applied to the device. On the occasion, the device was irradiated with light from a direction perpendicular to the device, and the amount of light passing through the device was measured. The maximum amount of light corresponds to 100% transmittance, and the minimum amount of light corresponds to 0% transmittance. A rise time (τr) is a period of time needed for a change from 10% transmittance to 90% transmittance. A fall time (τf) is a period of time needed for a change from 90% transmittance to 10% transmittance. A response time means the thus determined rise time.

Specific Resistance (ρ; measured at 25° C.; Ωcm): Into a vessel equipped with an electrode, 1.0 milliliter of a sample was injected. A DC voltage (10 V) was applied to the vessel, and a DC current after 10 seconds was measured. A specific resistance was calculated from the following equation:

(specific resistance)={(voltage)×(electric capacity of vessel)}/{(DC current)×(dielectric constant of vacuum)}.

Ion Density (measured at 25° C.; pC/cm$^2$): An MTR-1 type liquid crystal cell ion density measurement system made by TOYO Corporation was used for measurement. An ion density in a device was determined by applying triangular waves having ±10 V of 0.05 Hz to the device, and analyzing a Lissajous waveform of a current and voltage signal. When a large amount of a reactive monomer leaches, the ion density increases to cause image sticking, and therefore a small value of ion density indicates a small degree of image sticking and a good evaluation for image sticking.

Image sticking evaluation (ISL; measured at 25° C.; %): A predetermined AC voltage and a predetermined DC voltage were applied to a device to display a checker pattern on the device. An image sticking evaluation (ISL: Image Sticking Level) was performed from a light intensity transmitting through the device after a fixed period of time according to the following equation:

ISL=|Bs−Br|/Br×100.

Wherein, Br represents an amount of light of a reference part, and Bs represents an amount of light of a part in which a load is given by applying voltage to the device. A small value of ISL represents a small degree of image sticking and a good evaluation for image sticking.

Abbreviations and substance names of compounds used in Examples are as described below.
Tetracarboxylic Dianhydride
PMDA: pyromellitic anhydride (IV-3-2).
CBDA: cyclobutane-1,2,3,4-tetracarboxylic dianhydride (IV-2-1).
BTDA: butane-1,2,3,4-tetracarboxylic dianhydride (IV-1-1).
CHDA: cyclohexane-1,2,4,5-tetracarboxylic dianhydride (IV-3-1).
TCMP: 2,3,5-tricarboxy cyclopentyl acetic dianhydride (IV-7-2).
BCODA: bicyclo[3.3.0]octane-2,4,6,8-tetracarboxylic dianhydride (IV-10).
PSQ1: 18,21-bis(3-(2,5-dioxotetrahydrofuran-3-yl)propyl)-18,21-dimethyl-1,3,5,7,9,11,13,15-octaphenyl-pentacyclo[10.5.1.25,13.17,11.19,15]decasiloxane (IV-12-1).
BPhDA: benzophenone-3,3',4,4'-tetracarboxylic dianhydride (VII-1-1).
Diamine
5HHP1PDA: 5-[4-(4-n-pentylcyclohexyl)cyclohexyl]phenylmethyl-1,3-diaminobenzene (III-8-5).
7H2HBA: 1,1-bis[4-(4-aminophenoxy)phenyl]-4-[(4-heptylcyclohexyl)ethyl]cyclohexane (III-9-7).
7HBZ: 1,1-bis[4-(4-aminophenyl)methylphenyl]-4-n-heptylcyclohexane (III-9-2).
ChDA: cholesteryl 3,5-diaminobenzoate (III-8-40).
5HHPOPDA: 4-[4-(4'-pentyl-(1-1')-bicyclohexane-4-yl)phenoxy]-1,3-diaminobenzene (III-8-39).
DBPh: 4,4'-diaminobenzophenone (VI-1-1).
14DBPh: (3,5-diaminophenyl)(4-tetradecylphenyl)methanone (VI-2-1: $R^{38}$=—$C_{14}H_{29}$).
PhMI2EPDA: N-(2-(3,5-diaminobenzoyl)oxyethyl)-α-phenylmaleimide (VI-3-1).
5CIDA: (E)-6-(3-(4-pentylphenyl)acryloyloxy)hexyl-3,5-diaminobenzoate (VI-4-5).
6CIDA: (E)-7-(4-hexyloxyphenyl)-5-oxohept-6-enyl-3,5-diaminobenzoate (VI-5-1).
Photopolymerizable Monomer
BMB: 4,4'-bis(methacryloiloxy)biphenyl (3-3-1-1).
RM-257: 1,4-bis(4-(3-acryloyloxypropyl)oxybenzoyloxy)-2-methylbenzene (3-3-2-3).
MLC-1026: 1,4-bis[4-(6-acryloyloxyhexyl)oxybenzoyloxy]-2-methylbenzene (3-3-2-6).
BAB6: 4,4'-bis(6-acryloyloxyhexyl)oxybiphenyl (3-3-3-6).
CPh: 4-cyanophenyl-4'-(6-acryloyloxyhexyl)oxybenzoate (3-3-4-6).
9Cl: 4-methoxyphenyl-4-[6-(acryloyloxy)hexyloxy]benzoate (3-3-5-6).
Polymerization Initiator
Irgacure 651 made by Ciba Specialty Chemicals Inc.
Solvent
NMP: N-methyl-2-pyrrolidone.
BC: butyl cellosolve (ethylene glycol monobutyl ether).
Liquid Crystal Composition
Liquid crystal compounds in Comparative Examples and Examples were expressed using symbols according to definitions in Table 3 below.

In Table 3, a configuration with regard to 1,4-cyclohexylene is trans, and a configuration of a 2,5-tetrahydropyran ring is a mixture of (R, R) and (S, S). A parenthesized number next to the symbols in Examples corresponds to the number of a preferred compound. A symbol (−) means any other liquid crystal compound. A ratio (percentage) of liquid crystal compounds is represented in terms of weight percent (% by weight) based on the total weight of the liquid crystal composition. The liquid crystal composition further includes an impurity

TABLE 3

Table 3 Method of Description of Compounds using Symbols
R—($A_1$)—$Z_1$—...—$Z_n$—($A_n$)—R'

| 1) Left-terminated Group R— | Symbol |
|---|---|
| $C_nH_{2n+1}$— | n- |
| $C_nH_{2n+1}O$— | nO- |
| $C_mH_{2m+1}OC_nH_{2n}$— | mOn- |
| $CH_2$=CH— | V- |
| $C_nH_{2n+1}$—CH=CH— | nV- |
| $CH_2$=CH—$C_nH_{2n}$— | Vn- |
| $C_mH_{2m+1}$—CH=CH—$C_nH_{2n}$— | mVn- |
| $CF_2$=CH— | VFF- |
| $CF_2$=CH—$C_nH_{2n}$— | VFFn- |
| $CH_2$=CHCOO— | AC- |
| $CH_2$=C($CH_3$)COO— | MAC- |

| 2) Right-terminal Group —R' | Symbol |
|---|---|
| —$C_nH_{2n+1}$ | -n |
| —$OC_nH_{2n+1}$ | -On |
| —CH=$CH_2$ | -V |
| —CH=CH—$C_nH_{2n+1}$ | -Vn |
| —$C_nH_{2n}$—CH=$CH_2$ | -nV |
| —CH=$CF_2$ | -VFF |
| —$COOCH_3$ | -EMe |
| —OCOCH=$CH_2$ | -AC |
| —OCOC($CH_3$)=$CH_2$ | -MAC |

| 3) Bonding Group —$Z_n$— | Symbol |
|---|---|
| —$C_2H_4$— | 2 |
| —COO— | E |
| —CH=CH— | V |
| —C≡C— | T |
| —$CF_2O$— | X |
| —$CH_2O$— | 1O |
| —$SiH_2$— | Si |

| 4) Ring Structure —$A_n$— | Symbol |
|---|---|
| 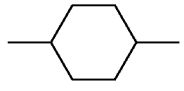 | H |
| 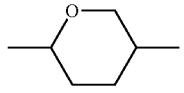 | Dh |
| 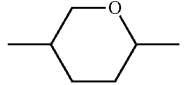 | dh |
| 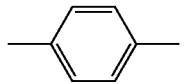 | B |
| 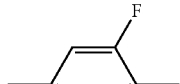 | B(F) |

TABLE 3-continued

Table 3 Method of Description of Compounds using Symbols
R—(A₁)—Z₁—...—Zₙ—(Aₙ)—R'

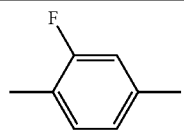 B(2F)

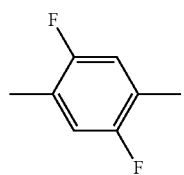 B(2F,5F)

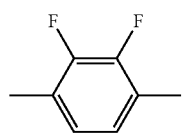 B(2F,3F)

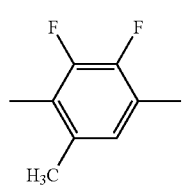 B(2F,3F,6Me)

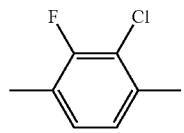 B(2F,3Cl)

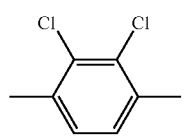 B(2Cl,3Cl)

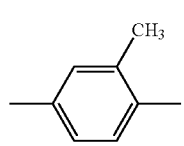 B(Me)

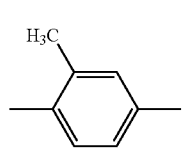 B(2Me)

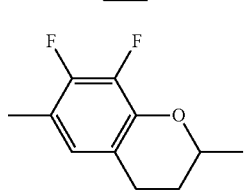 Cro(7F,8F)

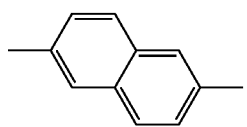 Np

TABLE 3-continued

Table 3 Method of Description of Compounds using Symbols
R—(A₁)—Z₁—...—Zₙ—(Aₙ)—R'

5) Examples of Description

Example 1 V2-BB(F)B-1

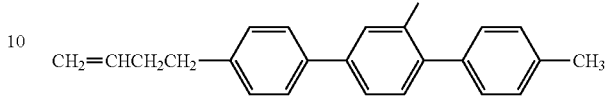

Example 2 3-HB(2F,3F)-O2

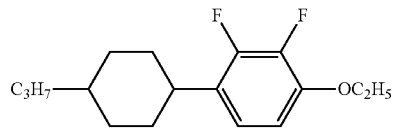

Example 3 3-HHB-1

Example 4 3-HB(2Cl,3Cl)-O2

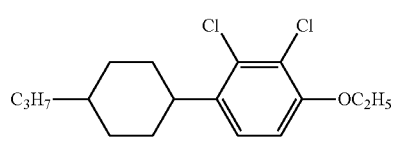

1. Synthesis of Polyamic Acid

Synthesis Example 1

In a 100 mL four-necked flask equipped with a thermometer, a stirrer, a raw material feeding port and a nitrogen gas inlet, 4.0577 g of 5HHP1PDA and 80.0 g of dehydrated NMP were put, and stirring and dissolution were carried out under a dry nitrogen stream. Subsequently, 0.9196 g of CBDA and 1.0227 g of PMDA were put in the flask, and the resultant mixture was allowed to react for 30 hours in a room temperature environment. When a reaction temperature rose during the reaction, the reaction was carried out by suppressing the reaction temperature at about 70° C. or lower. In a solution obtained, 14.0 g of BC was added, and thus a polyamic acid solution (PA1) having a concentration of 6% by weight was obtained. In addition, weight average molecular weight of PA1 was 65,000.

The weight average molecular weight of the polyamic acid was measured according to a GPC method by diluting the polyamic acid obtained to be about 1% by weight in the concentration of the polyamic acid with a phosphoric acid-DMF mixed solution (phosphoric acid/DMF=0.6/100: weight ratio), and using the mixed solution as a developer by means of 2695 Separations Module, 2414 Differential Refractometer (made by Waters Corporation), and determined by polystyrene conversion. In addition, measurement was carried out using HSPgel RT MB-M (made by Waters Corporation) as a column under conditions of a column temperature of 40° C. and a flow rate of 0.35 mL/min.

Synthesis Examples 2 to 20

Polyamic acid solutions (PA2) to (PA20) were prepared in accordance with Synthesis Example 1 except that the tetracarboxylic dianhydride and the diamine were changed as shown in Table 4. Results including the results of Synthesis Example 1 were summarized in Table 4.

the film was heated and dried at 80° C. for about 10 minutes, and heat treatment was performed at 180° C. for 60 minutes, and thus an alignment film was formed.

TABLE 4

Synthesis Examples of Aligning Agents

| Synthesis Example | Aligning Agent | Tetracarboxylic Dianhydride [mol %] | | | | | | | Diamine [mol %] | | | Diamine [mol %] | | | | | | | Weight-average Molecular Weight |
|---|---|---|---|---|---|---|---|---|---|---|---|---|---|---|---|---|---|---|---|
| | | PMDA | CBDA | BTDA | CHDA | TCMP | BCODA | PSQ1 | BPhDA | 5HHP1PDA | 7H2HBA | 7HBZ | ChDA | 5HHPOPDA | DBPh | 14DBPh | PhMI2EPDA | 5HCIDA | 6OIDA | |
| 1 | PA1 | 50 | 50 | | | | | | | 100 | | | | | | | | | | 65,000 |
| 2 | PA2 | 50 | | 50 | | | | | | 100 | | | | | | | | | | 54,000 |
| 3 | PA3 | 50 | | | 50 | | | | | 100 | | | | | | | | | | 63,000 |
| 4 | PA4 | 50 | | | | 50 | | | | 100 | | | | | | | | | | 55,000 |
| 5 | PA5 | 50 | | | | | 50 | | | 100 | | | | | | | | | | 58,000 |
| 6 | PA6 | 50 | | | | | | 50 | | 100 | | | | | | | | | | 49,000 |
| 7 | PA7 | 50 | | | | | | | 50 | 100 | | | | | | | | | | 63,000 |
| 8 | PA8 | | 100 | | | | | | | 100 | | | | | | | | | | 49,000 |
| 9 | PA9 | | | 100 | | | | | | 100 | | | | | | | | | | 52,000 |
| 10 | PA10 | | | | 100 | | | | | 100 | | | | | | | | | | 44,000 |
| 11 | PA11 | | | | | 100 | | | | 100 | | | | | | | | | | 46,000 |
| 12 | PA12 | 50 | 50 | | | | | | | | 100 | | | | | | | | | 65,000 |
| 13 | PA13 | 50 | 50 | | | | | | | | | 100 | | | | | | | | 79,000 |
| 14 | PA14 | 50 | 50 | | | | | | | | | | 100 | | | | | | | 54,000 |
| 15 | PA15 | 50 | 50 | | | | | | | | | | | 100 | | | | | | 62,000 |
| 16 | PA16 | 50 | 50 | | | | | | | 50 | | | | | 50 | | | | | 72,000 |
| 17 | PA17 | 50 | 50 | | | | | | | 50 | | | | | | 50 | | | | 51,000 |
| 18 | PA18 | 50 | 50 | | | | | | | 50 | | | | | | | 50 | | | 42,000 |
| 19 | PA19 | 50 | 50 | | | | | | | 50 | | | | | | | | 50 | | 49,000 |
| 20 | PA20 | 50 | 50 | | | | | | | 50 | | | | | | | | | 50 | 53,000 |

2. Preparation of Liquid Crystal Display Element

Example 1

To the polyamic acid (solid content A) solution (PA1) prepared according to Synthesis Example 1, RM-257 (solid content B) was added to be 10% by weight of a solid concentration of PA1, more specifically, so as to contain 10% by weight of solid content B in a content ratio of a photopolymerizable monomer (solid content B) based on 100% by weight of an aligning agent solid content (solid content A plus solid content B), and a mixed solvent of NMP/BC (1/1 in a weight ratio) was added, the whole was diluted to 4% by weight, and thus an aligning agent was prepared.

The aligning agent was applied to two glass substrates with an ITO electrode by means of a spinner, and a film having a film thickness of 100 nanometers was formed. After coating, the film was heated and dried at 80° C. for about 10 minutes, and heat treatment was performed at 180° C. for 60 minutes, and thus an alignment film was formed.

A gap material of 4.25 micrometers was sprayed onto one of the glass substrates, a peripheral was sealed with an epoxy type adhesive for the other substrate with leaving an inlet of liquid crystals, and the substrates were laminated by internally placing a plane on which the alignment film was formed. A liquid crystal composition shown in "Liquid Crystal Composition in Example 1" was injected into the cell in vacuum, the inlet was sealed with a photo-curing agent, and the photo-curing agent was irradiated with ultraviolet light, and thus the photo-curing agent was cured. Subsequently, heat treatment was performed at 110° C. for 30 minutes, and thus a liquid crystal display element was prepared. (see FIG. 1).

Rectangular waves of ±2.8 V were applied to the liquid crystal display element prepared for 5 minutes, subsequently rectangular waves of ±5.6 V were applied for 5 minutes, and then the device was irradiated with ultraviolet light of 10,000 mJ/cm$^2$ while applying the rectangular waves of ±5.6 V, and thus finally a liquid crystal display element was prepared.

Comparative Example 1

A liquid crystal display element according to Comparative Example 1 was prepared in accordance with Example 1. The liquid crystal composition shown in the following "Liquid Crystal Composition of Comparative Example 1" was used. The results were summarized in Table 5.

TABLE 5

Results of Comparative Example 1 and Example 1

| | Aligning agent | Photopolymerizable monomer (wt. %) RM-257 | Voltage application and ultraviolet light irradiation | Monomer leaching (ion density) | Image sticking evaluation (ISL value) |
|---|---|---|---|---|---|
| Comparative Example 1 | PA1 | 10 | With | Bad | Bad |
| Example 1 | PA1 | 10 | With | Good | Good |

Herein, the term "with" for voltage application and ultraviolet light irradiation indicates that both the voltage application and the ultraviolet light irradiation were performed. Moreover, as for the image sticking evaluation, the term "good" indicates ISL in the range less than 2%, "marginal" indicates ISL in the range of 2% or more to less than 5%, and "bad" indicates ISL in the range of 5% or more. As for the evaluation of monomer leaching, the term "good" indicates an ion density in the range less than 500 pC/cm$^2$, "marginal" indicates an ion density in the range of 500 or more to less than 1,000 pC/cm$^2$, and "bad" indicates an ion density in the range of 1,000 pC/cm$^2$ or more.

As shown in Table 5, as for the liquid crystal device using the alignment layer obtained from the liquid crystal composition of the invention and the aligning agent containing the polyamic acid including the photopolymerizable monomer of the invention, when the photopolymerizable monomer is allowed to react by ultraviolet light irradiation while applying voltage, the effect of improved image sticking and improved monomer leaching has been significantly demonstrated.

Liquid Crystal Composition of Comparative Example 1

A VA device was prepared using an aligning agent PA1 and a photopolymerizable monomer RM-257 (10% by weight) and with voltage application and ultraviolet light irradiation, both the aligning agent and the photopolymerizable monomer being the same in the invention.

Components and characteristics of a liquid crystal composition were as described below.

| | | |
|---|---|---|
| 3-HB(2Cl,3Cl)-O2 | (—) | 15% |
| 4-HB(2Cl,3Cl)-O2 | (—) | 15% |
| 5-HB(2Cl,3Cl)-O2 | (—) | 20% |
| 3-HHEB(2Cl,3Cl)-3 | (—) | 7% |
| 5-HHEB(2Cl,3Cl)-3 | (—) | 10% |
| 5-HHEB(2Cl,3Cl)-5 | (—) | 10% |
| V-HH-3 | (2-1-1) | 5% |
| V-HHB-1 | (2-5-1) | 6% |
| 2-BB(F)B-3 | (2-7-1) | 2% |
| 5-HBB(F)B-2 | (2-13-1) | 10% |

NI=78.0° C.; Tc≤−20° C.; Δn=0.100; Δ∈=−3.1.

As for a response time in the VA device as described in the invention, τ was 16.0 ms, and image sticking and leaching were evaluated to be bad.

Liquid Crystal Composition of Example 1

A VA device was prepared using an aligning agent PA1 and a photopolymerizable monomer RM-257 (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 15% |
| V-HB(2F,3F)-O4 | (1-1-1) | 10% |
| 2-HBB(2F,3F)-O2 | (1-7-1) | 1% |
| 3-HBB(2F,3F)-O2 | (1-7-1) | 10% |
| 5-HBB(2F,3F)-O2 | (1-7-1) | 10% |
| 2-HHB(2F,3Cl)-O2 | (1-17-1) | 2% |
| 3-HHB(2F,3Cl)-O2 | (1-17-1) | 3% |
| 4-HHB(2F,3Cl)-O2 | (1-17-1) | 3% |
| 5-HHB(2F,3Cl)-O2 | (1-17-1) | 3% |
| 2-HH-3 | (2-1-1) | 27% |
| 3-HB-O2 | (2-2-1) | 2% |
| 3-HHB-1 | (2-5-1) | 6% |
| 3-HHB-3 | (2-5-1) | 5% |
| 3-HHB-O1 | (2-5-1) | 3% |

NI=74.7° C.; Tc≤−20° C.; Δn=0.090; Δ∈=−2.9; VHR-1=99.1%; VHR-2=98.1%; VHR-3=98.1%.

As for a response time in the VA device as described in the invention, τ was 3.9 ms, and image sticking and leaching were evaluated to be good.

Examples 2 to 28 were performed in a manner similar to Example 1.

Example 2

A VA device was prepared using an aligning agent PA1 and a photopolymerizable monomer RM-257 (10% by weight) and with voltage application and ultraviolet light irradiation in the invention. Components and characteristics of a liquid crystal composition were as described below.

| | | |
|---|---|---|
| 3-H2B(2F,3F)-O2 | (1-2-1) | 17% |
| 5-H2B(2F,3F)-O2 | (1-2-1) | 16% |
| 3-HBB(2F,3F)-O2 | (1-7-1) | 12% |
| 4-HBB(2F,3F)-O2 | (1-7-1) | 6% |
| 5-HBB(2F,3F)-O2 | (1-7-1) | 10% |
| 2-HH-3 | (2-1-1) | 20% |
| 3-HH-4 | (2-1-1) | 4% |
| 5-HB-O2 | (2-2-1) | 4% |
| 3-HHB-1 | (2-5-1) | 4% |
| 5-HBB(F)B-2 | (2-13-1) | 7% |

NI=78.2° C.; Tc≤−20° C.; Δn=0.101; Δ∈=−3.1; VHR-1=99.2%; VHR-2=98.6%; VHR-3=98.8%.

As for a response time in the VA device as described in the invention, τ was 4.1 ms, and image sticking and leaching were evaluated to be good.

Example 3

A VA device was prepared using an aligning agent PA1 and a photopolymerizable monomer BMB (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 11% |
| V-HB(2F,3F)-O4 | (1-1-1) | 10% |

-continued

| | | |
|---|---|---|
| 3-H2B(2F,3F)-O2 | (1-2-1) | 15% |
| 5-H2B(2F,3F)-O2 | (1-2-1) | 5% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 6% |
| 3-HH-4 | (2-1-1) | 14% |
| 3-HHB-1 | (2-5-1) | 4% |
| 3-HHB-3 | (2-5-1) | 5% |
| 3-HHB-O1 | (2-5-1) | 3% |
| 5-HBB(F)B-2 | (2-13-1) | 6% |
| 5-HBB(F)B-3 | (2-13-1) | 5% |

NI=86.0° C.; Tc≤−20° C.; Δn=0.118; Δ∈=−3.6; VHR-1=99.0%; VHR-2=98.6%; VHR-3=98.8%.

As for a response time in the VA device as described in the invention, τ was 5.3 ms, and image sticking and leaching were evaluated to be good.

Example 4

A VA device was prepared using an aligning agent PA1 and a photopolymerizable monomer RM-257 (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 13% |
| V-HB(2F,3F)-O4 | (1-1-1) | 13% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 8% |
| 3-HH1OCro(7F,8F)-5 | (1-21-3) | 5% |
| 2-HH-5 | (2-1-1) | 8% |
| 3-HH-4 | (2-1-1) | 14% |
| 5-HB-O2 | (2-2-1) | 8% |
| 3-HHB-1 | (2-5-1) | 3% |
| 3-HHB-3 | (2-5-1) | 4% |
| 3-HHB-O1 | (2-5-1) | 2% |
| 3-HHEBH-3 | (2-10-1) | 2% |
| 3-HHEBH-5 | (2-10-1) | 2% |
| 5-HBB(F)B-2 | (2-13-1) | 2% |

NI=85.4° C.; Tc≥−20° C.; Δn=0.100; Δ∈=−3.2; VHR-1=99.2%; VHR-2=98.6%; VHR-3=98.8%.

As for a response time in the VA device as described in the invention, τ was 5.2 ms, and image sticking and leaching were evaluated to be good.

Example 5

A VA device was prepared using an aligning agent PA1 and a photopolymerizable monomer MLC-1026 (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 10% |
| V-HB(2F,3F)-O4 | (1-1-1) | 10% |
| 3-H2B(2F,3F)-O2 | (1-2-1) | 13% |
| 5-H2B(2F,3F)-O2 | (1-2-1) | 12% |
| 3-HBB(2F,3F)-O2 | (1-7-1) | 11% |
| 4-HBB(2F,3F)-O2 | (1-7-1) | 4% |
| 5-HBB(2F,3F)-O2 | (1-7-1) | 9% |
| 3-HH-4 | (2-1-1) | 2% |
| 3-HHEH-3 | (2-4-1) | 2% |
| 3-HHEH-5 | (2-4-1) | 2% |
| 4-HHEH-3 | (2-4-1) | 2% |
| 4-HHEH-5 | (2-4-1) | 2% |
| 3-HHB-1 | (2-5-1) | 4% |
| 3-HHB-3 | (2-5-1) | 7% |
| 3-HHB-O1 | (2-5-1) | 4% |
| 3-HHEBH-3 | (2-10-1) | 3% |
| 3-HHEBH-5 | (2-10-1) | 3% |

NI=90.9° C.; Tc≤−20° C.; Δn=0.105; Δ∈=−4.4; VHR-1=99.3%; VHR-2=98.6%; VHR-3=98.9%

As for a response time in the VA device as described in the invention, τ was 5.6 ms, and image sticking and leaching were evaluated to be good.

Example 6

A VA device was prepared using an aligning agent PA1 and a photopolymerizable monomer BAB6 (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 11% |
| V-HB(2F,3F)-O4 | (1-1-1) | 10% |
| 3-HBB(2F,3F)-O2 | (1-7-1) | 11% |
| 4-HBB(2F,3F)-O2 | (1-7-1) | 4% |
| 5-HBB(2F,3F)-O2 | (1-7-1) | 7% |
| 3-HH1OCro(7F,8F)-5 | (1-21-3) | 8% |
| 2-HH-3 | (2-1-1) | 17% |
| 3-HH-4 | (2-1-1) | 8% |
| 3-HH-5 | (2-1-1) | 4% |
| 5-HB-O2 | (2-2-1) | 6% |
| 3-HHB-1 | (2-5-1) | 5% |
| 3-HHB-3 | (2-5-1) | 6% |
| 3-HHB-O1 | (2-5-1) | 3% |

NI=79.2° C.; Tc≤−20° C.; Δn=0.092; Δ∈=−2.9; VHR-1=99.3%; VHR-2=98.5%; VHR-3=98.5%.

As for a response time in the VA device as described in the invention, τ was 3.9 ms, and image sticking and leaching were evaluated to be good.

Example 7

A VA device was prepared using an aligning agent PA1 and a photopolymerizable monomer CPh (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 13% |
| V-HB(2F,3F)-O4 | (1-1-1) | 13% |
| 3-HBB(2F,3F)-O2 | (1-7-1) | 6% |
| 4-HBB(2F,3F)-O2 | (1-7-1) | 6% |
| 5-HBB(2F,3F)-O2 | (1-7-1) | 6% |
| 3-HH1OCro(7F,8F)-5 | (1-21-3) | 5% |
| 2-HH-3 | (2-1-1) | 26% |
| 5-HB-O2 | (2-2-1) | 5% |
| 3-HHB-1 | (2-5-1) | 4% |
| 3-HHB-3 | (2-5-1) | 7% |
| 3-HHB-O1 | (2-5-1) | 4% |
| 5-HBB(F)B-2 | (2-13-1) | 5% |

NI=75.0° C.; Tc≤−20° C.; Δn=0.095; Δ∈=−2.7; VHR-1=99.3%; VHR-2 32 98.5%; VHR-3=98.5%.

As for a response time in the VA device as described in the invention, τ was 3.6 ms, and image sticking and leaching were evaluated to be good.

Example 8

A VA device was prepared using an aligning agent PA4 and a photopolymerizable monomer 9C1 (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 14% |
| V-HB(2F,3F)-O4 | (1-1-1) | 13% |
| 3-HBB(2F,3F)-O2 | (1-7-1) | 10% |
| 4-HBB(2F,3F)-O2 | (1-7-1) | 4% |
| 5-HBB(2F,3F)-O2 | (1-7-1) | 5% |
| 3-HH1OCro(7F,8F)-5 | (1-21-3) | 7% |
| 2-HH-3 | (2-1-1) | 26% |
| 4-HHEH-3 | (2-4-1) | 3% |
| 4-HHEH-5 | (2-4-1) | 3% |
| 3-HHB-1 | (2-5-1) | 6% |
| 3-HHB-3 | (2-5-1) | 6% |
| 3-HHB-O1 | (2-5-1) | 3% |

NI=75.6° C.; Δn=0.090; Δ∈=−3.1; Vth=2.07 V; VHR-1=99.2%; VHR-2=98.5%; VHR-3=98.5%.

As for a response time in the VA device as described in the invention, τ was 4.2 ms, and image sticking and leaching were evaluated to be good.

Example 9

A VA device was prepared using an aligning agent PA2, a photopolymerizable monomer BMB (10% by weight), and a polymerization initiator Irgacure 651 (10% by weight based on the photopolymerizable monomer) and with voltage application and ultraviolet light irradiation in the invention. Components and characteristics of a liquid crystal composition were as described below.

| | | |
|---|---|---|
| 3-H2B(2F,3F)-O2 | (1-2-1) | 15% |
| 5-H2B(2F,3F)-O2 | (1-2-1) | 15% |
| 2-HBB(2F,3F)-O2 | (1-7-1) | 3% |
| 3-HBB(2F,3F)-O2 | (1-7-1) | 9% |
| 5-HBB(2F,3F)-O2 | (1-7-1) | 9% |
| 3-HHB(2F,3Cl)-O2 | (1-17-1) | 5% |
| 2-HH-5 | (2-1-1) | 3% |
| 3-HH-4 | (2-1-1) | 15% |
| 3-HH-5 | (2-1-1) | 4% |
| 3-HB-O2 | (2-2-1) | 12% |
| 3-HHB-1 | (2-5-1) | 3% |
| 3-HHB-3 | (2-5-1) | 4% |
| 3-HHB-O1 | (2-5-1) | 3% |

NI=76.1° C.; Δn=0.098; Δ∈£=−2.8; Vth=2.39 V; VHR-1=99.2%; VHR-2=98.5%; VHR-3=98.5%.

As for a response time in the VA device as described in the invention, τ was 4.3 ms, and image sticking and leaching were evaluated to be good.

Example 10

A VA device was prepared using an aligning agent PA3 and a photopolymerizable monomer BMB (10% by weight) and with voltage application and ultraviolet light irradiation in the invention. Components and characteristics of a liquid crystal composition were as described below.

| | | |
|---|---|---|
| 3-H2B(2F,3F)-O2 | (1-2-1) | 17% |
| 5-H2B(2F,3F)-O2 | (1-2-1) | 17% |
| 3-HHB(2F,3Cl)-O2 | (1-17-1) | 4% |
| 4-HHB(2F,3Cl)-O2 | (1-17-1) | 3% |
| 5-HHB(2F,3Cl)-O2 | (1-17-1) | 3% |
| 3-HBB(2F,3Cl)-O2 | (1-18-1) | 8% |
| 5-HBB(2F,3Cl)-O2 | (1-18-1) | 9% |
| V-HH-3 | (2-1-1) | 27% |
| V-HHB-1 | (2-5-1) | 10% |
| 2-BB(F)B-3 | (2-7-1) | 2% |

NI=70.3° C.; Δn=0.095; Δ∈=−2.8; Vth=2.34 V; VHR-1=99.2%; VHR-2=98.6%; VHR-3=98.6%.

As for a response time in the VA device as described in the invention, τ was 4.2 ms, and image sticking and leaching were evaluated to be good.

Example 11

A VA device was prepared using an aligning agent PA4 and a photopolymerizable monomer BMB (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 10% |
| V-HHB(2F,3F)-O2 | (1-4-1) | 15% |
| V2-HHB(2F,3F)-O2 | (1-4-1) | 15% |
| 3-HCro(7F,8F)-5 | (1-19-1) | 3% |
| 2O-Cro(7F,8F)H-3 | (1-20-1) | 3% |
| 3-HHCro(7F,8F)-5 | (1-21-1) | 3% |
| 2O-Cro(7F,8F)HH-5 | (1-22-1) | 3% |
| V-HH-3 | (2-1-1) | 25% |
| 1V-HH-3 | (2-1-1) | 8% |
| V-HHB-1 | (2-5-1) | 5% |
| 2-BB(F)B-3 | (2-7-1) | 10% |

NI=76.3° C.; Tc≤−20° C.; Δn=0.096; Δ∈=−3.1; VHR-1=99.1%; VHR-2=98.5%; VHR-3=98.6%.

As for a response time in the VA device as described in the invention, τ was 5.7 ms, and image sticking and leaching were evaluated to be good.

Example 12

A VA device was prepared using an aligning agent PA5 and a photopolymerizable monomer BMB (10% by weight) and with voltage application and ultraviolet light irradiation in the invention. Components and characteristics of a liquid crystal composition were as described below.

| | | |
|---|---|---|
| V2-HB(2F,3F)-O2 | (1-1-1) | 15% |
| V-HBB(2F,3F)-O2 | (1-7-1) | 12% |
| 3-H1OCro(7F,8F)-5 | (1-19-3) | 5% |
| 5-H1OCro(7F,8F)-4 | (1-19-3) | 5% |
| 3-HH1OCro(7F,8F)-5 | (1-21-3) | 4% |
| 5-HH1OCro(7F,8F)-5 | (1-21-3) | 6% |
| 3-BBCro(7F,8F)-5 | (1-21-5) | 5% |
| V-HH-3 | (2-1-1) | 30% |
| V2-HHB-1 | (2-5-1) | 10% |
| 3-BB(F)B-2V | (2-7-1) | 8% |

NI=78.3° C.; Tc≤−20° C.; Δn=0.111; Δ∈=−3.0; VHR-1=99.2%; VHR-2=98.5%; VHR-3=98.6%.

As for a response time in the VA device as described in the invention, τ was 5.8 ms, and image sticking and leaching were evaluated to be good.

Example 13

A VA device was prepared using an aligning agent PA6 and a photopolymerizable monomer BMB (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 10% |
| V-HHB(2F,3F)-O2 | (1-4-1) | 10% |
| 1V-HHB(2F,3F)-O2 | (1-4-1) | 5% |
| 1V2-HHB(2F,3F)-O2 | (1-4-1) | 5% |
| V2-HBB(2F,3F)-O2 | (1-7-1) | 10% |
| 3-H2Cro(7F,8F)-5 | (1-19-2) | 5% |
| 2-Cro(7F,8F)2H-3 | (1-20-2) | 5% |
| 2-HH-3 | (2-1-1) | 22% |
| 3-HH-O1 | (2-1-1) | 3% |
| 7-HB-1 | (2-2-1) | 5% |
| 3-HHEH-5 | (2-4-1) | 3% |
| V-HHB-1 | (2-5-1) | 7% |
| V2-BB(F)B-1 | (2-7-1) | 5% |
| 5-HBB(F)B-3 | (2-13-1) | 5% |

NI=81.1° C.; Tc≤−20° C.; Δn=0.100; Δ∈=−2.7; VHR-1=99.3%; VHR-2=98.4%; VHR-3=98.6%.

As for a response time in the VA device as described in the invention, τ was 4.1 ms, and image sticking and leaching were evaluated to be good.

Example 14

A VA device was prepared using an aligning agent PA7 and a photopolymerizable monomer BMB (10% by weight) and with voltage application and ultraviolet light irradiation in the invention. Components and characteristics of a liquid crystal composition were as described below.

| | | |
|---|---|---|
| 3-HB(2F,3F)-O2 | (1-1-1) | 5% |
| V-HB(2F,3F)-O2 | (1-1-1) | 11% |
| V-HB(2F,3F)-O4 | (1-1-1) | 12% |
| V-HHB(2F,3F)-O2 | (1-4-1) | 10% |
| V-HHB(2F,3F)-O4 | (1-4-1) | 10% |
| 3-HBB(2F,3F)-O2 | (1-7-1) | 5% |
| 3-BCro(7F,8F)-5 | (1-19-4) | 3% |
| 3-HBCro(7F,8F)-5 | (1-21-4) | 4% |
| V-HH-3 | (2-1-1) | 25% |
| V2-BB-1 | (2-3-1) | 6% |
| 1V-HBB-2 | (2-6-1) | 4% |
| 5-HBBH-3 | (2-11-1) | 5% |

NI=70.1° C.; Tc≤−20° C.; Δn=0.100; Δ∈=−3.1; VHR-1=99.3%; VHR-2=98.5%; VHR-3=98.5%.

As for a response time in the VA device as described in the invention, τ was 3.9 ms, and image sticking and leaching were evaluated to be good.

Example 15

A VA device was prepared using an aligning agent PA8 and a photopolymerizable monomer BMB (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 16% |
| 1V-HB(2F,3F)-O4 | (1-1-1) | 6% |
| 3-H2B(2F,3F)-O2 | (1-2-1) | 3% |
| 3-HHB(2F,3F)-O2 | (1-4-1) | 3% |
| V-HHB(2F,3F)-O2 | (1-4-1) | 10% |
| V2-HHB(2F,3F)-O2 | (1-4-1) | 7% |
| V-HBB(2F,3F)-O2 | (1-7-1) | 10% |
| 3-HH2Cro(7F,8F)-3 | (1-21-2) | 3% |
| 3-HH2Cro(7F,8F)-5 | (1-21-2) | 4% |
| 3-Cro(7F,8F)2HH-5 | (1-22-2) | 3% |
| V-HH-3 | (2-1-1) | 20% |
| 1V-HH-3 | (2-1-1) | 7% |
| 5-HHEBH-3 | (2-10-1) | 4% |
| 5-HB(F)BH-3 | (2-12-1) | 4% |

NI=90.1° C.; Tc≤−20° C.; Δn=0.095; Δ∈=−3.6; VHR-1=99.2%; VHR-2=98.5%; VHR-3=98.6%.

As for a response time in the VA device as described in the invention, τ was 3.9 ms, and image sticking and leaching were evaluated to be good.

Example 16

A VA device was prepared using an aligning agent PA9 and a photopolymerizable monomer BMB (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 15% |
| V-HB(2F,3F)-O4 | (1-1-1) | 7% |
| 3-HBB(2F,3F)-O2 | (1-7-1) | 3% |
| V-HBB(2F,3F)-O2 | (1-7-1) | 10% |
| V2-HBB(2F,3F)-O2 | (1-7-1) | 10% |
| 3-HH1OCro(7F,8F)-5 | (1-21-3) | 8% |
| 2-HH-3 | (2-1-1) | 29% |
| 3-HHB-1 | (2-5-1) | 6% |
| 3-HHB-3 | (2-5-1) | 6% |
| 3-HHB-O1 | (2-5-1) | 6% |

NI=81.0° C.; Tc≤−20° C.; Δn=0.094; Δ∈=−3.1; VHR-1=99.3%; VHR-2=98.5%; VHR-3=98.6%.

As for a response time in the VA device as described in the invention, τ was 4.4 ms, and image sticking and leaching were evaluated to be good.

Example 17

A VA device was prepared using an aligning agent PA10 and a photopolymerizable monomer BMB (15% by weight) and with voltage application and ultraviolet light irradiation in the invention. Components and characteristics of a liquid crystal composition were as described below.

| | | |
|---|---|---|
| 3-DhBB(2F,3F)-O2 | (1) | 5% |
| 5-DhBB(2F,3F)-O2 | (1) | 4% |
| 3-HB(2F,3F)-O2 | (1-1-1) | 5% |
| 5-HB(2F,3F)-O2 | (1-1-1) | 5% |
| 3-HHB(2F,3F)-O2 | (1-4-1) | 5% |
| 3-HH2B(2F,3F)-O2 | (1-5-1) | 7% |
| 3-DhB(2F,3F)-O2 | (1-8-1) | 6% |
| 5-DhB(2F,3F)-O2 | (1-8-1) | 6% |
| 3-Dh1OB(2F,3F)-O2 | (1-10-1) | 5% |
| 5-HBB(2F,3Cl)-O2 | (1-18-1) | 5% |
| 3-HH-VFF | (2-1) | 3% |
| V-HH-3 | (2-1-1) | 28% |
| 1V2-BB-1 | (2-3-1) | 4% |

-continued

| | | |
|---|---|---|
| 3-HHEH-3 | (2-4-1) | 3% |
| V2-BB(F)B-1 | (2-7-1) | 4% |
| 3-HB(F)HH-5 | (2-9-1) | 5% |

NI=72.2° C.; Tc≤−20° C.; Δn=0.096; Δ∈=−2.4; VHR-1=99.1%; VHR-2=98.4%; VHR-3=98.5%.

As for a response time in the VA device as described in the invention, τ was 3.5 ms, and image sticking and leaching were evaluated to be good.

Example 18

A VA device was prepared using an aligning agent PA11 and a photopolymerizable monomer BMB (20% by weight) and with voltage application and ultraviolet light irradiation in the invention. Components and characteristics of a liquid crystal composition were as described below.

| | | |
|---|---|---|
| 3-H1OB(2F,3F)-O2 | (1-3-1) | 5% |
| 5-H1OB(2F,3F)-O2 | (1-3-1) | 5% |
| 3-HH1OB(2F,3F)-O2 | (1-6-1) | 5% |
| 5-HH1OB(2F,3F)-O2 | (1-6-1) | 5% |
| 5-HBB(2F,3Cl)-O2 | (1-18-1) | 6% |
| 3-DhHB(2F,3F)-O2 | (1-11-1) | 6% |
| 3-HDhB(2F,3F)-O2 | (1-12-1) | 10% |
| 3-BB(2F,5F)B-2 | (2) | 3% |
| V-HH-3 | (2-1-1) | 37% |
| 1V-HH-3 | (2-1-1) | 6% |
| 3-HHB-1 | (2-5-1) | 4% |
| 3-HHB-O1 | (2-5-1) | 4% |
| 1O1-HBBH-5 | (—) | 4% |

NI=92.1° C.; Tc≤−20° C.; Δn=0.085; Δ∈=−2.4; VHR-1=99.2%; VHR-2=98.5%; VHR-3=98.5%.

As for a response time in the VA device as described in the invention, τ was 3.2 ms, and image sticking and leaching were evaluated to be good.

Example 19

A VA device was prepared using an aligning agent PA12 and a photopolymerizable monomer BMB (20% by weight) and with voltage application and ultraviolet light irradiation in the invention. Components and characteristics of a liquid crystal composition were as described below.

| | | |
|---|---|---|
| 3-HH1OB(2F,3F)-O2 | (1-6-1) | 6% |
| 3-HBB(2F,3F)-O2 | (1-7-1) | 6% |
| 5-HBB(2F,3F)-O2 | (1-7-1) | 6% |
| 3-Dh2B(2F,3F)-O2 | (1-9-1) | 9% |
| 3-Dh1OB(2F,3F)-O2 | (1-10-1) | 6% |
| 3-DhH1OB(2F,3F)-O2 | (1-13-1) | 6% |
| 3-H2Cro(7F,8F)-5 | (1-19-2) | 3% |
| 3-H1OCro(7F,8F)-5 | (1-19-3) | 4% |
| 3-HHCro(7F,8F)-5 | (1-21-1) | 3% |
| V-HH-3 | (2-1-1) | 32% |
| 1V-HH-3 | (2-1-1) | 7% |
| 3-HB-O2 | (2-2-1) | 3% |
| 1V-HBB-2 | (2-6-1) | 4% |
| 2-BB(F)B-3 | (2-7-1) | 5% |

NI=72.0° C.; Tc≤−20° C.; Δn=0.092; Δ∈=−2.9; VHR-1=99.2%; VHR-2=98.5%; VHR-3=98.6%.

As for a response time in the VA device as described in the invention, τ was 3.3 ms, and image sticking and leaching were evaluated to be good.

Example 20

A VA device was prepared using an aligning agent PA13 and a photopolymerizable monomer BMB (15% by weight) and with voltage application and ultraviolet light irradiation in the invention. Components and characteristics of a liquid crystal composition were as described below.

| | | |
|---|---|---|
| 3-HB(2F,3F)-O2 | (1-1-1) | 5% |
| 5-HB(2F,3F)-O2 | (1-1-1) | 5% |
| V-H1OB(2F,3F)-O2 | (1-3-1) | 4% |
| V2-H1OB(2F,3F)-O2 | (1-3-1) | 4% |
| V-HH2B(2F,3F)-O2 | (1-5-1) | 5% |
| V2-HH2B(2F,3F)-O2 | (1-5-1) | 5% |
| 3-HH1OB(2F,3F)-O2 | (1-6-1) | 5% |
| 4-HH1OB(2F,3F)-O2 | (1-6-1) | 3% |
| 5-HH1OB(2F,3F)-O2 | (1-6-1) | 5% |
| 3-HB(2F,3Cl)-O2 | (1-16-1) | 5% |
| 3-HBB(2F,3Cl)-O2 | (1-18-1) | 2% |
| 5-HBB(2F,3Cl)-O2 | (1-18-1) | 3% |
| V-HH-3 | (2-1-1) | 28% |
| 3-HH-4 | (2-1-1) | 10% |
| V2-BB-1 | (2-3-1) | 4% |
| 5-HBB(F)B-2 | (2-13-1) | 4% |
| 5-HBB(F)B-3 | (2-13-1) | 3% |

NI=74.5° C.; Tc≤−20° C.; Δn=0.087; Δ∈=−3.4; VHR-1=99.2%; VHR-2=98.6%; VHR-3=98.6%.

As for a response time in the VA device as described in the invention, τ was 3.7 ms, and image sticking and leaching were evaluated to be good.

Example 21

A VA device was prepared using an aligning agent PA14 and a photopolymerizable monomer BMB (15% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 3% |
| 5-HHB(2F,3F)-O2 | (1-4-1) | 8% |
| V-HHB(2F,3F)-O2 | (1-4-1) | 10% |
| V-HHB(2F,3F)-O4 | (1-4-1) | 4% |
| 3-H1OB(2F,3F,6Me)-O2 | (1-25-1) | 5% |
| 5-H1OB(2F,3F,6Me)-O2 | (1-25-1) | 5% |
| 3-HH1OB(2F,3F,6Me)-O2 | (1-28-1) | 5% |
| 5-HH1OB(2F,3F,6Me)-O2 | (1-28-1) | 5% |
| 3-HBB(2F,3F,6Me)-O2 | (1-29-1) | 5% |
| V-HH-5 | (2-1-1) | 20% |
| 1V2-BB-1 | (2-3-1) | 10% |
| V-HHB-1 | (2-5-1) | 5% |
| V2-BB(F)B-1 | (2-7-1) | 3% |
| V2-BB(F)B-2 | (2-7-1) | 7% |
| 5-HBB(F)B-2 | (2-13-1) | 5% |

NI=90.5° C.; Tc≤−30° C.; Δn=0.129; Δ∈=−3.0; VHR-1=99.2%; VHR-2=98.5%; VHR-3=98.5%.

As for a response time in the VA device as described in the invention, τ was 3.7 ms, and image sticking and leaching were evaluated to be good.

Example 22

A VA device was prepared using an aligning agent PA15 and a photopolymerizable monomer BMB (10% by weight) and with voltage application and ultraviolet light irradiation in the invention. Components and characteristics of a liquid crystal composition were as described below.

| | | |
|---|---|---|
| 2-HBB(2F,3F)-O2 | (1-7-1) | 5% |
| 3-HBB(2F,3F)-O2 | (1-7-1) | 12% |
| 5-HBB(2F,3F)-O2 | (1-7-1) | 4% |
| 3-H2B(2F,3F,6Me)-O2 | (1-24-1) | 4% |
| 3-H1OB(2F,3F,6Me)-O2 | (1-25-1) | 5% |
| 5-H1OB(2F,3F,6Me)-O2 | (1-25-1) | 3% |
| 3-HH2B(2F,3F,6Me)-O2 | (1-27-1) | 5% |
| 3-HH1OB(2F,3F,6Me)-O2 | (1-28-1) | 6% |
| 3-HH1OCro(7F,8F)-5 | (1-21-3) | 4% |
| V-HH-4 | (2-1-1) | 15% |
| V-HH-5 | (2-1-1) | 23% |
| 1V-HH-3 | (2-1-1) | 6% |
| V-HHB-1 | (2-5-1) | 5% |
| V2-HHB-1 | (2-5-1) | 3% |

NI=85.4° C.; Tc≤−20° C.; Δn=0.092; Δ∈=−2.8; VHR-1=99.3%; VHR-2=98.6%; VHR-3=98.6%.

As for a response time in the VA device as described in the invention, τ was 5.1 ms, and image sticking and leaching were evaluated to be good.

Example 23

A VA device was prepared using an aligning agent PA16 and a photopolymerizable monomer BMB (10% by weight) and with voltage application and ultraviolet light irradiation in the invention. Components and characteristics of a liquid crystal composition were as described below.

| | | |
|---|---|---|
| 3-HB(2F,3F)-O2 | (1-1-1) | 8% |
| 3-HHB(2F,3F)-O2 | (1-4-1) | 10% |
| 3-HBB(2F,3F)-O2 | (1-7-1) | 11% |
| 5-HBB(2F,3F)-O2 | (1-7-1) | 5% |
| 3-HB(2F,3F,6Me)-O2 | (1-23-1) | 4% |
| 3-H2B(2F,3F,6Me)-O2 | (1-24-1) | 4% |
| 3-HHB(2F,3F,6Me)-O2 | (1-26-1) | 5% |
| 3-HH1OB(2F,3F,6Me)-O2 | (1-28-1) | 6% |
| V-HH-3 | (2-1-1) | 40% |
| 3-HHEBH-3 | (2-10-1) | 4% |
| 3-HHEBH-4 | (2-10-1) | 3% |

NI=82.9° C.; Δn=0.088; Δ∈=−3.0; VHR-1=99.1%; VHR-2=98.6%; VHR-3=98.6%.

As for a response time in the VA device as described in the invention, τ was 3.9 ms, and image sticking and leaching were evaluated to be good.

Example 24

A VA device was prepared using an aligning agent PA17 and a photopolymerizable monomer BMB (10% by weight) and with voltage application and ultraviolet light irradiation in the invention. Components and characteristics of a liquid crystal composition were as described below.

| | | |
|---|---|---|
| V-HB(2F,3F)-O2 | (1-1-1) | 12% |
| V-HB(2F,3F)-O4 | (1-1-1) | 10% |
| 3-H2B(2F,3F)-O2 | (1-2-1) | 15% |
| 3-HBB(2F,3F)-O2 | (1-7-1) | 7% |
| 4-HBB(2F,3F)-O2 | (1-7-1) | 6% |
| 5-HBB(2F,3F)-O2 | (1-7-1) | 6% |
| 2-BB(2F,3F)B-4 | (1-15-1) | 3% |
| 4O-B(2F,3F)B(2F,3F)-O6 | (1-30-1) | 4% |
| 3-HH-4 | (2-1-1) | 14% |
| 3-HHB-1 | (2-5-1) | 4% |
| 3-HHB-3 | (2-5-1) | 5% |
| 3-HHB-O1 | (2-5-1) | 3% |
| 5-HBB(F)B-2 | (2-13-1) | 6% |
| 5-HBB(F)B-3 | (2-13-1) | 5% |

NI=83.9° C.; Tc≤−20° C.; Δn=0.120; Δ∈=−3.7; VHR-1=99.1%; VHR-2=98.6%; VHR-3=98.6%.

As for a response time in the VA device as described in the invention, τ was 5.2 ms, and image sticking and leaching were evaluated to be good.

Example 25

A VA device was prepared using an aligning agent PA18 and a photopolymerizable monomer BMB (10% by weight) and with voltage application and ultraviolet light irradiation in the invention. Components and characteristics of a liquid crystal composition were as described below.

| | | |
|---|---|---|
| 3-H2B(2F,3F)-O2 | (1-2-1) | 15% |
| 5-H2B(2F,3F)-O2 | (1-2-1) | 15% |
| 2-HBB(2F,3F)-O2 | (1-7-1) | 3% |
| 3-HBB(2F,3F)-O2 | (1-7-1) | 9% |
| 4-HBB(2F,3F)-O2 | (1-7-1) | 5% |
| 5-HBB(2F,3F)-O2 | (1-7-1) | 9% |
| 2-HH-5 | (2-1-1) | 3% |
| 3-HH-4 | (2-1-1) | 15% |
| 3-HH-5 | (2-1-1) | 4% |
| 3-HB-O2 | (2-2-1) | 12% |
| 3-HHB-1 | (2-5-1) | 3% |
| 3-HHB-3 | (2-5-1) | 4% |
| 3-HHB-O1 | (2-5-1) | 3% |

NI=76.0° C.; Δn=0.101; Δ∈=−2.8; VHR-1=99.3%; VHR-2=98.6%; VHR-3=98.7%.

As for a response time in the VA device as described in the invention, τ was 4.0 ms, and image sticking and leaching were evaluated to be good.

Example 26

A VA device was prepared using an aligning agent PA19 and a photopolymerizable monomer BMB (20% by weight) and with voltage application and ultraviolet light irradiation in the invention. Components and characteristics of a liquid crystal composition were as described below.

| | | |
|---|---|---|
| 5-DhBB(2F,3F)-O2 | (1) | 4% |
| 3-HB(2F,3F)-O2 | (1-1-1) | 5% |
| 5-HB(2F,3F)-O2 | (1-1-1) | 5% |
| 3-HHB(2F,3F)-O2 | (1-4-1) | 5% |
| 3-HH2B(2F,3F)-O2 | (1-5-1) | 7% |
| 3-DhB(2F,3F)-O2 | (1-8-1) | 6% |
| 5-DhB(2F,3F)-O2 | (1-8-1) | 6% |
| 3-Dh1OB(2F,3F)-O2 | (1-10-1) | 5% |
| 3-dhBB(2F,3F)-O2 | (1-14-1) | 5% |
| 5-HBB(2F,3Cl)-O2 | (1-17-1) | 5% |
| 3-HH-VFF | (2-1) | 3% |
| V-HH-3 | (2-1-1) | 28% |
| 1V2-BB-1 | (2-3-1) | 4% |
| 3-HHEH-3 | (2-4-1) | 3% |
| V2-BB(F)B-1 | (2-7-1) | 4% |
| 3-HB(F)HH-5 | (2-9-1) | 5% |

NI=73.1° C.; Tc≤−20° C.; Δn=0.097; Δ∈=−2.5; VHR-1=99.1%; VHR-2=98.3%; VHR-3=98.5%.

As for a response time in the VA device as described in the invention, τ was 3.4 ms, and image sticking and leaching were evaluated to be good.

Example 27

A VA device was prepared using an aligning agent PA20 and a photopolymerizable monomer BMB (10% by weight) and with voltage application and ultraviolet light irradiation in the invention. Components and characteristics of a liquid crystal composition were as described below.

| V-HB(2F,3F)-O2 | (1-1-1) | 15% |
| V-HB(2F,3F)-O4 | (1-1-1) | 7% |
| 3-HBB(2F,3F)-O2 | (1-7-1) | 3% |
| V-HBB(2F,3F)-O2 | (1-7-1) | 10% |
| V2-HBB(2F,3F)-O2 | (1-7-1) | 10% |
| 3-HH1OCro(7F,8F)-5 | (1-21-3) | 8% |
| V-HH-3 | (2-1-1) | 29% |
| 3-HHB-1 | (2-5-1) | 6% |
| 3-HHB-3 | (2-5-1) | 6% |
| 3-HHB-O1 | (2-5-1) | 6% |

NI=85.5° C.; Tc≤−20° C.; Δn=0.100; Δ∈=−3.2; VHR-1=99.5%; VHR-2=98.8%; VHR-3=98.8%.

As for a response time in the VA device as described in the invention, τ was 4.1 ms, and image sticking and leaching were evaluated to be good.

Example 28

A VA device was prepared using an aligning agent PA9 and a photopolymerizable monomer BMB (10% by weight) and with voltage application and ultraviolet light irradiation in the invention. Components and characteristics of a liquid crystal composition were as described below.

| V-HB(2F,3F)-O2 | (1-1-1) | 15% |
| 3-H2B(2F,3F)-O2 | (1-2-1) | 7% |
| 3-HHB(2F,3F)-O2 | (1-4-1) | 5% |
| 3-HBB(2F,3F)-O2 | (1-7-1) | 3% |
| V2-HBB(2F,3F)-O2 | (1-7-1) | 10% |
| 3-HDhB(2F,3F)-O2 | (1-12-1) | 5% |
| 3-HH1OCro(7F,8F)-5 | (1-21-3) | 8% |
| 2-HH-3 | (2-1-1) | 29% |
| 3-HHB-1 | (2-5-1) | 6% |
| 3-HHB-3 | (2-5-1) | 6% |
| 3-HHB-O1 | (2-5-1) | 6% |

NI=81.9° C.; Tc≤−20° C.; Δn=0.087; Δ∈=−3.2; VHR-1=99.2%; VHR-2=98.5%; VHR-3=98.3%.

As for a response time in the VA device as described in the invention, τ was 4.3 ms, and image sticking and leaching were evaluated to be good.

The compositions according to Examples 1 to 28 have a shorter response time and a more excellent image sticking evaluation and more excellent leaching evaluation in comparison with the composition according to Comparative Example 1. Thus, the liquid crystal device of the invention is so much superior in characteristics to the liquid crystal device shown in Comparative Example 1.

What is claimed is:

1. A liquid crystal display element, comprising a pair of substrates including at least one transparent substrate, wherein the liquid crystal display element includes a transparent electrode interposed between the pair of substrates, an aligning agent containing at least a reactive monomer or oligomer, and a liquid crystal layer, the reactive monomer or oligomer contained in the aligning agent is polymerized to form an alignment layer, and the liquid crystal layer comprises a liquid crystal composition including at least one compound selected from the group of liquid crystal compounds having negative dielectric anisotropy, wherein the liquid crystal composition contains at least one liquid crystal compound selected from the group of liquid crystal compounds represented by formula (1) as a first component;

Chemical formula 1:

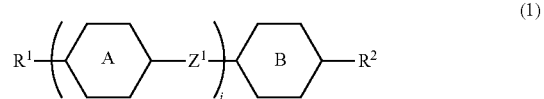

(1)

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, and at least one of $R^1$ and $R^2$ is alkenyl; ring A and ring B are independently 1,4-cyclohexylene, tetrahydropyran-2,5-diyl, 1,3-dioxane-2,5-diyl, 1,4-phenylene, 2-fluoro-1,4-phenylene, 2,5-difluoro-1,4-phenylene, 2,3-difluoro-1,4-phenylene, 2-fluoro-3-chloro-1,4-phenylene, 2,3-difluoro-6-methyl-1,4-phenylene, 2,6-naphthalenediyl or 7,8-difluorochroman-2,6-diyl, and at least one of ring A and ring B is 2,3-difluoro-1,4-phenylene, 2-fluoro-3-chloro-1,4-phenylene, 2,3-difluoro-6-methyl-1,4-phenylene, or 7,8-difluorochroman-2,6-diyl; $Z^1$ is independently a single bond, —(CH$_2$)$_2$—, —CH$_2$O—, —COO— or —CF$_2$O—; and j is 1, 2 or 3.

2. The liquid crystal display element according to claim 1, wherein both of the pair of substrates are transparent.

3. The liquid crystal display element according to claim 1, wherein alignment of liquid crystal molecules of the liquid crystal composition constituting the liquid crystal layer is perpendicular to a substrate surface.

4. The liquid crystal display element according to claim 1, wherein the alignment of liquid crystal molecules of the liquid crystal composition constituting the liquid crystal layer is perpendicular to the substrate surface, and the liquid crystal display element has a plurality of pixels subjected to alignment division by the alignment layer.

5. The liquid crystal display element according to claim 1, wherein the alignment layer is formed by the liquid crystal molecules being aligned with the reactive monomer or oligomer by a predetermined voltage and then the reactive monomer or oligomer being polymerized by ultraviolet light irradiation.

6. The liquid crystal display element according to claim 1, wherein the first component is at least one liquid crystal compound selected from the group of liquid crystal compounds represented by formula (1-1) to formula (1-31) in the liquid crystal composition;

Chemical formula 2:

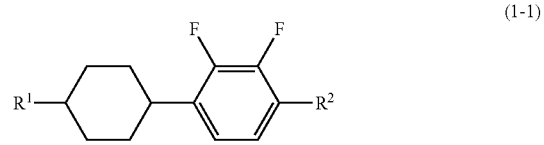

(1-1)

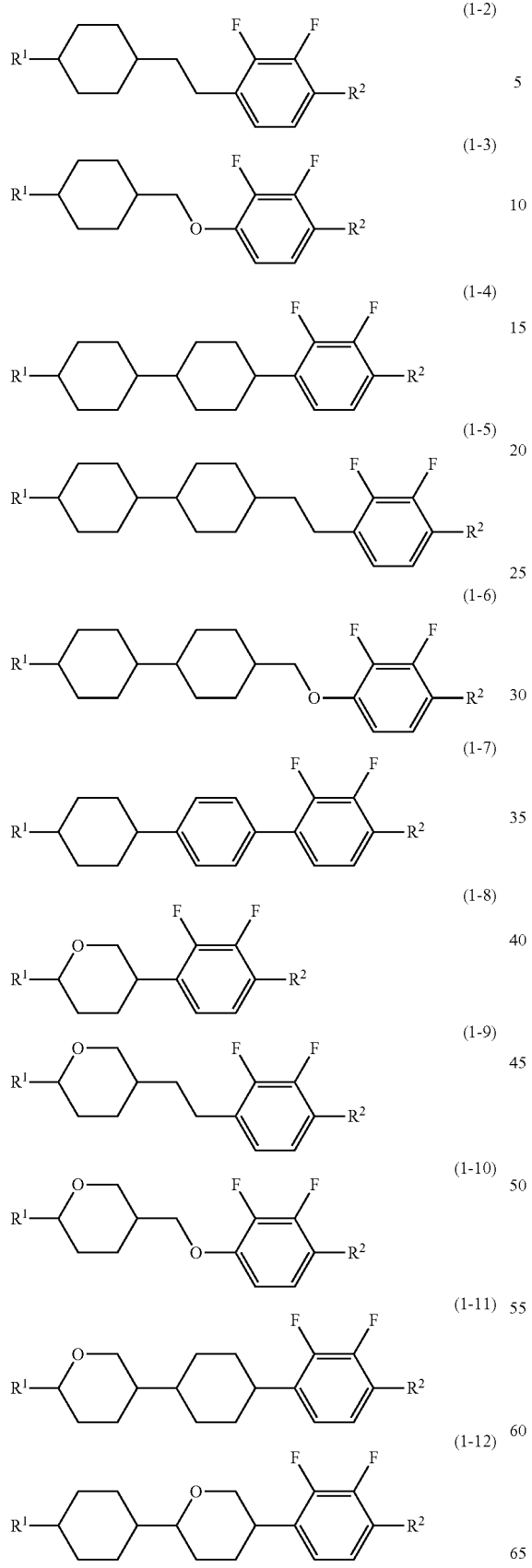
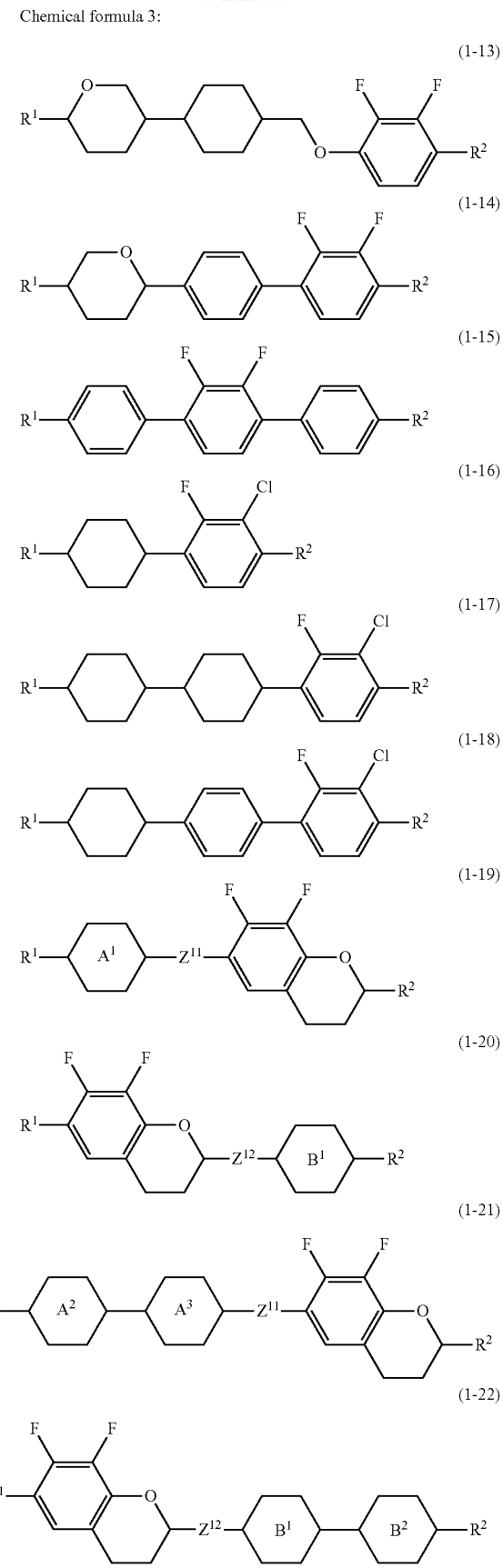
Chemical formula 3:

Chemical formula 4:

(1-23)
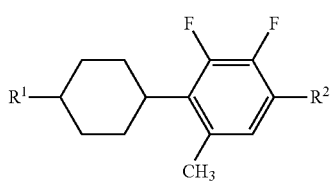

(1-24)
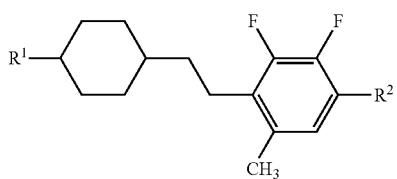

(1-25)
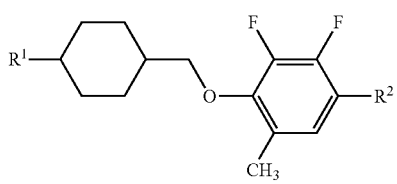

(1-26)
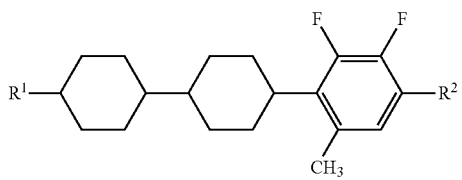

(1-27)
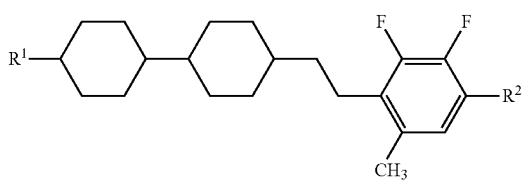

(1-28)
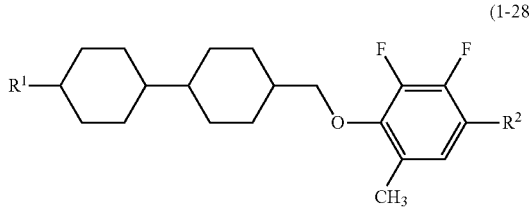

(1-29)
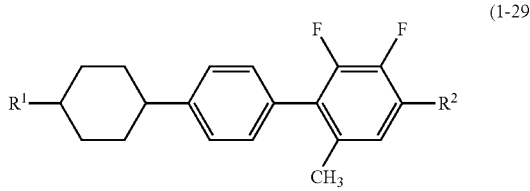

(1-30)
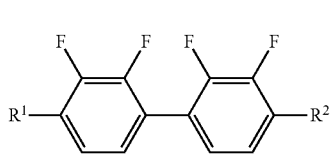

(1-31)
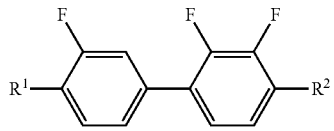

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring $A^1$, ring $A^2$, ring $A^3$, ring $B^1$ and ring $B^2$ are independently 1,4-cyclohexylene or 1,4-phenylene; $Z^{11}$ and $Z^{12}$ are independently a single bond, —(CH$_2$)$_2$—, —CH$_2$O— or —COO—.

7. The liquid crystal display element according to claim 1, wherein the liquid crystal composition further contains a liquid crystal compound represented by formula (2) as a second component;

Chemical formula 5:

(2)
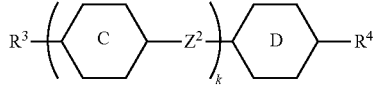

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring C and ring D are independently 1,4-cyclohexylene, tetrahydropyran-2,5-diyl, 1,3-dioxanediyl, 1,4-phenylene, 2-fluoro-1,4-phenylene, 2,5-difluoro-1,4-phenylene or 2,6-naphthalenediyl; $Z^2$ is independently a single bond, —(CH$_2$)$_2$—, —CH$_2$O—, —COO— or —CF$_2$O—; and k is 1, 2, or 3.

8. The liquid crystal display element according to claim 7, wherein the second component is at least one liquid crystal compound selected from the group of liquid crystal compounds represented by formula (2-1) to formula (2-13) in the liquid crystal composition;

Chemical formula 6:

(2-1)
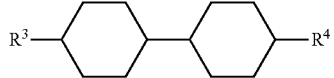

(2-2)
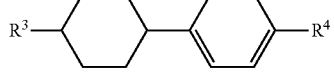

(2-3)
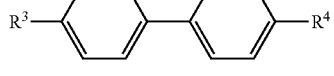

(2-4)
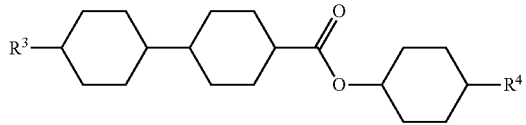

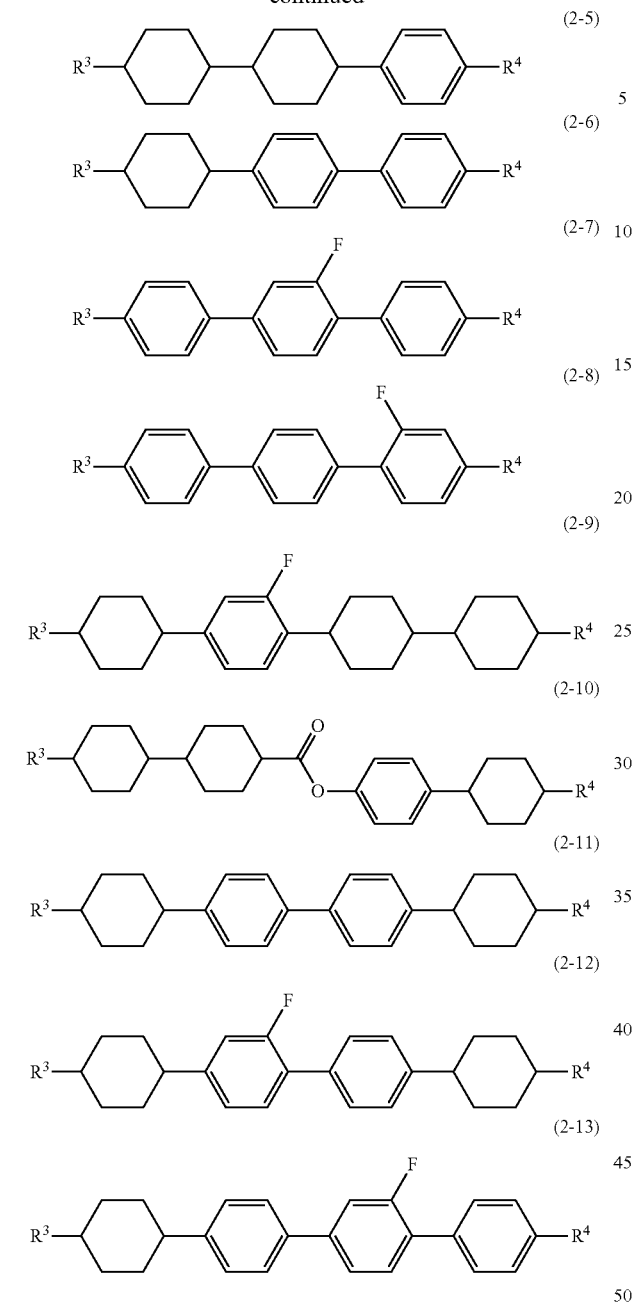

wherein R³ and R⁴ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

9. The liquid crystal display element according to claim 7, wherein a ratio of the first component is in the range of 20% by weight to 80% by weight, and a ratio of the second component is in the range of 20% by weight to 80% by weight in the liquid crystal composition.

10. The liquid crystal display element according to claim 1, wherein the aligning agent is used for display device for exhibiting anisotropy on a surface and immobilizing the anisotropy by light irradiation, and contains at least one (solid content A) selected from a polyimide obtained by allowing a tetracarboxylic dianhydride to react with a diamine, a polyamic acid and a polyamic acid derivative being a precursor thereof, and a photopolymerizable monomer and/or oligomer (solid content B), and a content ratio of the photopolymerizable monomer and/or oligomer (solid content B) is 10% by weight or more based on 100% by weight of an aligning agent solid content (solid content A plus solid content B).

11. The liquid crystal display element according to claim 10, wherein content of the photopolymerizable monomer and/or oligomer is 20% by weight or more.

12. The liquid crystal display element according to claim 10, wherein the polyimide comprising a combination of the diamine and the tetracarboxylic dianhydride or the polyamic acid being the precursor thereof is represented by the following structure (I) or structure (II) in the aligning agent;

Chemical formula 7:

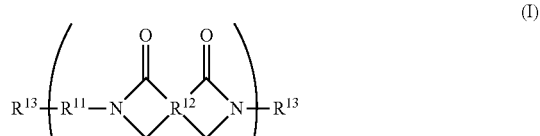

(I)

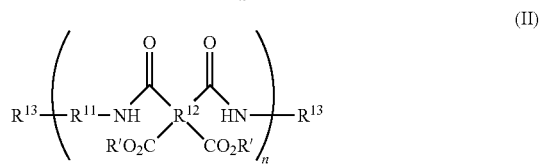

(II)

wherein n is an integer of 10 or more; $R^{11}$ is a divalent organic group; $R^{12}$ is a tetravalent organic group, and the groups may be different for each constitutional unit; $R^{13}$ is a monovalent organic group; and R' is independently hydrogen or alkyl having 1 to 4 carbons.

13. The liquid crystal display element according to claim 12, wherein the diamine is at least one diamine selected from the group of compounds represented by formula (III-1) to formula (III-14), or a mixture of the diamine and any other diamine in the aligning agent;

Chemical formula 8:

(III-1)

(III-2)

(III-3)

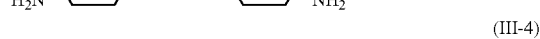

(III-4)

(III-5)

-continued (III-6)

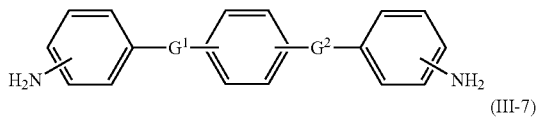

(III-7)

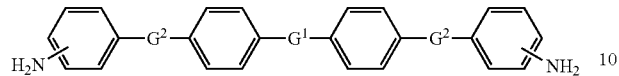

wherein m is independently an integer from 1 to 12; $G^1$ is independently a single bond, —O—, —S—, —S—S—, —SO$_2$—, —CO—, —CONH—, —NHCO—, —C(CH$_3$)$_2$—, —C(CF$_3$)$_2$—, —(CH$_2$)$_m$—, —O—(CH$_2$)$_m$—O— or —S—(CH$_2$)$_m$—S—; $G^2$ is independently a single bond, —O—, —S—, —CO—, —C(CH$_3$)$_2$—, —C(CF$_3$)$_2$— or alkylene having 1 to 3 carbons; arbitrary hydrogen of a cyclohexane ring and a benzene ring may be replaced by fluorine or —CH$_3$, and a position of bonding an NH$^2$, group to the cyclohexane ring or the benzene ring is arbitrary except a position of bonding with $G^1$ or $G^2$;

Chemical formula 9:

(III-8)

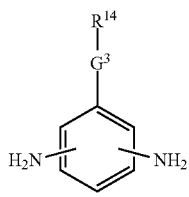

wherein, in formula (III-8), $G^3$ is a single bond, —O—, —COO—, —OCO—, —CO—, —CONH— or —(CH$_2$)$_m$-, m is an integer from 1 to 12; $R^{14}$ is alkyl having 3 to 20 carbons, a phenyl group or a group represented by formula (III-8-a), and in the alkyl, arbitrary hydrogen may be replaced by fluorine, and arbitrary —CH$_2$— may be replaced by —O—, —CH=CH— or —C≡C—, and hydrogen of the phenyl may replaced by —F, —CH$_3$, —OCH$_3$, —OCH$_2$F, —OCHF$_2$ or —OCF$_3$; and a position of bonding an NH$_2$ group to a benzene ring is arbitrary;

Chemical formula 10:

(III-8-a)

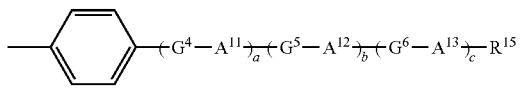

wherein $R^{15}$ is hydrogen, fluorine, alkyl having 1 to 20 carbons, fluorine-substituted alkyl having 1 to 20 carbons, alkoxy having 1 to 20 carbons, —CN, —OCH$_2$F, —OCHF$_2$ or —OCF$_3$; $G^4$, $G^5$ and $G^6$ are a bonding group, and independently a single bond, —O—, —COO—, —OCO—, —CONH—, —CH=CH— or alkylene having 1 to 12 carbons; $A^{11}$, $A^{12}$ and $A^{13}$ are a ring, and independently 1,4-phenylene, 1,4-cyclohexylene, 1,3-dioxane-2,5-diyl, pyrimidine-2,5-diyl, pyridine-2,5-diyl, naphthalene-1,5-diyl, naphthalene-2,6-diyl or anthracene-9,10-diyl, and in all the rings, arbitrary hydrogen may be replaced by fluorine or —CH$_3$; a, b and c are independently an integer from 0 to 2, and a sum thereof is 1 to 5, and when a, b or c is 2, two of bonding groups may be identical or different, and two of rings may be identical or different;

Chemical formula 11:

(III-9)

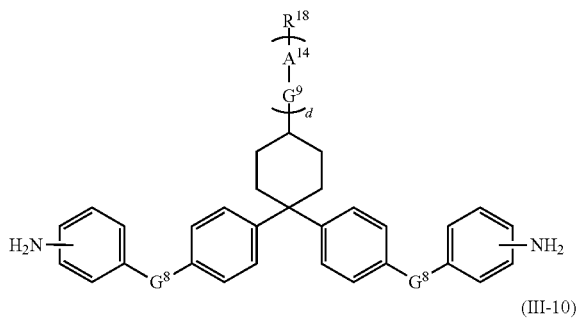

(III-10)

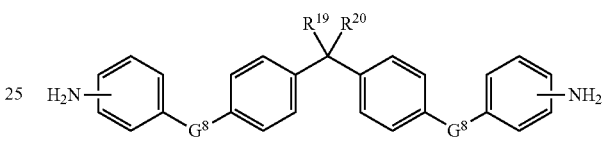

wherein, in formula (III-9) and formula (III-10), $R^{18}$ is hydrogen or alkyl having 1 to 20 carbons, and arbitrary —CH$_2$— in the alkyl may be replaced by —O—, —CH=CH= or —C—; $R^{19}$ is alkyl having 6 to 22 carbons; $R^2$ is hydrogen or alkyl having 1 to 22 carbons; $G^8$ is —O— or alkylene having 1 to 6 carbons; $A^{14}$ is 1,4-phenylene or 1,4-cyclohexylene; $G^9$ is a single bond or alkylene having 1 to 3 carbons; d is 0 or 1; and a position of bonding an amino group to a benzene ring is arbitrary;

Chemical formula 12:

(III-11)

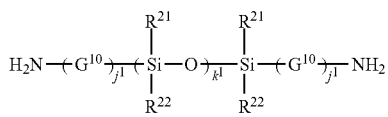

wherein, in formula (III-11), $R^{21}$ and $R^{22}$ are independently alkyl having 1 to 3 carbons or phenyl; $G^{10}$ is methylene, phenylene or alkyl-substituted phenylene; $j^1$ is an integer from 1 to 6; and $k^1$ is an integer from 1 to 10;

Chemical formula 13:

(III-12)

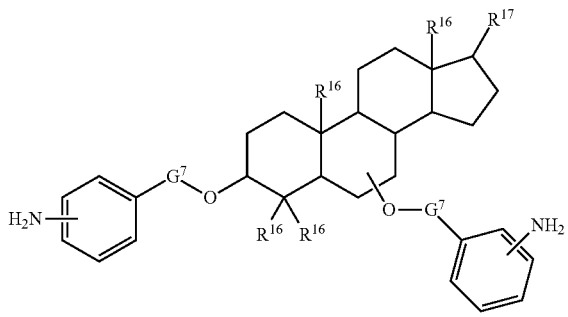

-continued (III-13)

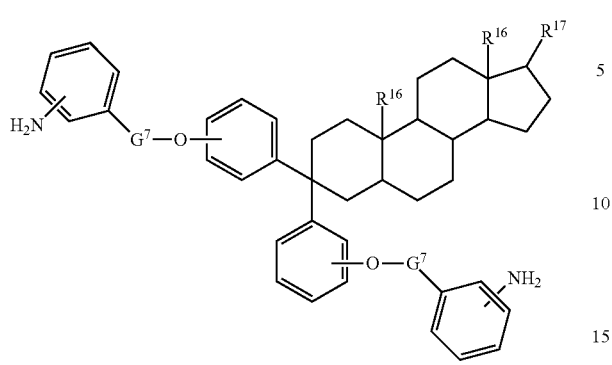

wherein, in formula (III-12) and formula (III-13), $R^{16}$ is independently hydrogen or —$CH_3$;
$R^{17}$ is independently hydrogen, alkyl having 1 to 20 carbons or alkenyl having 2 to 20 carbons; $G^7$ is independently a single bond, —CO— or —$CH_2$—; one of hydrogen of a benzene ring in formula (III-13) may be replaced by alkyl having 1 to 20 carbons or phenyl; and as for a group of which bonding position is not fixed to any one of carbon atoms constituting a ring, the bonding position is arbitrary;

Chemical formula 14:

(III-14)

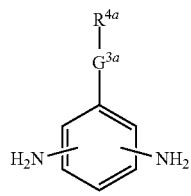

wherein, in formula (III-14), $G^{3a\prime}$ is a single bond, —O—, —COO—, —OCO—, —CO—, —CONH— or —$(CH_2)_m$— is an integer from 1 to 12; $R^{4a}$ is a group represented by any one of formula (III-14-a) to formula (III-14-d);

Chemical formula 15:

(III-14-a)

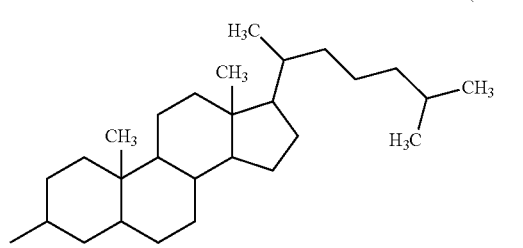

(III-14-b)

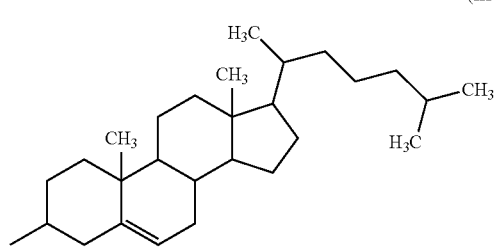

(III-14-c)

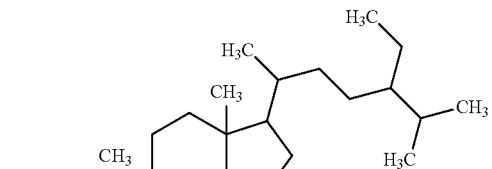

(III-14-d)

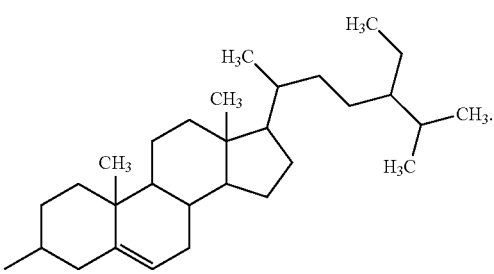

14. The liquid crystal display element according to claim 12, wherein, in formula (I) or formula (II), a residue of tetracarboxylic dianhydride is at least one tetracarboxylic dianhydride selected from the group of compounds represented by each of the following formula (IV-1) to formula (IV-12), or a mixture of the tetracarboxylic dianhydride with any other tetracarboxylic dianhydride in the aligning agent;

Chemical formula 16:

(IV-1)

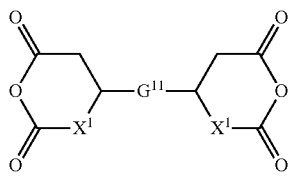

wherein, in formula (IV-1), $G^{11}$ is a single bond, alkylene having 1 to 12 carbons, 1,4-phenylene or 1,4-cyclohexylene; and $X^1$ is each independently a single bond or —$CH_2$—;

Chemical formula 17:

(IV-2)

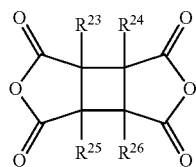

wherein, in formula (IV-2), $R^{23}$, $R^{24}$, $R^{25}$ and $R^{26}$ are independently hydrogen, methyl, ethyl or phenyl;

Chemical formula 18:

(IV-3)

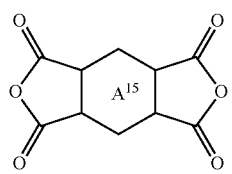

wherein, in formula (IV-3), ring $A^{15}$ is a cyclohexane ring or a benzene ring;

Chemical formula 19:

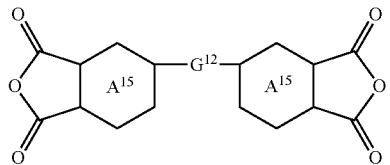
(IV-4)

wherein, in formula (IV-4), $G^{12}$ is a single bond, —$CH_2$—, —$CH_2CH_2$—, —O—, —CO—, —S—, —$C(CH_3)_2$—, —SO— or —$C(CF_3)_2$—; and ring $A^{15}$ is each independently a cyclohexane ring or a benzene ring;

Chemical formula 20:

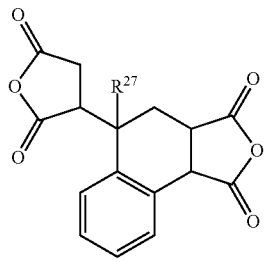
(IV-5)

wherein, in formula (IV-5), $R^{27}$ is hydrogen or methyl;

Chemical formula 21:

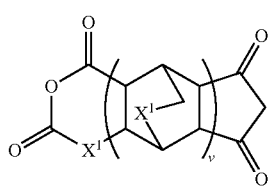
(IV-6)

wherein, in formula (IV-6), $X^1$ is each independently a single bond or —$CH_2$—; and v is 1 or 2;

Chemical formula 22:

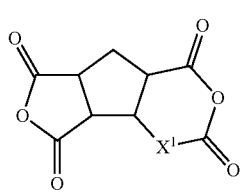
(IV-7)

wherein, in formula (IV-7), $X^1$ is a single bond or —$CH_2$—;

Chemical formula 23:

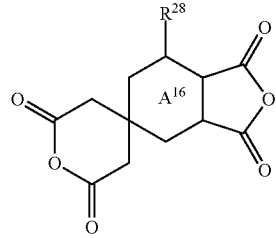
(IV-8)

wherein, in formula (IV-8), $R^{28}$ is hydrogen, methyl, ethyl or phenyl; and ring $A^{16}$ is a cyclohexane ring or a cyclohexene ring;

Chemical formula 24:

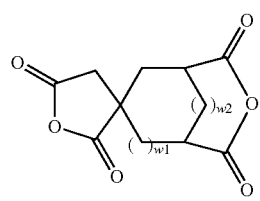
(IV-9)

wherein, in formula (IV-9), w1 and w2 are 0 or 1;

Chemical formula 25:

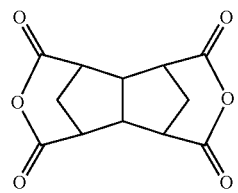
(IV-10)

Chemical formula 26:

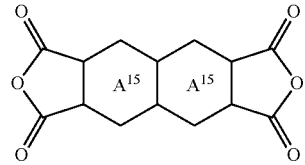
(IV-11)

wherein, in formula (IV-11), ring $A^{15}$ is each independently a cyclohexane ring or a benzene ring;

Chemical formula 27:

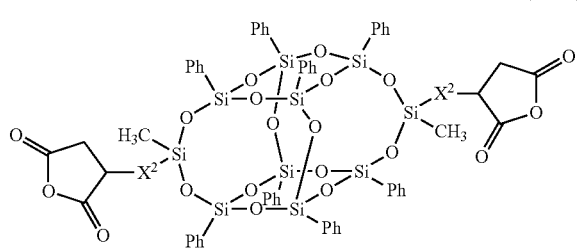
(IV-12)

wherein, in formula (IV-12), $X^2$ is independently alkyl having 2 to 6 carbons.

15. The liquid crystal display element according to claim 12, wherein, in formula (I) or formula (II), a residue of tetracarboxylic dianhydride is at least one compound selected from the group of compounds represented by the following formula (IV-1-1) to formula (IV-12-1) in the aligning agent;

16. The liquid crystal display element according to claim 1, wherein the reactive monomer is a photopolymerizable monomer being at least one compound selected from the group of compounds represented by formula (3):

$$R^{a1}-Z-(E-Z)_{m1}-R^{a1} \tag{3}$$

wherein, $R^{a1}$ is independently a polymerizable group represented by the following formula (3-1-1) to formula (3-1-6), hydrogen, halogen, cyano, —CF$_3$, —CF$_2$H, —CFH$_2$, —OCF$_3$, —OCF$_2$H, —N=C=O, —N=C=S or alkyl having 1 to 20 carbons, and in the alkyl, arbitrary —CH$_2$— may be replaced by —O—, —S—, —SO$_2$—, —CO—, —COO—, —OCO— CH=CH—, —CF=CF— or —C≡C—, arbitrary hydrogen may be replaced by halogen or cyano, and at least one of $R^{a1}$ is a polymerizable group represented by formula (3-1-1) to formula (3-1-6); ring E is a saturated or unsaturated independent ring having 3 to 10 carbons, a condensed ring or a spiro ring divalent group, and in the rings, arbitrary —CH$_2$— may be replaced by —O—, arbitrary —CH= may be replaced by —N=, arbitrary hydrogen may be replaced by halogen, cyano, nitro, isocyano, isothiocyanato, silyl monosubstituted to Chemical formula 28:

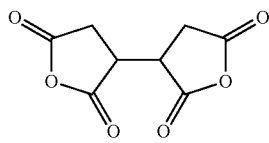 (IV-1-1)

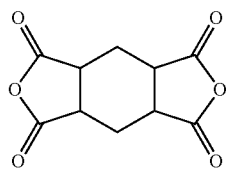 (IV-3-1)

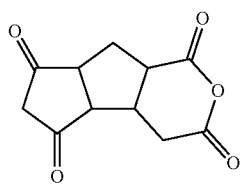 (IV-7-1)

(IV-2-1)

(IV-3-2)

(IV-10-1)

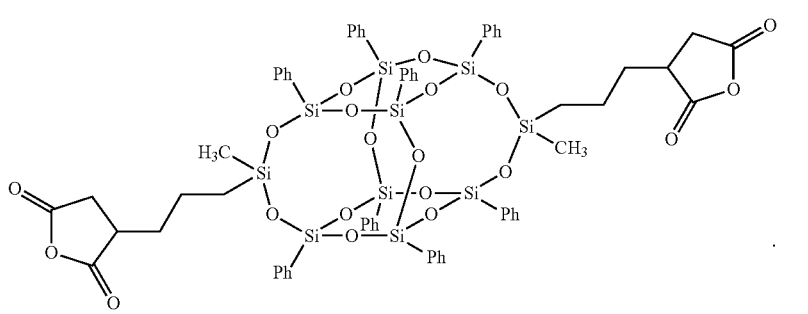
(IV-12-1)

trisubstituted by alkyl having 1 to 4 carbons, straight-chain or branched-chain alkyl having 1 to 10 carbons or alkyl halide having 1 to 10 carbons, and in the alkyl, arbitrary —CH$_2$— may be replaced by —O—, —CO—, —COO—, —OCO—, —OCOO—, —CH=CH—, or —C≡C—; Z is independently a single bond or alkylene having 1 to 20 carbons, and in the alkylene, arbitrary —CH$_2$— may be replaced by —O—, —S—, —CO—, —COO—, —OCO—, —OCOO—, —CH=CH—, —CF=CF—, CH=N—, —N=CH—, —N=N—, —N(O)=N— or —C≡C—, and arbitrary hydrogen may be replaced by halogen; and m1 is an integer from 1 to 6; when m1 is an integer from 2 to 6, a plurality of E-Z in a parenthesis may be identical or different;

Chemical formula 29:

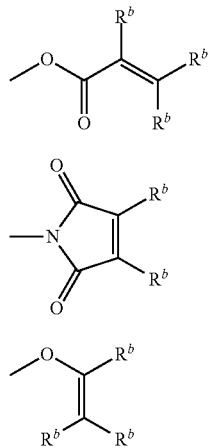

(3-1-1)

(3-1-2)

(3-1-3)

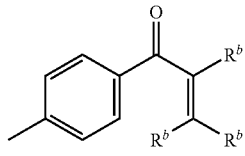

(3-1-4)

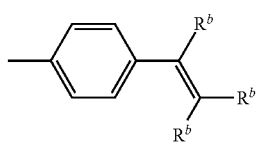

(3-1-5)

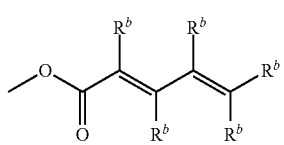

(3-1-6)

wherein, $R^b$ is hydrogen, halogen, —CF$_3$ or alkyl having 1 to 5 carbons.

17. The liquid crystal display element according to claim 1, wherein the aligning agent or the liquid crystal layer further contains an initiator and a polymerization inhibitor.

18. The liquid crystal display element according to claim 1, wherein the reactive monomer or oligomer is a photopolymerizable monomer or oligomer, or a thermally polymerizable monomer or oligomer.

* * * * *

UNITED STATES PATENT AND TRADEMARK OFFICE
CERTIFICATE OF CORRECTION

PATENT NO. : 8,741,397 B2
APPLICATION NO. : 13/502141
DATED : June 3, 2014
INVENTOR(S) : Norikatsu Hattori and Atsuko Fujita Page 1 of 1

It is certified that error appears in the above-identified patent and that said Letters Patent is hereby corrected as shown below:

In the Claims:

At column 142, line 30, Claim 13, change "-CH=CH=or -C-" to -- -CH=CH- or -C $\equiv$ C- --.

At column 145, line 14, Claim 14, change "-CH$_2$" to -- -CH$_2$- --.

At column 148, line 13-14, Claim 16, change "-OCO—CH=CH-" to -- -OCO-, -CH=CH- --.

At column 149, line 10, Claim 16, change "CH=N-" to -- -CH=N- --.

Signed and Sealed this
Ninth Day of September, 2014

Michelle K. Lee
*Deputy Director of the United States Patent and Trademark Office*